(12) United States Patent
Brower et al.

(10) Patent No.: US 11,926,240 B2
(45) Date of Patent: Mar. 12, 2024

(54) USER INTERFACE CONTROL SERVER AND METHOD FOR REMOTE CONTROL MANAGEMENT OF MARINE DOCK ELECTRIC CHARGING STATIONS

(71) Applicant: Hubbell Incorporated, Shelton, CT (US)

(72) Inventors: John Brower, Fairfield, CT (US); Matthew Samojeden, Rye, NY (US); Ryan Bares, Shelton, CT (US); Daniel Golembiewski, Shelton, CT (US); Michael Carson, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/853,394

(22) Filed: Jun. 29, 2022

(65) Prior Publication Data
US 2022/0410753 A1    Dec. 29, 2022

Related U.S. Application Data

(60) Provisional application No. 63/216,274, filed on Jun. 29, 2021.

(51) Int. Cl.
| | | |
|---|---|---|
| B60L 53/66 | (2019.01) | |
| B60L 53/30 | (2019.01) | |
| G06F 3/14 | (2006.01) | |
| H02J 7/00 | (2006.01) | |
| H04M 1/72424 | (2021.01) | |

(52) U.S. Cl.
CPC ............... *B60L 53/66* (2019.02); *B60L 53/30* (2019.02); *G06F 3/14* (2013.01); *H02J 7/0047* (2013.01); *H04M 1/72424* (2021.01); *B60L 2200/32* (2013.01)

(58) Field of Classification Search
CPC ........ B60L 53/56; B60L 53/30; B60L 200/32; H04M 1/72424; G06F 3/14; H02J 7/0047
USPC ........................................................ 715/736
See application file for complete search history.

(56) References Cited

U.S. PATENT DOCUMENTS

| | | | | |
|---|---|---|---|---|
| 10,483,726 | B1* | 11/2019 | Seff ........................... | H02B 1/26 |
| 11,143,714 | B1* | 10/2021 | Dively ................. | G01R 15/186 |
| 2010/0211643 | A1 | 8/2010 | Lowenthal et al. | |
| 2011/0178644 | A1 | 7/2011 | Picton | |
| 2012/0032519 | A1* | 2/2012 | Watts ...................... | H02J 3/466 |
| | | | | 307/99 |
| 2014/0371969 | A1 | 12/2014 | Asai et al. | |

(Continued)

OTHER PUBLICATIONS

PCT/US2022/035540 International Search Report and Written Opinion dated Dec. 23, 2022 (19 pages).

*Primary Examiner* — William D Titcomb
(74) *Attorney, Agent, or Firm* — Michael Best & Friedrich LLP

(57) ABSTRACT

A marine power pedestal is disclosed. The power pedestal is configured to connect to a mobile device comprising a main body, one or more electrical power units disposed in the main body and configured to conduct power to a marine vessel, one or more display screens, one or more sensors. A controller including a network interface is configured to communicate with a mobile device via a communication network, transmit data to a server via the communication network, and execute commands received, via the communication network, from the server or the mobile device.

19 Claims, 85 Drawing Sheets

(56) References Cited

U.S. PATENT DOCUMENTS

| | | |
|---|---|---|
| 2016/0347195 A1 | 12/2016 | Bridges et al. |
| 2017/0368954 A1* | 12/2017 | Salter .................... H05B 45/37 |
| 2018/0050602 A1* | 2/2018 | Aronov .................. B60L 53/11 |
| 2018/0365255 A1* | 12/2018 | Kim ........................ H04L 67/12 |
| 2019/0181638 A1 | 6/2019 | Chapel et al. |
| 2020/0009990 A1* | 1/2020 | Shiiyama ................ B60L 58/16 |
| 2020/0018800 A1 | 1/2020 | Oshima et al. |
| 2020/0231051 A1 | 7/2020 | Krogh et al. |
| 2020/0353826 A1* | 11/2020 | Yaldo ...................... B60L 53/66 |
| 2021/0091515 A1* | 3/2021 | Weeks ................. H01R 13/713 |

\* cited by examiner

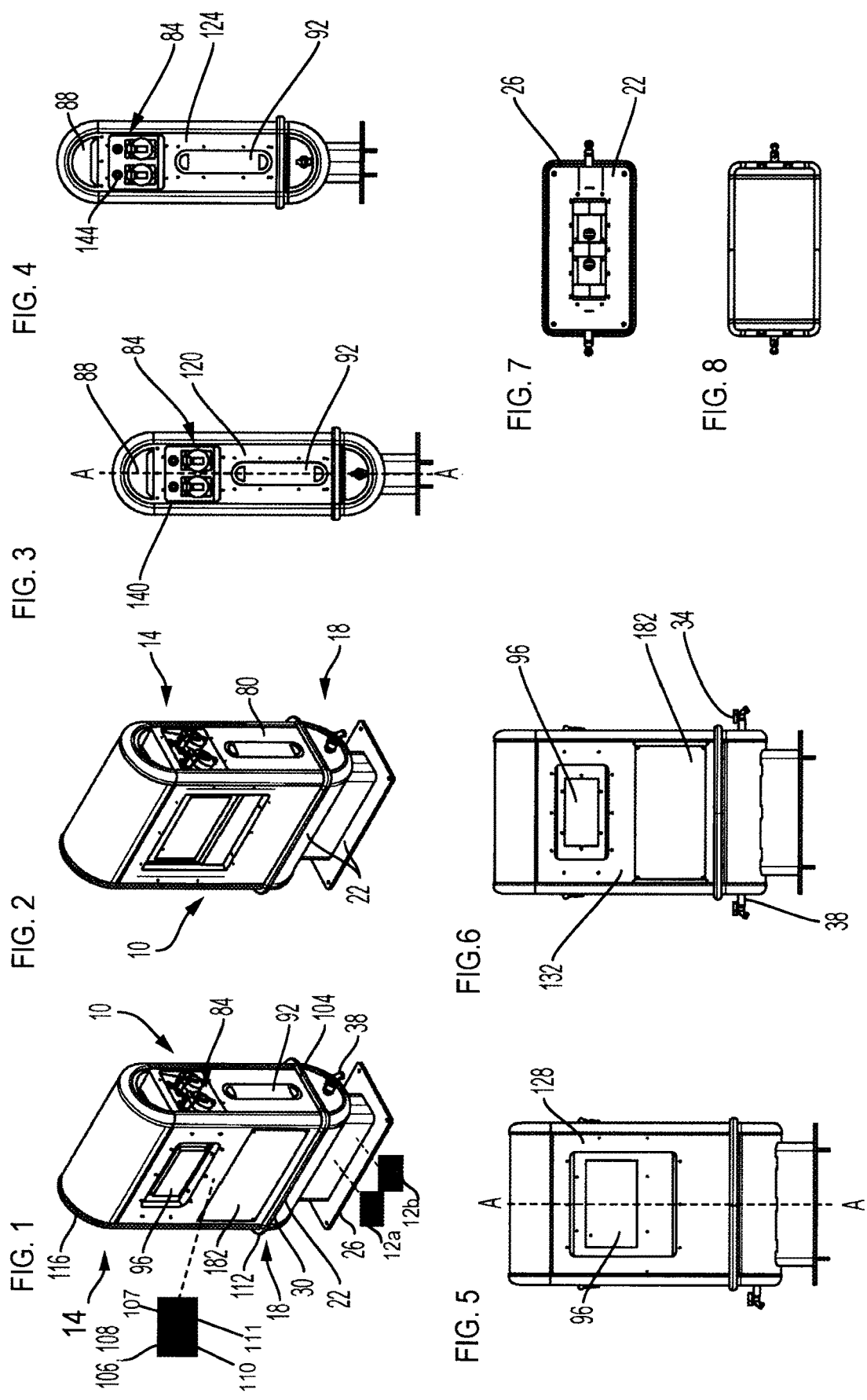

SHOWING PARTS OF MARINE ELECTIC

CHARGING STATION 10

SHOWN WITH BODY REMOVED AND COVER INSTALLED

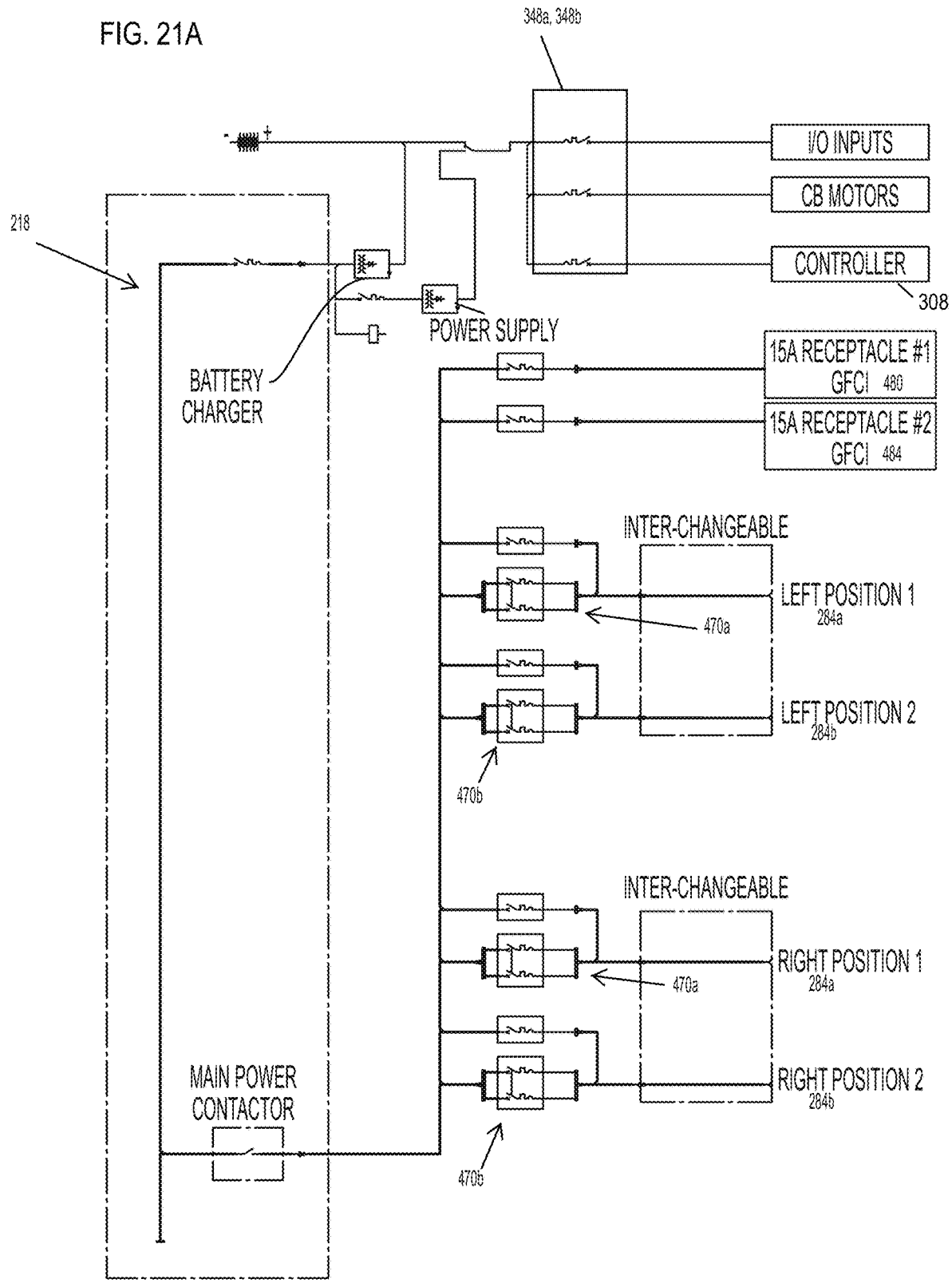

| 1130A Alert Event Type | 1130B Description (Optional) | 1130C Alert Date/Time | 1130D Note Text | 1130E Note Date/Time |
|---|---|---|---|---|
| Power | Power spiked above threshold | May 20, 2021 11:00AM | This is an example of a note | May 20, 2021 1:45PM |
| Power | Power spiked above threshold | May 20, 2021 11:02AM | Dave resolved the issue | May 20, 2021 1:46PM |
| Power | Power spiked above threshold | May 20, 2021 11:02AM | This was a test alert. Please ignore | May 20, 2021 1:47PM |
| Emergency | Emergency Button Activated | May 24, 2021 1:55PM | Mary resolved. | May 24, 2021 2:05PM |

1131

| | | | | |
|---|---|---|---|---|
| Emergency | Emergency Button Activated | May 24, 2021 2:30PM | Dave resolved. | May 24, 2021 2:40PM |

| | | | | |
|---|---|---|---|---|
| Power | Power spiked above threshold | May 24, 2021 4:40PM | Null | Null |
| Emergency | Emergency Button Activated | May 24, 2021 4:41PM | Null | Null |

| Dockmaster Identifier | Location Identifier | Pedestal Board Identifier(s) | Status |
|---|---|---|---|
| 311-97-1234 | Dock 1, Slip 11 | SD-A0001, SD-A0002 | Offline |
| 311-97-1234 | Dock 2, Slip 2 | SD-A0010, SD-A0011 | Available |
| 311-97-1234 | Dock 2, Slip 4 | SD-A0011 | Available |
| 311-97-1234 | Dock 2, Slip 6 | SD-A0012 | Offline |
| 311-97-1234 | Dock 2, Slip 8 | SD-A0013 | Available |

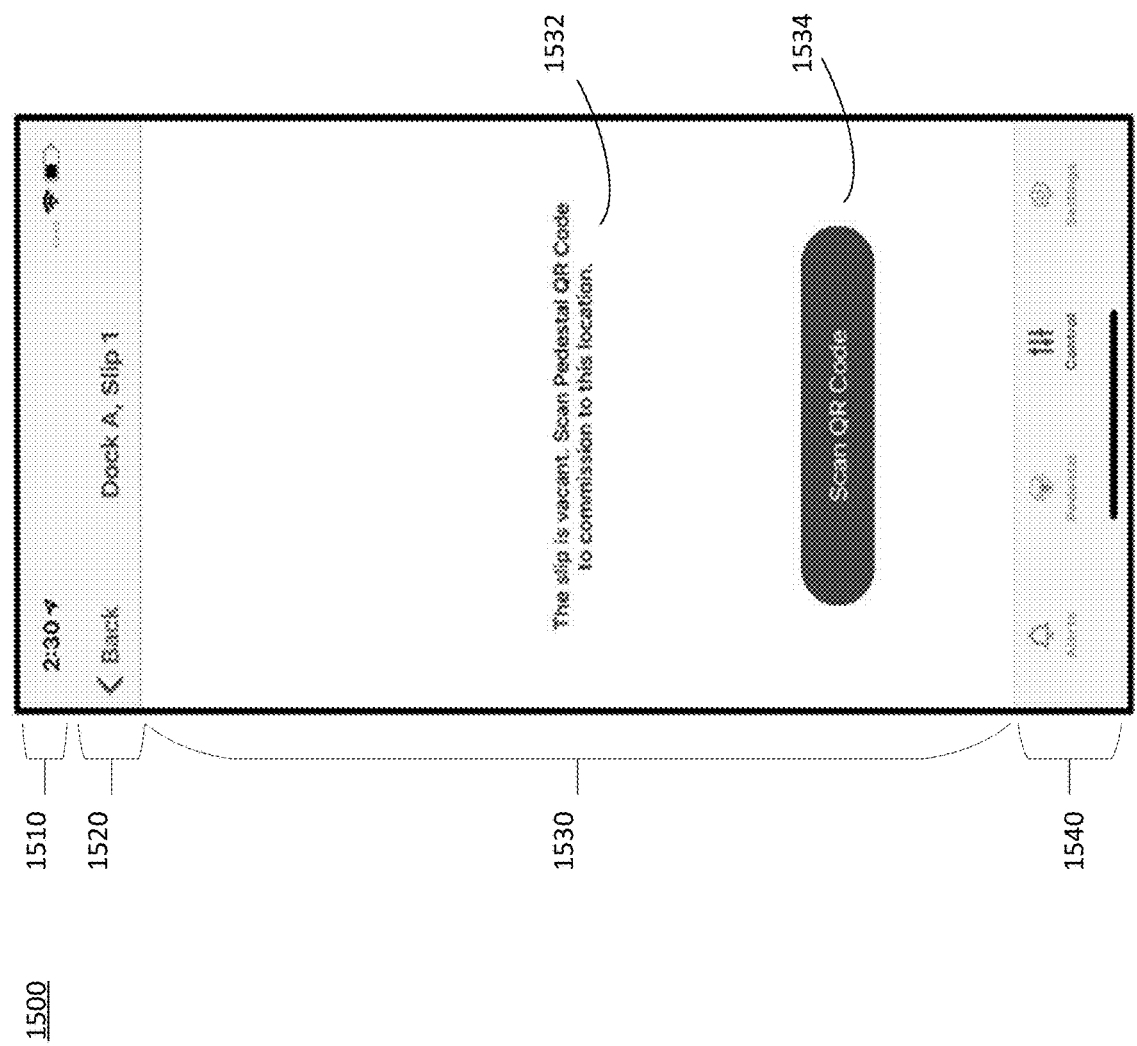

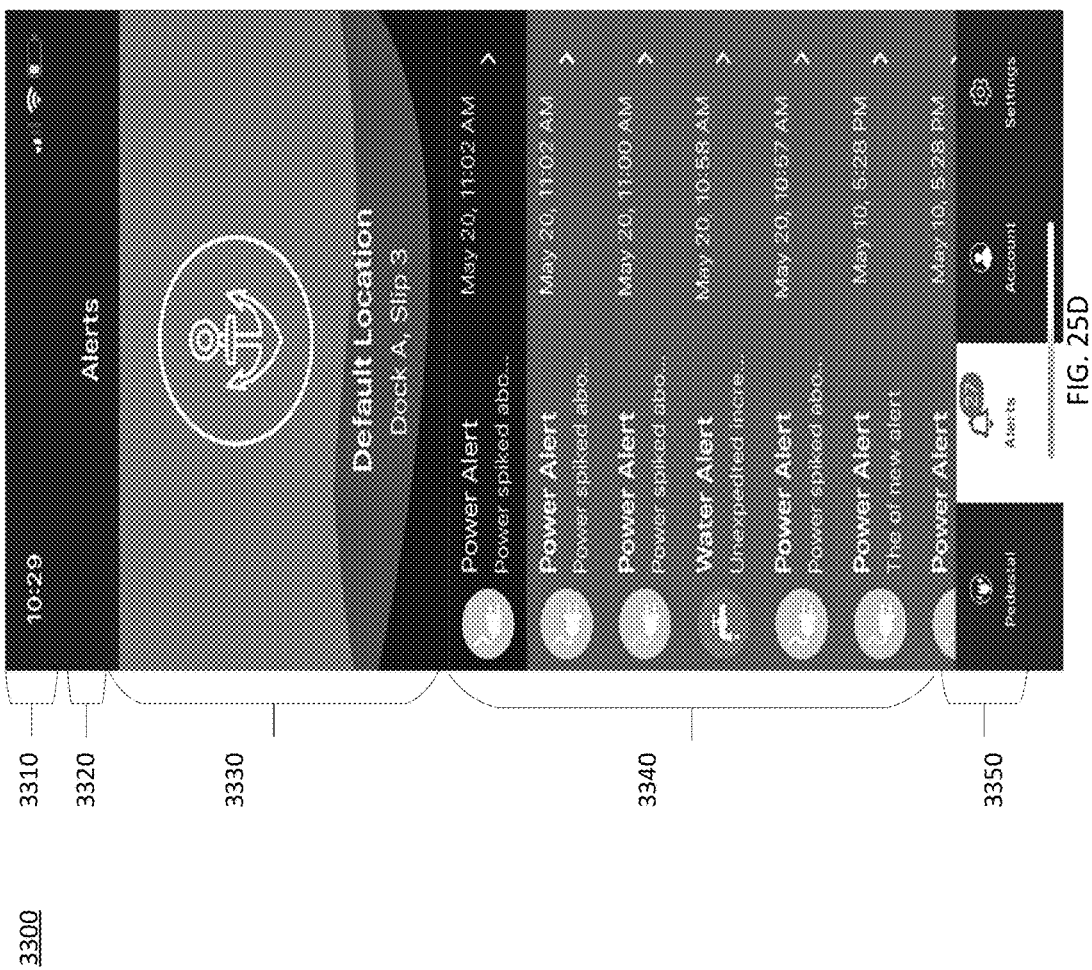

6000

6100

Log in or create a new account

Lorem ipsum dolor sit amet, consectetur adipiscing elit.

Email

6002

Password

6004

Log in

Forgot Password

Don't have an account?
Create one now

FIG. 29

6400
Alerts    Cancel
6410
6430        6432
3 Alerts Selected    Dismiss
FIG. 31B

6700

6710

6800

6800
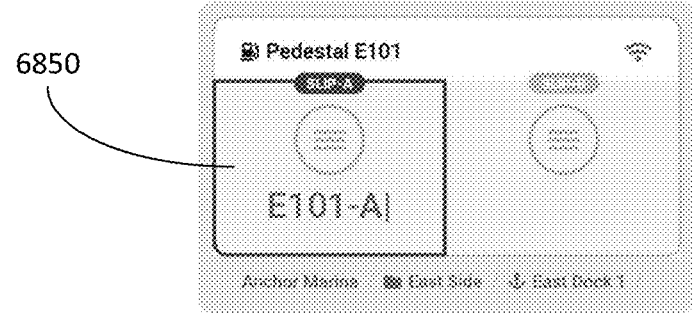
6850
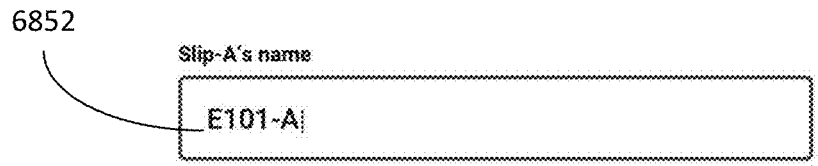
6852
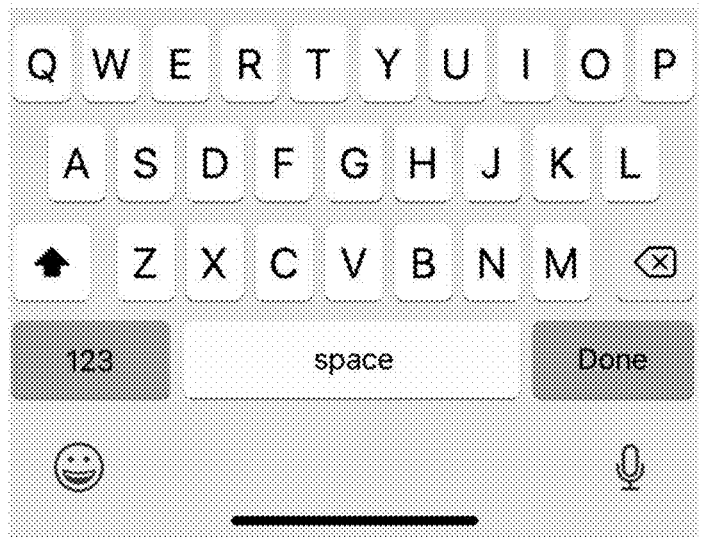
FIG. 35E

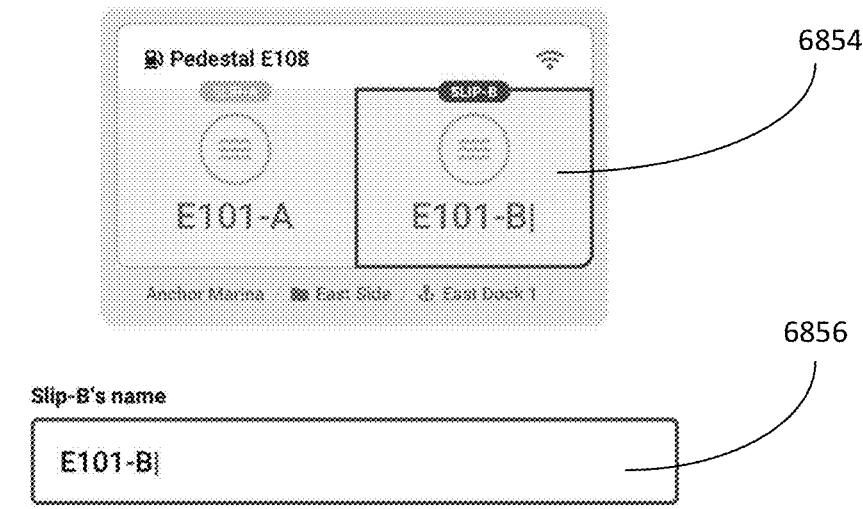
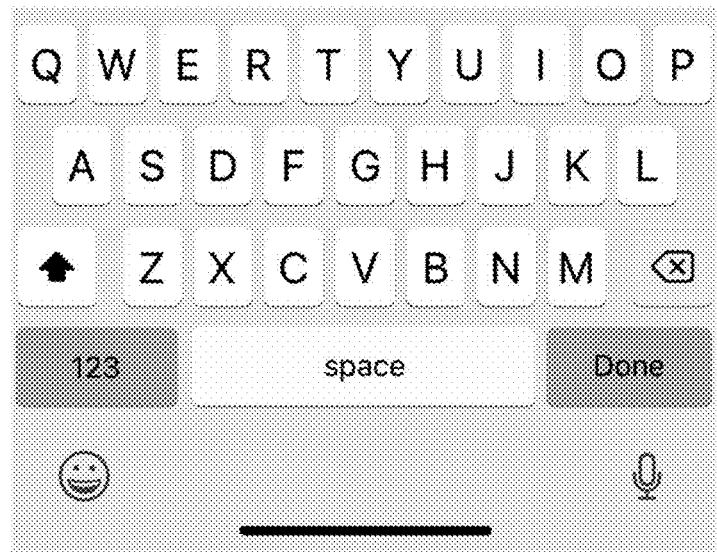
FIG. 35F

6800
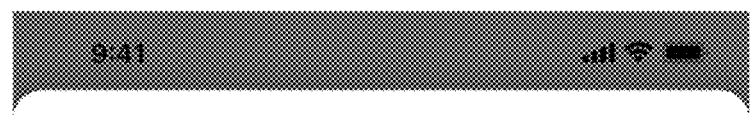
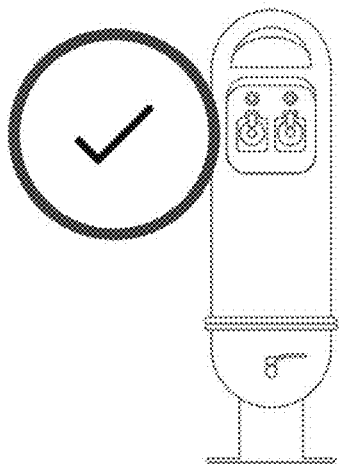
Pedestal comissioned!
Pedestal details
| | |
|---|---|
| Date commissioned | 2021-02-10, 9:41 AM |
| Serial number | 000000111 |
| Type | Hurricane |
| Group | East Side |
| Dock | East Dock 1 |
6860
FIG. 35G

7100

9:41

< Anchor Marina

Anchor Marina /

⚓ Docks (12)

⚓ East Dock 1
8 pedestals  >

⚓ East Dock 2
7 pedestals  >

⚓ East Dock 3
6 pedestals  >

⚓ East Dock 4
5 pedestals  >

⚓ East Dock 5
4 pedestals  > — 7110

⚓ East Dock 6
3 pedestals  >

⚓ West Dock 1
8 pedestals  >

⚓ West Dock 2
7 pedestals  >

⚓ West Dock 3
6 pedestals  >

⚓ West Dock 4

— 7120

7200

9:41

< Anchor Marina

🅟 Pedestal E604 >

🅟 Pedestal E701 >

🅟 Pedestal E702 >

🅟 Pedestal E703 >

🅟 Pedestal E704 >

🅟 Pedestal E705 >

🅟 Pedestal E706 >

🅟 Pedestal E707 >

🅟 Pedestal E708 >

Decommissioned (2)

Test 1 >

Test 2

7230

7220

7600

Edit pedestal

Where do you want "Pedestal E101" to be located?

Anchor Marina

- East Side — 6 docks
- West Side — 7 docks
- Yacht Docks — 4 docks

7610

Add a new group

7800
Edit group
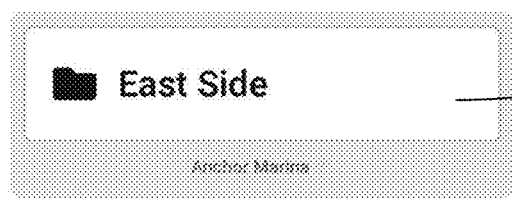
7802
Group name
East Side|
7804
Group details
| Date created | 2021-02-10, 9:41 AM |
|---|---|
| Marina | Anchor Marina |
| Docks | 6 |
| Commissioned pedestals | 33 |
| Decommissioned pedestals | 2 |
7806
7808
FIG. 43A

7800

< Edit group

Move content?

How do you want to handle the 6 docks and 33 pedestals within "East Side"?

Move content to another group

Choose — 7810

Move Content — 7812

———— OR ————

⚠ Delete Content — 7814

< Delete group

Where do you want the content of "East Side" to be moved to?

Anchor Marina /

| | |
|---|---|
| ⚠ East Side | Pending delete |
| 🗀 West Side | > |
| 🗀 Yacht Docks | > |

7816

( Add a new group ) — 7818

< East Side

Anchor Marina / East Side /

⚓ East Dock 1

| | |
|---|---|
| ⛽ Pedestal E101 | > |
| ⛽ Pedestal E102 | > |
| ⛽ Pedestal E103 | > |
| ⛽ Pedestal E104 | > |
| ⛽ Pedestal E105 | > |
| ⛽ Pedestal E106 | > |
| ⛽ Pedestal E107 | > |

8000
< Edit dock
Move content?
How do you want to handle the 7 pedestals within "East Dock 1"?
Move content to another dock
Choose — 8016
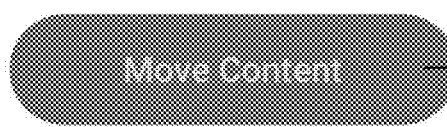 — 8018
———————— OR ————————
⚠ Delete Content — 8020
FIG. 45C

8100

8200
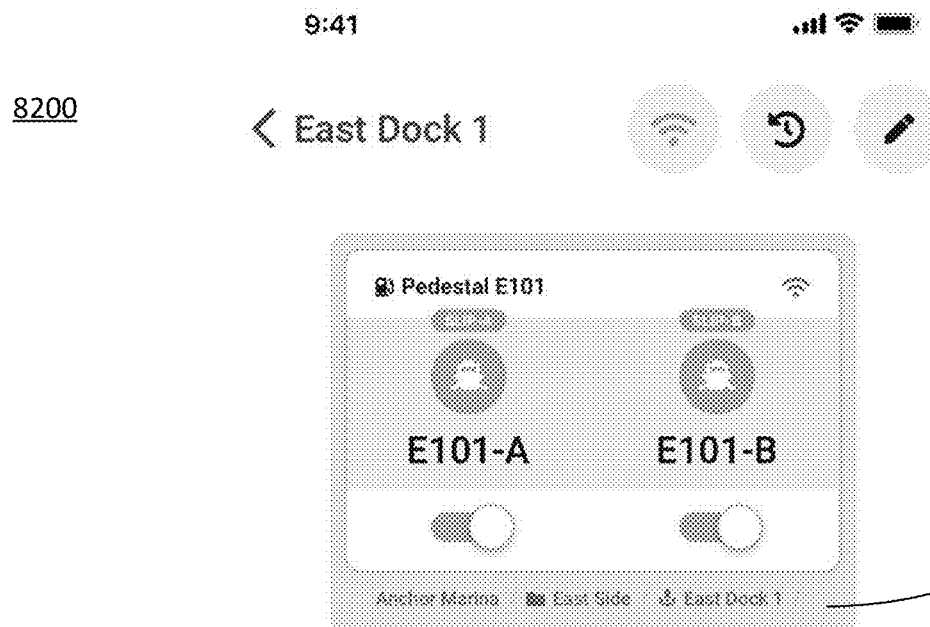
8202
Pedestal details
| Date commissioned | 2021-02-10, 9:41 AM |
| Serial number | 000000111 |
| Type | Hurricane |
| Group | East Side |
| Dock | East Dock 1 |
8204
Slip-A's boat details   Eject boat
| Boat's name | Titanic |
| Docked since | Jan 27, 2021 @ 4 |
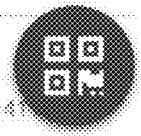
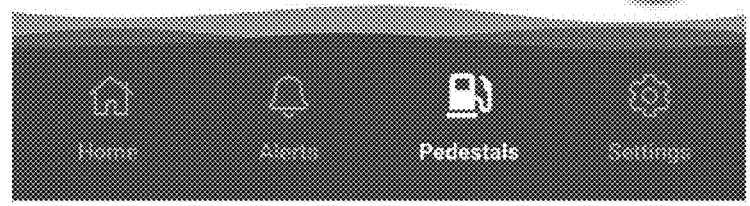
FIG. 47A

USER INTERFACE CONTROL SERVER AND METHOD FOR REMOTE CONTROL MANAGEMENT OF MARINE DOCK ELECTRIC CHARGING STATIONS

PRIORITY CLAIM

The present application claims the benefit of priority of U.S. Provisional Patent Application Ser. No. 63/216,274, titled "User Interface Control Server and Method for Remote Control Management of Marine Dock Electric Charging Stations," filed Jun. 29, 2021, which is incorporated herein by reference.

FIELD

Embodiments relate to an electric charging station configured to provide power from a power source to a marine vessel or a vehicle (e.g., a boat or an electric marine vehicle). In addition, various embodiments relate to a user display device and a user interface control server and method for interfacing with a marine dock electric charging station.

SUMMARY

In one embodiment, a marine power pedestal is configured to connect to a mobile device. The power pedestal comprises a main body, one or more electrical power units disposed in the main body and configured to conduct power to a marine vessel, one or more display screens, one or more sensors. A controller is including a network interface configured to communicate with a mobile device via a communication network, transmit data to a server via the communication network, and execute commands received, via the communication network, from the server or the mobile device.

In another embodiment, a method of associating a power pedestal with a slip comprises establishing, at the power pedestal via a communication interface, a connection with a computing device associated with an authorized user. The power pedestal executes a commissioning command from the computing device associated with the authorized user and receives a slip ID from the computing device associated with the authorized user. The slip ID is then associated with the power pedestal.

In another embodiment, a non-transitory, computer-readable medium contains instructions that, when executed by a controller of a power pedestal, are configured to perform a set of functions, the set of functions comprising establishing a connection, via a communication interface of the controller, with a computing device associated with an authorized user. The instructions cause the controller to execute a commissioning command from the computing device associated with the authorized user and receive, via the communication interface of the controller, a slip ID from the computing device associated with the authorized user. The instructions then cause the controller to associate the slip ID with the power pedestal.

Other aspects will become apparent by consideration of the detailed description and accompanying drawings.

BRIEF DESCRIPTION OF THE DRAWINGS

FIG. 1 is a first perspective view of a marine electric charging station according to one embodiment, the marine electric charging station including a removable head assembly and a pedestal assembly.

FIG. 2 is a second perspective view of the marine electric charging station of FIG. 1.

FIG. 3 is a first side view of the marine electric charging station of FIG. 1.

FIG. 4 is a second side view of the marine electric charging station of FIG. 1.

FIG. 5 is a third side view of the marine electric charging station of FIG. 1.

FIG. 6 is a fourth side view of the marine electric charging station of FIG. 1.

FIG. 7 is a bottom view of the marine electric charging station of FIG. 1.

FIG. 8 is a top side view of the marine electric charging station of FIG. 1.

FIG. 21A is an electrical schematic of a portion of the marine electric charging station of FIG. 14.

FIGS. 23A and 23B shows database tables in accordance with various embodiments of the disclosure.

FIGS. 24A-24L show various user interface screens in accordance with various embodiments of a dockmaster mobile application.

FIGS. 25A-25F show various user interface screens in accordance with various embodiments of an end user mobile application.

FIG. 29 shows a login screen of the dockmaster mobile application according to an embodiment of the disclosure.

FIG. 31A-31C show alert reporting and handling screens of the dockmaster mobile application according to various embodiments of the disclosure.

FIG. 35A-35K show pedestal commissioning screens and overlays of the dockmaster mobile application according to various embodiments of the disclosure.

FIG. 41A-41C show pedestal editing screens of the dockmaster mobile application according to various embodiments of the disclosure.

FIG. 43A-43C show pedestal group editing screens of the dockmaster mobile application according to an embodiment of the disclosure FIG. 44 shows a pedestals-per-dock screen of the dockmaster application mobile according to an embodiment of the disclosure FIG. 45A-45C shows edit dock screens of the dockmaster mobile application according to various embodiments of the disclosure.

FIG. 47A-47C collectively show an example of the dockmaster mobile application failing to connect to a pedestal.

DETAILED DESCRIPTION

Figure 9:
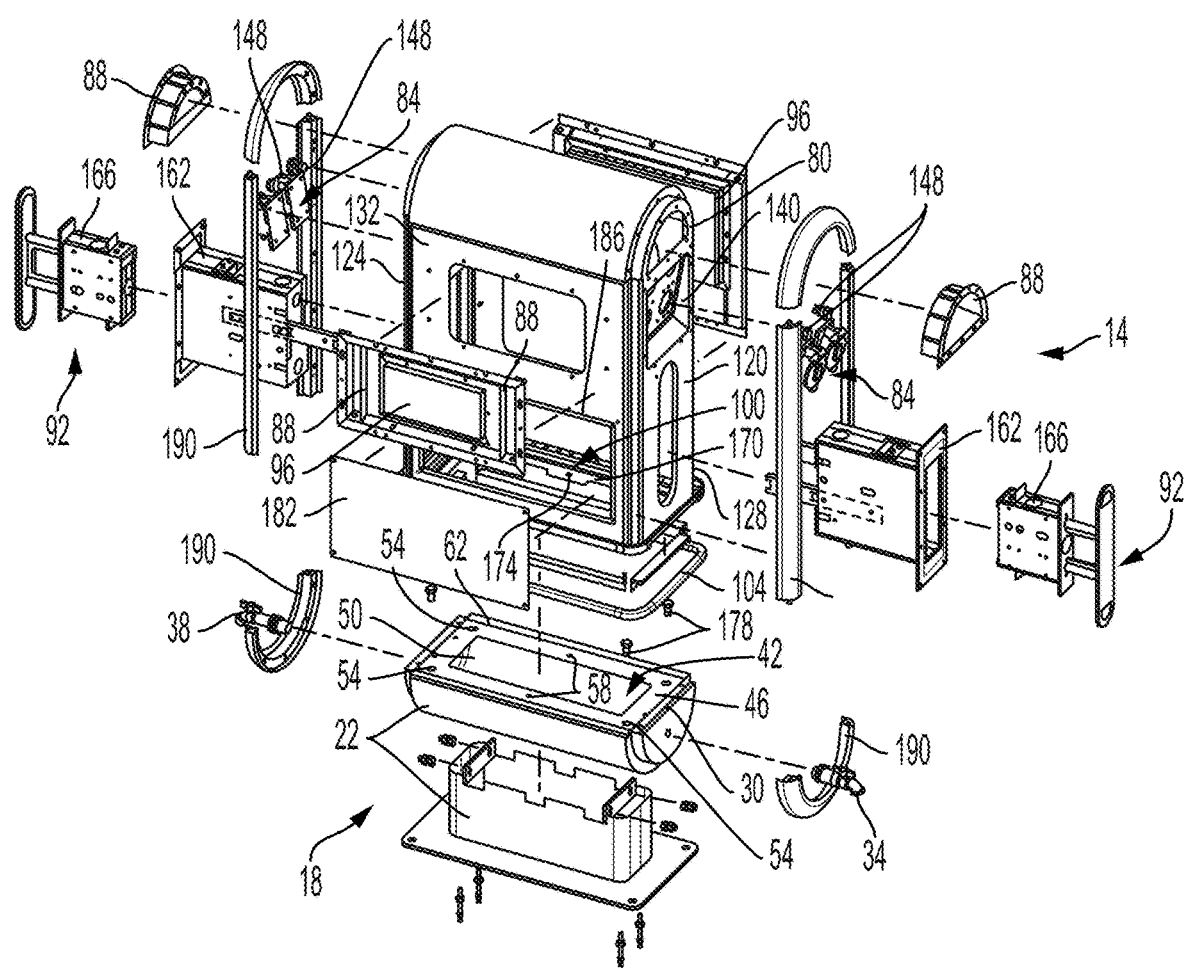
FIG. 9 is an exploded view of the marine electric charging station of FIG. 1.
Figure 10:
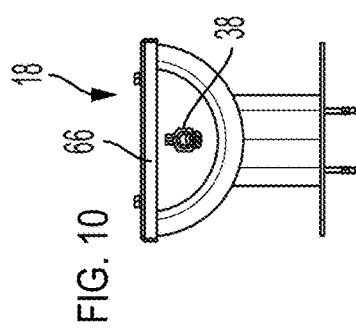
FIG. 10 is a first or second side view of the pedestal assembly of FIG. 1.
Figure 11:
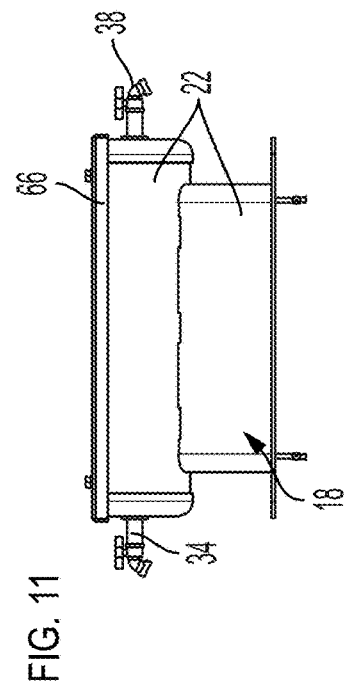
FIG. 11 is a third or fourth side view of the pedestal assembly of FIG. 1.
Figure 12:
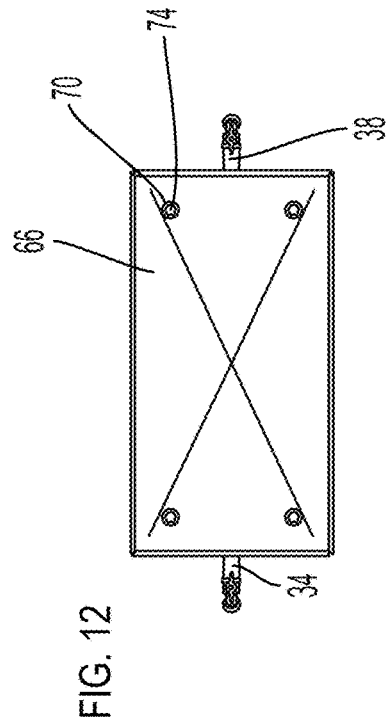
FIG. 12 is a top view of the pedestal assembly of FIG. 1.

Before any embodiments are explained in detail, it is to be understood that the application is not limited in its application to the details of construction and the arrangement of components set forth in the following description or illustrated in the following drawings. Other embodiments, than those described below, are capable of being practiced or of being carried out in various ways.

FIGS. 1-9 illustrate a marine electric charging station 10 according to one embodiment. The marine electric charging station (or power assembly) is configured to communicate (e.g., provide electrical power and/or water) from an electric power source 12a and/or a water source 12b (e.g., a dock or the ground) to a device (e.g., a vessel or vehicle) positioned adjacent and nearby the electric charging station 10. For example, the marine electric charging station 10 may be watertight or waterproof and may be configured to communicate (e.g., provide power and/or water) from the shore (e.g., a dock or the ground) to a marine vehicle or vessel positioned adjacent the shore (e.g., adjacent a dock located at the shore). In another example, the electric charging station 10 may be configured to communicate (e.g., provide electrical power) to a different type of electric or hybrid vehicle positioned adjacent the shore (e.g., an electric or hybrid car). The electric charging station 10 defines a longitudinal axis A (FIGS. 3, 5) and includes a head or main body assembly 14 that is removably coupleable to a base or pedestal assembly 18 along the longitudinal axis A. The electric charging station 10 is configured to serve two slips in a marina or other suitable location, as will be discussed in greater detail below.

As shown in FIG. 1, the base assembly 18 accommodates the power source 12a and the water source 12b and includes a support member 22 with a first end 26 that is coupleable (e.g., by fasteners or the like) to a support surface (e.g., the ground or a dock) and a second end 30 that is positioned opposite the first end 26. In some embodiments, the power source 12a may be in communication with a switch (e.g., a contactor or an electrically-controlled switch) positioned in an electrical device mounted in the head assembly 18. The switch can shut off power to the head assembly 18 when the electric charging station 10 is disassembled (e.g., for seasonal or inclement weather reasons). In the illustrated embodiment, the support member 22 includes a first portion and a second portion that are coupled together, but in other or additional embodiments, the support member 22 may be one unitary (e.g., integrally-formed) piece. As shown in FIGS. 6 and 9-13, the support member 22 includes a first valve 34 and a second valve 38, each of which can be used to provide a fluid, such as water (or another liquid such as gasoline) from a water source 12b (e.g., from the shore or a well) to the vessel. A coupling mechanism 42 is positioned within the support member 22. The coupling mechanism 42 is used to attach/remove the head assembly 14 to/from the based pedestal assembly 18.

Figure 13:
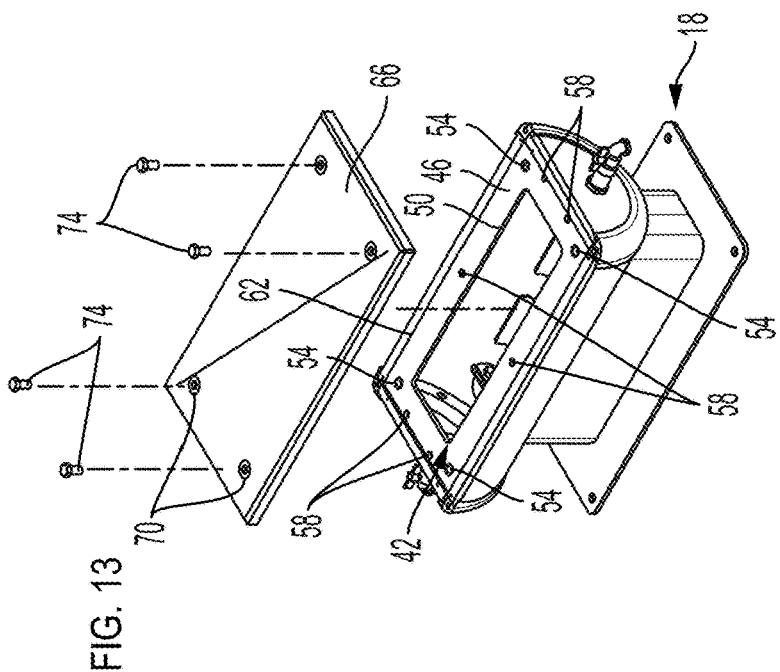
FIG. 13 is an exploded view of the pedestal assembly of FIG. 1.

As shown in FIGS. 9 and 13, the coupling mechanism 42 includes a body 46 that has a central aperture 50 extending therethrough parallel to the longitudinal axis A, a first plurality of apertures 54 extending therethrough parallel to the longitudinal axis A, and a second plurality of apertures 58 extending therethrough parallel to the longitudinal axis A. In the illustrated embodiment, the first plurality of apertures 54 includes four circular, threaded apertures that are positioned adjacent corners of the body 46 (shown as a rectangular body 46), but in other or additional embodiments, the apertures may have any suitable number, shape, or orientation relative to the body. In the illustrated embodiment, the second plurality of apertures 58 includes at least two circular, threaded apertures that are positioned at other locations in the body 46 (e.g., along longer sides of the rectangular body 46, such as at or near the center of the longer sides). The coupling mechanism 42 may have a plate like shape with the above-noted apertures. The second end 30 extends beyond the coupling mechanism 42 to create a lip 62. The lip 62 may surround the coupling mechanism 42. The support member 22 is hard wired to provide power to the base assembly 18 (however power induction/wireless charging may be used). The base assembly 18 may be formed from steel (e.g., stainless steel), aluminum, a combination of steel and aluminum or any other suitable material. In some embodiments, such as those illustrated herein, the base assembly 18 includes a foot or mounting structure that serves as the connection between a surface of the marina pier and the base assembly 18.

With respect to FIGS. 10-13, the base assembly 18 further includes a cover 66 that is removably coupleable to the support member 22 (e.g., when decommissioned because not in use for a longer duration, such as the off season). The cover 66 includes a plurality of circular through-holes 70 that align with the first and/or second pluralities of apertures of the coupling mechanism 42 discussed above. For example, each of the through-holes 70 may correspond to (align with) one of the first plurality of apertures 54 in the coupling mechanism 42. For example, fasteners 74 (e.g., screws or the like) are received by the through-holes 70 and apertures 54 to couple the cover 66 to the support member 22 when the pedestal assembly 14 is decommissioned. In some embodiments, the cover 66 may include a gasket or other seal member to make the assembly fluid-tight or waterproof. Accordingly, the cover 66 seals the base assembly 18 when the pedestal assembly 14 is removed during seasonal or inclement weather. The cover 66 may be formed from steel (e.g., stainless steel) or any other suitable material. When either the head assembly 14 or the cover 66 is coupled to the base assembly 18, the base assembly 18 is fluid-tight (e.g., substantially prevents the ingress of water or other fluids).

With renewed respect to FIGS. 1-9, the head assembly 14 includes a main body (or frame) 80, a plurality of electrical power units 84, a plurality of illumination devices 88, one or more cord management devices 92, one or more display screens or indicators 96, a coupling mechanism 100, and a sealing mechanism 104. In the illustrated embodiment, the head 80 further includes a curved portion or dome. In some embodiments, the dome is removably coupled to the head 80. The pedestal assembly 14 is configured to physically and electrically communicate with the base assembly 18. Accordingly, positioned within the head 80 are one or more wires (not shown) that are selectively coupled to wires (not shown) in the base assembly 18, which are in communication with the power source 12a. An electronics control module 106 is positioned within the main body 80, as well, and includes a control board that has a controller 108, which is configured to communicate with the power source 12a and the water source 12b when the head pedestal assembly 14 and base assembly 18 are coupled to one another. As shown in greater detail in FIG. 21B, the control board may be a System on Module (SOM) and/or System on Chip and may be configured to receive (e.g., via a central processing unit (CPU) of the SOM/SOC) various signal (e.g., analog signal). The SOC/SOM may also be referred to as the control board or the pedestal control board as discussed below. When reference is made in this disclosure to a processor, controller or CPU, it may refer to a processor, controller or CPU of the SOC/SOM. The electronics control module 106 may further include a memory 107 that is in communication with the controller 108. The controller 108 is also configured to communicate with the electrical power units 84, the illumination devices 88, and the display screens 96. Each of the electrical power units 84 may correspond to an electrical outlet (e.g., AC receptacle, a DC receptacle, a universal serial bus (USB) receptacle) is also in electrical communication with a current transducer 110, which measures the amount of electricity provided via the respective power units 84. Each current transducer 110 is also in communication with the controller 108, and the controller monitors the amount of electricity provided via the respective power units 84 and measured by the current transducer 110. Similarly, flow meters (e.g., flow meter sensors) 111 are in communication with each of the first and second valves 34, 38. The flow meters 111 each measures the amount of liquid (e.g., water) provided via the respective first and second valves 34, 38. Each flow meter 111 is also in communication with the controller 108, and the controller 108 monitors the amount of liquid (e.g., water) provided via the respective valve 34, 38 and measured by the flow meter 111. The main body 80 may be configured to communicate wirelessly with other devices (e.g., mobile devices, remote servers, etc.) via a communication interface of the controller 108. For example, the communication interface of the controller 108 may be equipped with a mesh wireless network capability. In some embodiments, the wireless network hardware (e.g., wireless network repeaters, wireless network routers, antennae, etc.), at least a portion of the electronics module (e.g., the controller 108) or both may be positioned in a dome of the main body 80. In some embodiments, the controller 108 may be in communication with a back-up power source (e.g., 10 Ah (10 amp hour) lithium-ion battery) to support at least the illumination devices 88, if not the other electrical components as well. In some embodiments, the back-up battery capacity can support one hour of loss of utility power (e.g., from the main power source). The controller 108 may further be coupled to a safety switch that will open the contactor upon separation of the head or main body assembly 14 from the base assembly 18.

The head assembly 14 may be formed from aluminum or any suitable material. In some embodiments, the dome may be a different material than the rest of the main body 80. For example, in some embodiments, the dome may be constructed of plastic (e.g., or other radio frequency (RF) transparent material) whereas the rest of the main body 80 is constructed of metal. In some embodiments, the dome may house a radio-frequency interference (RFI)-shielded enclosure that is configured to receive at least the controller 108. For example, the controller 108 may be located in the dome. Other suitable materials for the main body 80 and the dome are within the scope of this disclosure. Also, like the base assembly 18, the head assembly 14 may include a gloss or color (e.g., a user-reparable finish) on outer surfaces that is capable of withstanding the elements. That is, the electric charging station 10 (or pedestal assembly) can withstand at least 2,000 hours without a change in color or gloss that is typical as a result of salt and ultraviolet light.

In the embodiment of FIGS. 1-13, the main body 80 includes a first end 112, a second end 116 opposite the first end 112, a first side 120, a second side 124 opposite the first side 120, a third side 128, and a fourth side 132 opposite the third side 128. The sides 120, 124, 128, 132 extend between the first and the second ends 112, 116. The first end 112 is configured to be coupled to the second end 30 of the base assembly 18, which will be discussed in greater detail below. The second end 116 is closed and may be where the dome discussed above is located.

As shown in FIGS. 3, 4, and 9, one set of power units 84 (e.g., two power units 84) are positioned on each of the first and the second sides 120, 124. Moreover, one of the water valves 34, 38 is positioned on the first side 120 and the other of the water valves 34, 38 is positioned on the second side 124. Accordingly, the power assembly 10 may be positioned on a surface of the marina dock in between two boat slips, such that one set of power units 84 and a water valve 34, 38 is accessible to each slip. As shown in at least FIGS. 3 and 4, the power units 84 are positioned within recesses 140, 144 in each of the first and second sides 120, 124. The power units 84 are modular (e.g., interchangeable or customizable) and may include any suitable interface (e.g., terminal configuration) and power rating (e.g., current, voltages, and/or wattages). For example, the plurality of modular power units 84 may have connectors (e.g., outlets) that include one or more of a 15 A 120V AC connector, a 30 A 125V connector, a 30 A 120V AC connector, 50 A 125V/250V connector, 50 A 120/240V AC connector, or have any other suitable power rating. The connectors may also include U.S. standard marine-grade outlets, other marine-grade outlets, or another suitable outlet type. Also, one or more of the power units 84 may be suitable for an electric vehicle charger. Moreover, one or more of the power units 84 may include an inductive charger. The power units 84 may include the same type of power unit or different types of power units. Moreover, one or more of the power units 84 may include a ground-fault circuit interrupter (GFCI) as well. In an embodiment, each power unit 84 includes a 30 mA GFCI.

Another embodiment of the electric charging station 210 with power units 284 is discussed in greater detail below with regards to FIGS. 14-21. The power units 284 of FIGS. 14-21 may be configured in the same or similar way as the power units 84 of FIGS. 1-13 discussed above and thus only aspects that may be different are discussed below.

Additionally, an actuator or button 148 for each power unit is positioned in the respective recesses and adjacent to the power unit 84 to actuate the respective power unit 84 once a mating interface of a plug of the vessel is physically and electrically coupled to the respective power unit. The actuators 148 may include an illumination device that illuminates the actuator 148 and the illumination device may surround or be positioned behind the actuator 148. In some embodiments, the illumination device may display a first color (e.g., green) when the connector/power unit is energized and a second color (e.g., red) when the connector/power unit is de-energized. The actuator 148 may also be used to stop the respective power unit 84 in the event of an emergency. That is, the actuator 148 may be an emergency stop button (which is referenced below with regards to emergency alert generation). In other embodiments, an additional actuator (e.g., an emergency stop actuator, a "Assistance Requested" actuator, or a "Call Button" actuator, etc.) may be positioned separately from the actuator 148 and be used to stop the respective power unit 84 in the event of an emergency, and/or an emergency stop actuator may be provided that is used to power down (de-energize) the entire electrical charging station (such that no power is provided). The emergency stop actuator may be configured to de-energize all power (e.g., AC power) to the head assembly 14 of the electric charging station 10. When activated, the emergency stop actuator may transmit a signal to the controller 108, and the controller 108 may generate a notification (or alert) and transmit the notification or alert, via a network interface of the controller 108, to an electronic device (e.g., server) associated with a dockmaster or captain (end user) app, and/or flash some or all of the illumination devices 88 (e.g., the emergency lights in a red color). Actuation of the emergency stop actuator may override all other commands. The emergency stop actuator may be a physical button on the head assembly, a virtual button on one of the display screens, or button on a user interface screen on a user's mobile device, as discussed in greater detail below, according to various embodiments. Moreover, a "Assistance Requested" actuator or a "Call Button" actuator may be incorporated in addition to or instead of the emergency stop actuator. The user interface functionality described below with regards to the emergency stop actuator is also applicable to the "Assistance Requested" or the "Call Button" actuator.

Additionally, one cord and hose management mechanism 92 is positioned on each of the first and second sides 120, 124. In the illustrated embodiment (e.g., FIG. 9), each of the cord and hose management mechanisms 92 includes a housing 162 positioned within the main body 80 and a holder 166 selectively positioned within a housing 162. The holder 166 may be biased (e.g., by a spring), telescopically, or otherwise translatably or slideably coupled within the housing 162. Accordingly, the cord and hose management mechanism 92 can have a first position in which the holder 166 is positioned within the housing 162 (and therefore the main body 80) and a second position in which the holder 166 is removed (i.e., positioned outside of and spaced apart from the housing 162 (and therefore also removed from the main body 80). In the second position, the holder 166 can accommodate a cord, a rope, or a hose.

As shown in FIGS. 5 and 6, one or more display screens may be provided (e.g., a screen 96 is positioned on each of the third and fourth sides 128, 132). Both display screens 96 are configured to be in communication with the controller 108 and the controller 108 may control or otherwise cause the display screens 96 to display information, such as targeted advertisements, the weather, etc., as discussed in more detail below. The display screen 96 is configured to change what information is displayed. For example, the display screens 96 may display the location or name of the marina, the status of a plurality of modular power units (e.g., what type is currently connected or "none"), the time, emergency alters, weather forecast, the temperature, or a combination thereof. Additionally or alternatively, as discussed in greater detail below, one or both of the display screens 96 may display advertisements to the user. The display screens 96 can include ownership or other indicia. In other or alternative embodiments, either of the display screens 96 may display other or additional information than shown and described herein. In addition, the information displayed by the display screen may change (e.g., an advertisement could be displayed for a first amount of time, and then a main pedestal display screen, including some of the information discussed above, may be displayed for a second amount of time).

As shown in FIGS. 1-9, the main body 80 includes illumination devices 88 on each of the sides 120, 124. The illumination devices 88 may be adjacent the first end 112, the second end 116 (or dome end) or both (e.g., two illumination devices on each side). The second end 116 may include a dome that illuminates or that has additional illumination devices. In addition, sides 128, 132 may include illumination devices. In the illustrated embodiments, the illumination devices 88 are light-emitting diodes (LEDs), but in other or additional embodiments, other suitable illumination devices may be used. The illumination devices 88 serve to illuminate the electric charging station 10, the features of the electric charging station (e.g., the power units), and for emergency lighting. In some embodiments, the illumination devices may include 24V DC LEDs and related suitable equipment. In some embodiments, the illumination devices 88 may be proximity lights, emergency lights, a logo light, or a combination of these. Proximity lights, for example, may include an LED strip lighting that is intended to provide general area illumination and is intended to be in use from dusk until dawn. Emergency lights, for example, may include LED illumination that is intended to be in use in the event of a breaker trip, loss of utility power, or in the event of a press of the emergency actuator. The emergency lights may have a red color. A logo light may include LED illumination behind an engraved panel bearing the logo of the marina at which the pedestal is installed. The logo light is intended to be in use from dusk to dawn. In general, most or all of the illumination devices 88 may be also or alternatively be dimmed or shut off completely at night.

As discussed in greater detail below, the illumination devices 88 may be controlled remotely. The pedestal board communicates through wireless communications to a server on the Internet. The illumination devices may use a wired or wireless connection (e.g., Bluetooth or Near-Field Communication (NFC) or even Wi-Fi). Additionally or alternatively, the illumination devices 88 may be controlled, via instructions sent from the controller 108, based on pre-programmed rules saved in the memory 107 of the electronics control module 106 of the controller 108. Additionally or alternatively, the illumination devices 88 may be controlled, via instructions sent from the controller 108, based on sensed ambient conditions (e.g., via a photocell, a "dusk to dawn" switch), via sensors in communication with the controller 108. Additionally or alternatively, the illumination devices 88 may be controlled, via instructions sent from the controller 108, based on information provided by a timer (not shown) in communication with the controller. Additionally or alternatively, the illumination devices 88 may be manually controlled by one more actuators (not shown), switches (not shown), or a mobile application, as discussed in greater detail below.

As shown in FIG. 9, a coupling mechanism 100 of the head assembly 14 includes a lip or flange 170 that has a plurality of through holes 174 (only one of which is shown). Each of the through-holes 174 correspond to an aperture 54, 58 in the coupling mechanism 42 of the base assembly 18. Fasteners 178 (e.g., screws or the like) are received by the through-holes 174 and apertures 54, 58 to couple the main body 80 to the support member 22 of the base assembly 18 when the head assembly 14 is in use (or available for use (i.e., not de-commissioned)). Fasteners 178 may couple the apertures 54 to a corresponding aperture 178 in the flange 170, the apertures 58 to corresponding apertures 178 in the flange 170 or both apertures 54, 58. The through-holes 178 in the main body 80 are accessible through a removable panel 182 secured (e.g., by fasteners or the like) over an aperture 186 in the main body 80.

Moreover, the sealing device 104 (e.g., a gasket) seals the interface of the head assembly 14 and base assembly 18 to prevent moisture and debris from entering the interior of the electric charging station 10. Also, bumpers 190 (FIG. 9) formed from rubber or other suitable flexible material are coupled to the electric charging station 10.

In operation, the marine electric charging station 10 can provide electrical power via the plurality of power units 84 (e.g., from the shore to a vessel) and provide water via the first and second valves 34, 38 to a vessel. Users can derive information from the electric charging station 10, through a wireless network, via an application on a mobile device (such as the dockmaster application discussed below or one of the other apps). For example, as discussed in greater detail below, the vessel owners and/or captains can obtain customized content including but not limited to power status of the vessel, relative power and water consumption (as measured by the transducers 110 and the flow meters 111, respectively), alerts (e.g., power spike, water spike, emergency button alerts (the power and water spikes may be based on the measured values (measured by the transducers 110 and the flow meters 111 and sent to an owner's/captain's mobile application) being over a certain threshold, and other alerts, while dockmasters (e.g., marina owners) can have the same and additional control. The dockmaster application may include displaying customized content including but not limited to water reports (e.g., relative water consumption via the measurements obtained by the flow meters 111), electric power consumption reports (e.g., relative electricity consumption via the measurements obtained by the transducers 110), alerts (as discussed herein), operational statuses, power status and the like. When one of the actuators 148 or the emergency stop actuator is pressed to stop power from being provided to the respective power unit 84 (or to the entire head assembly 14), the one of the actuators 148 or the emergency stop actuator may communicate with the controller 108 to send an alert to either or both of the marina owner or the vessel owner/captain (i.e., the application where an associated marina owner/dockmaster or vessel owner/captain is logged in), as will be discussed in greater detail below.

With specific reference to the alerts for water and/or power spikes, the controller 108 may be configured to receive (e.g., via the central processing unit (CPU) of the SOM/SOC) a signal (e.g., analog signal) from one or more of the flow meters 111. For example, one or more water sensors that is configured to indicate the water level (e.g., amount of liquid), generate a water spike interrupt, and transmit to a cloud (notifies a cloud service via transmission to one or more servers discussed herein) when the water level rises from a low level to a high level (or based on rate of change). Likewise, rising edge detection may be used to generate and transmit a power spike interrupt (based on measured amount of electricity or rate of change). The water spike interrupt generation may be similar to the power spike interrupt in that it corresponds to a transition from a low state to a high state (a rising edge, a spike). A rate of change may also be used over a period of time (e.g., 30% change over 45 seconds).

As discussed in more detail below, the cloud (e.g., one or more remote servers) generates the alerts based on receiving of the interrupts from the SOC/SOM, which are then communicated to a mobile device (e.g., a smartphone) or PC of the dockmaster or captain/boat owner via one of the mobile or desktop applications discussed herein, as shown in the user interface screens. Although the alerts may be generated via the cloud (e.g., the servers), the alerts themselves could be generated by the SOC/SOM. Further, the threshold checking may occur on the SOC/SOM or on the server. According to various embodiments, a signal is transmitted to the SOM to set interrupts on pins to which the water sensors are connected. Every time a rising edge occurs, the server may be notified of an interrupt. For power, there is no interrupt generated since the power is read through an analog-to-digital converter (ADC). The ADC channel may be read after a certain duration of time, and the readings may be averaged before the data is pushed up to the cloud.

During the winter months or inclement weather (e.g., a hurricane or tropical storm), the head assembly 14 can be removed from the base assembly 18 and decommissioned. In particular, the main body 80 is disconnected from the support member 22 (e.g., the fasteners are unfastened and removed), the wires are decoupled, and the main body 80 is lifted off of the support member 22. When the head assembly 14 is removed from the base assembly 18, the cover 66 is coupled to the support member 22 and seals the base assembly 18.

Figure 14:
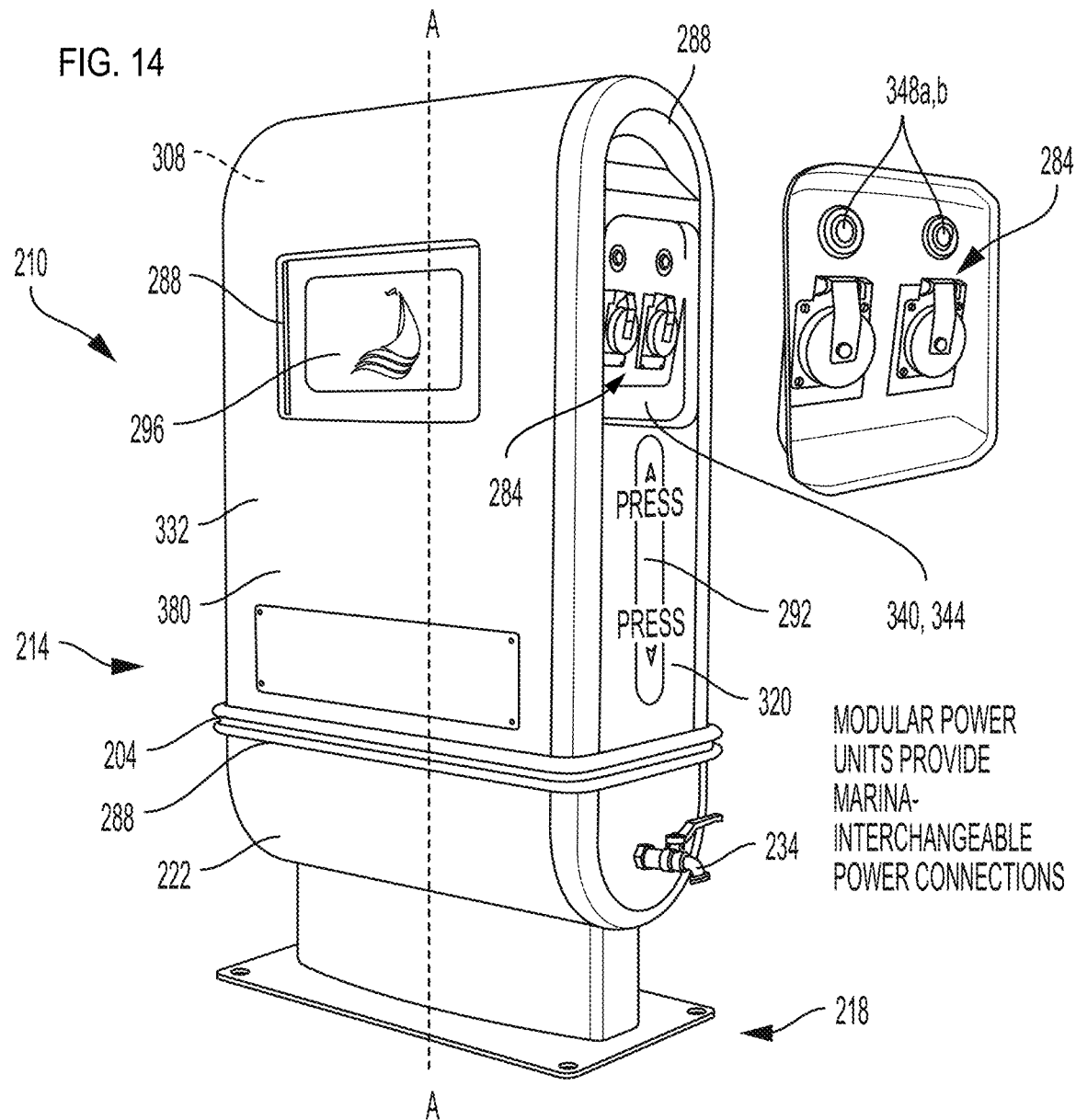
FIG. 14 is a perspective view of a marine electric charging station according to another embodiment.
Figure 15:
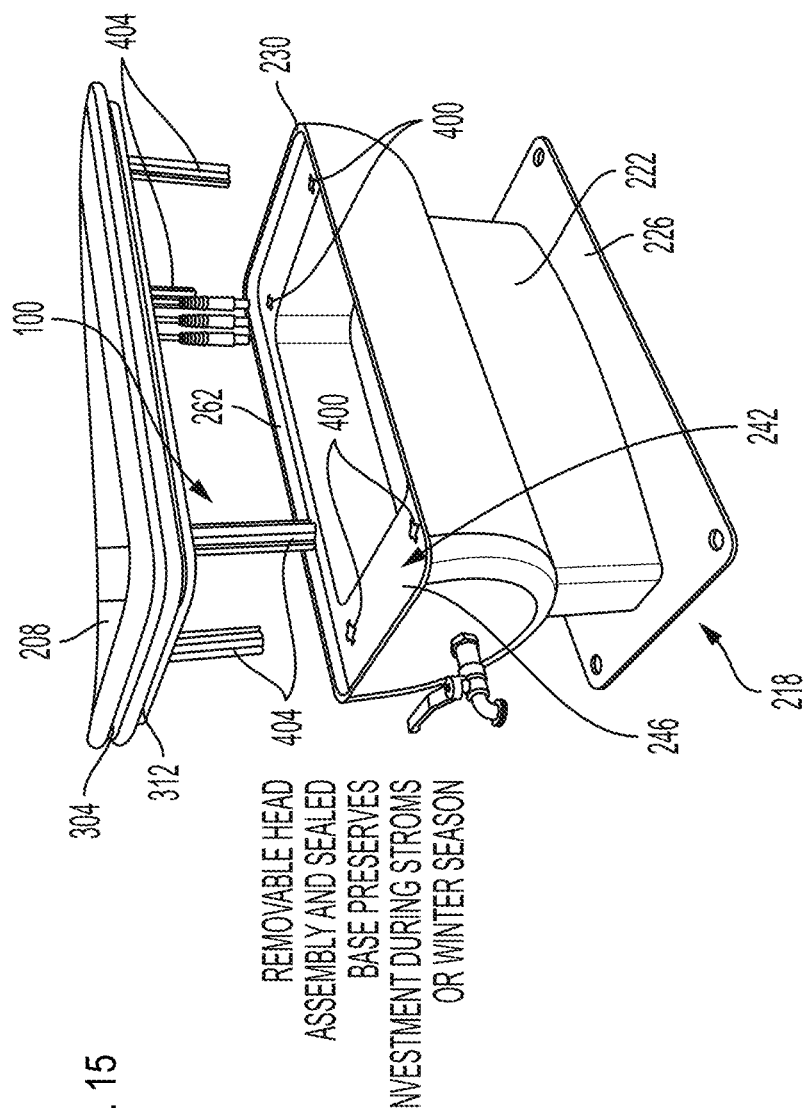
FIG. 15 is a detailed view of a portion of the marine electric charging station of FIG. 14.
Figure 16:
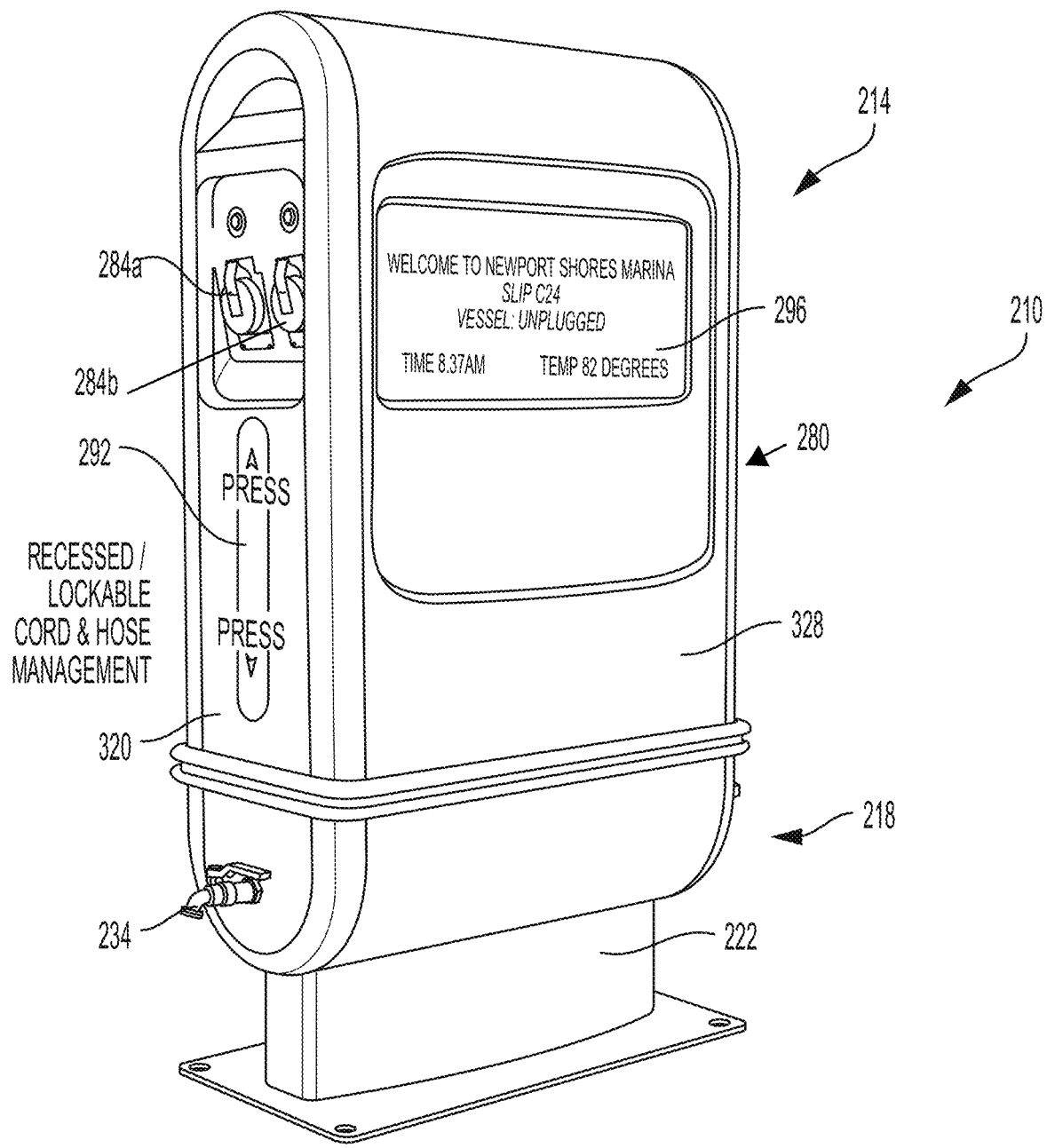
FIG. 16 is another perspective view of the marine electric charging station FIG. 14.
Figure 17:
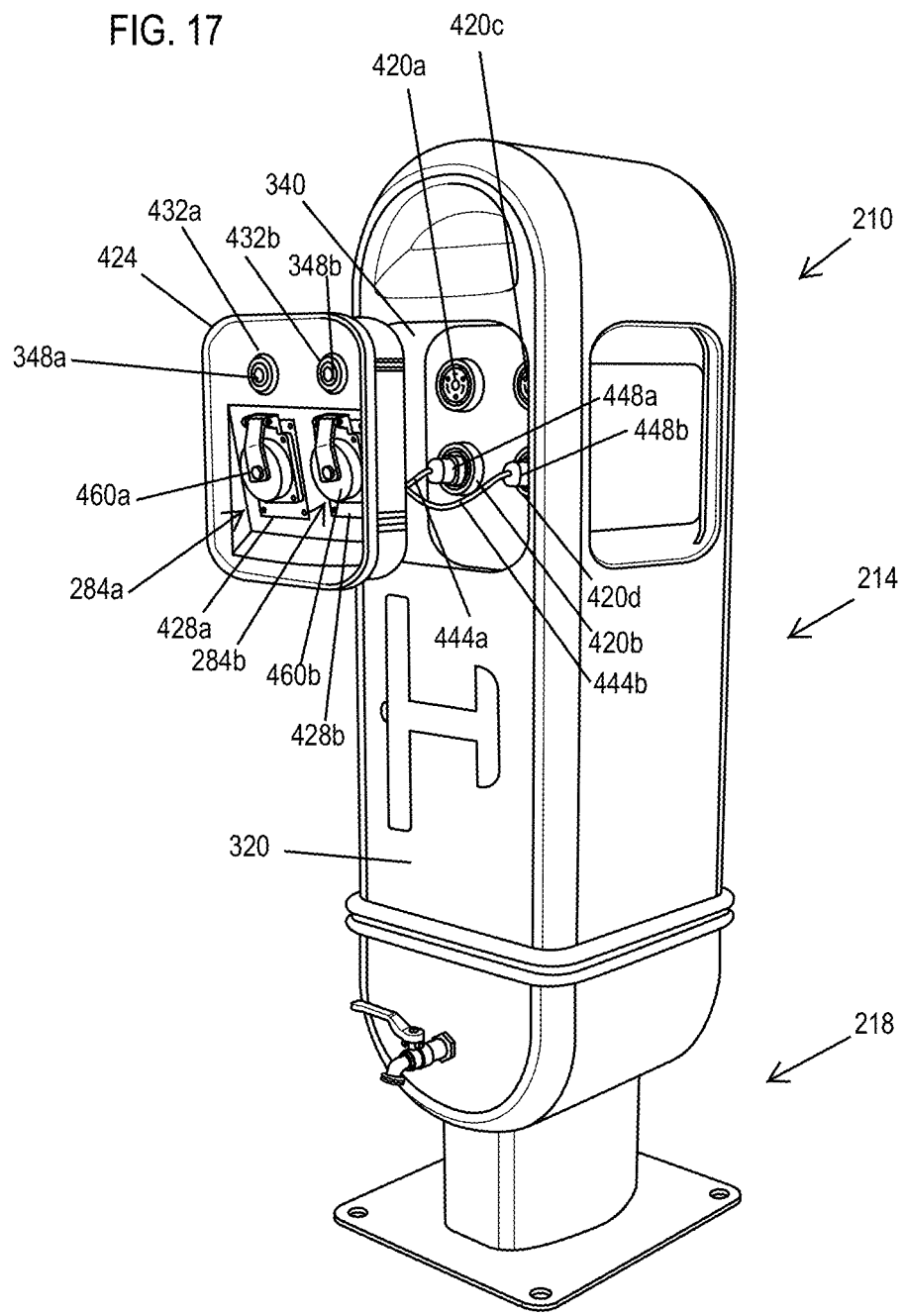
FIG. 17 is a partially exploded perspective view of the marine electric charging station of FIG. 14.
Figure 18:
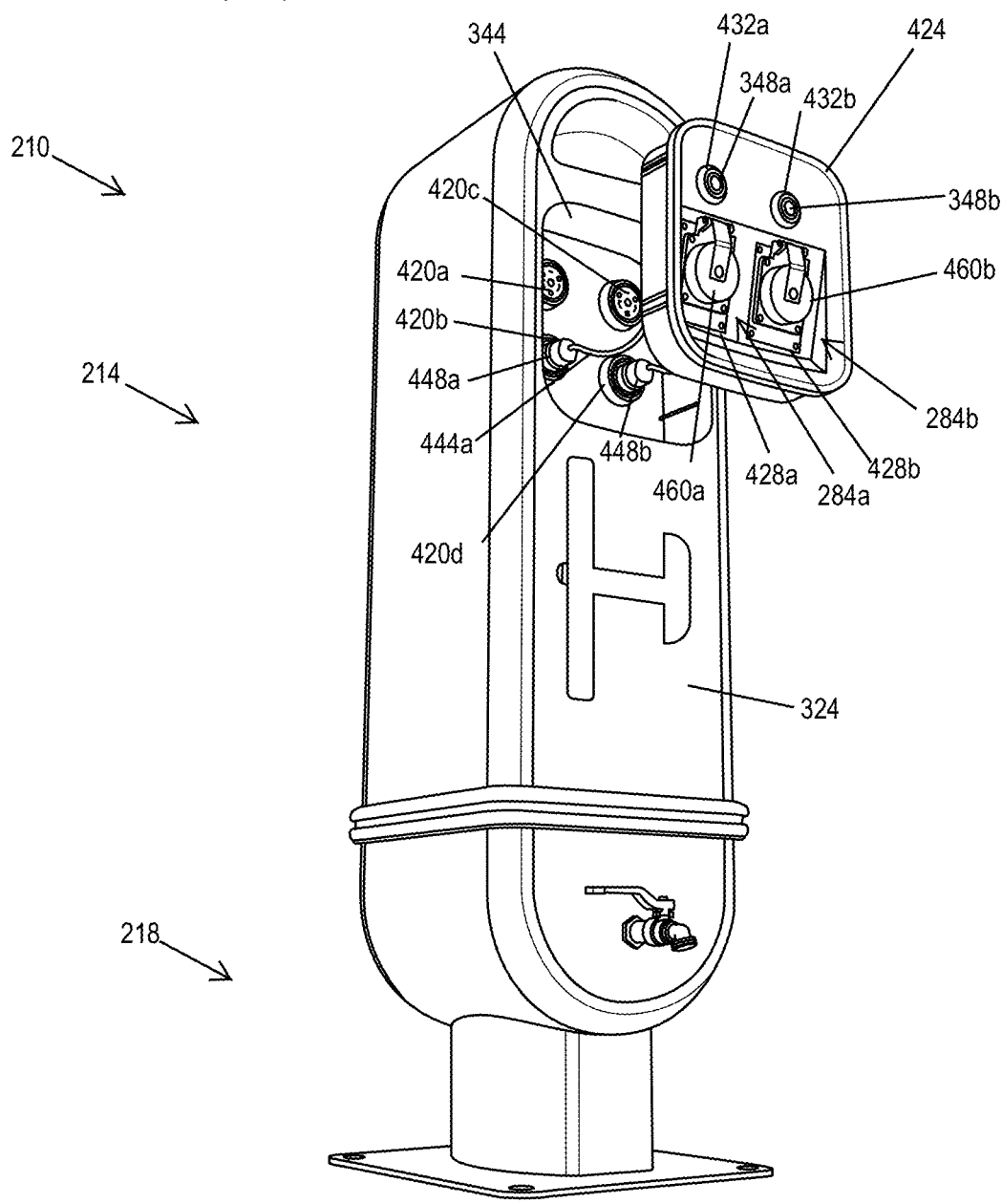
FIG. 18 is another partially exploded perspective view of the marine electric charging station of FIG. 14.
Figure 19:
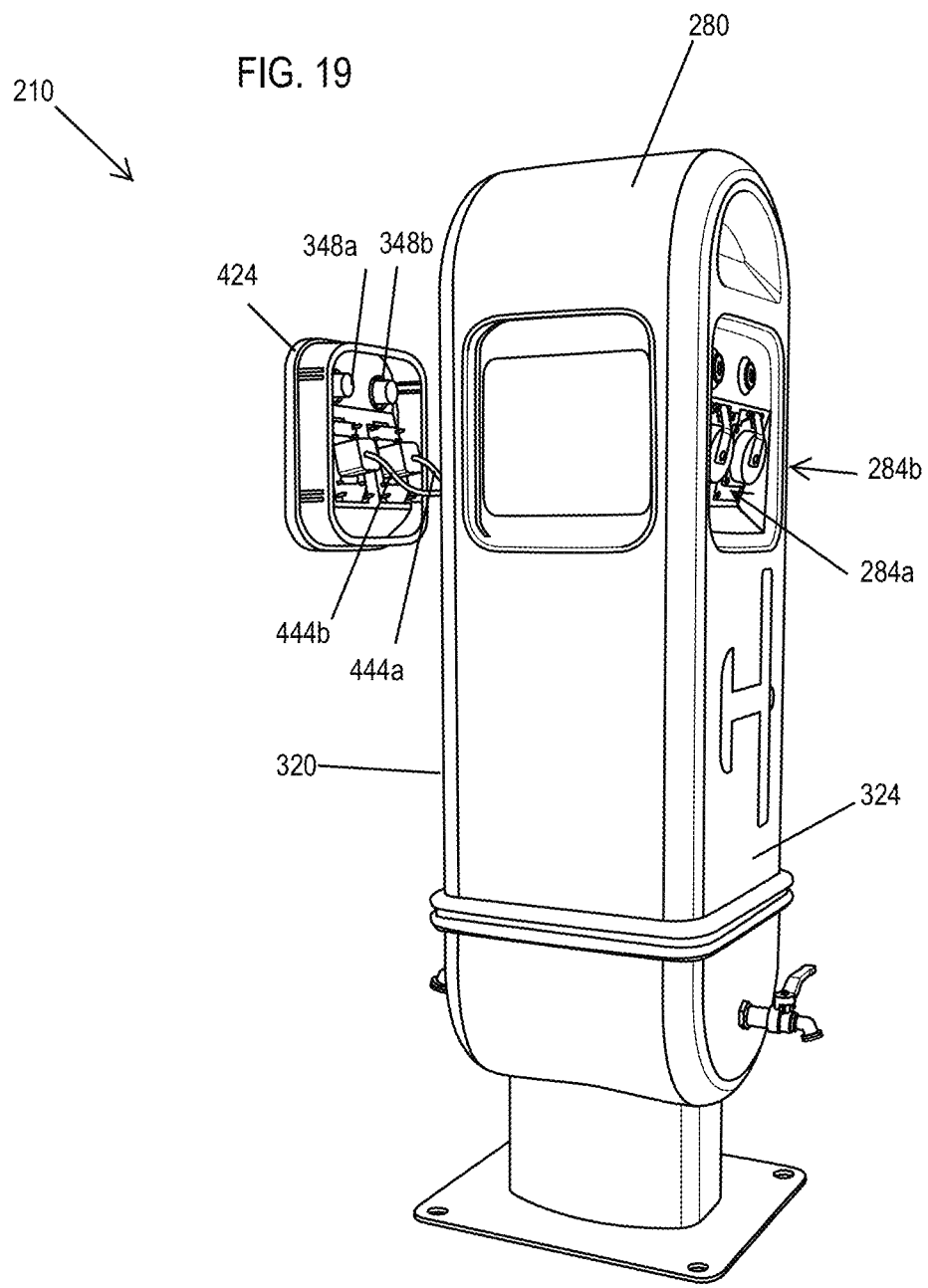
FIG. 19 is another partially exploded perspective view of the marine electric charging station of FIG. 14.
Figure 20:
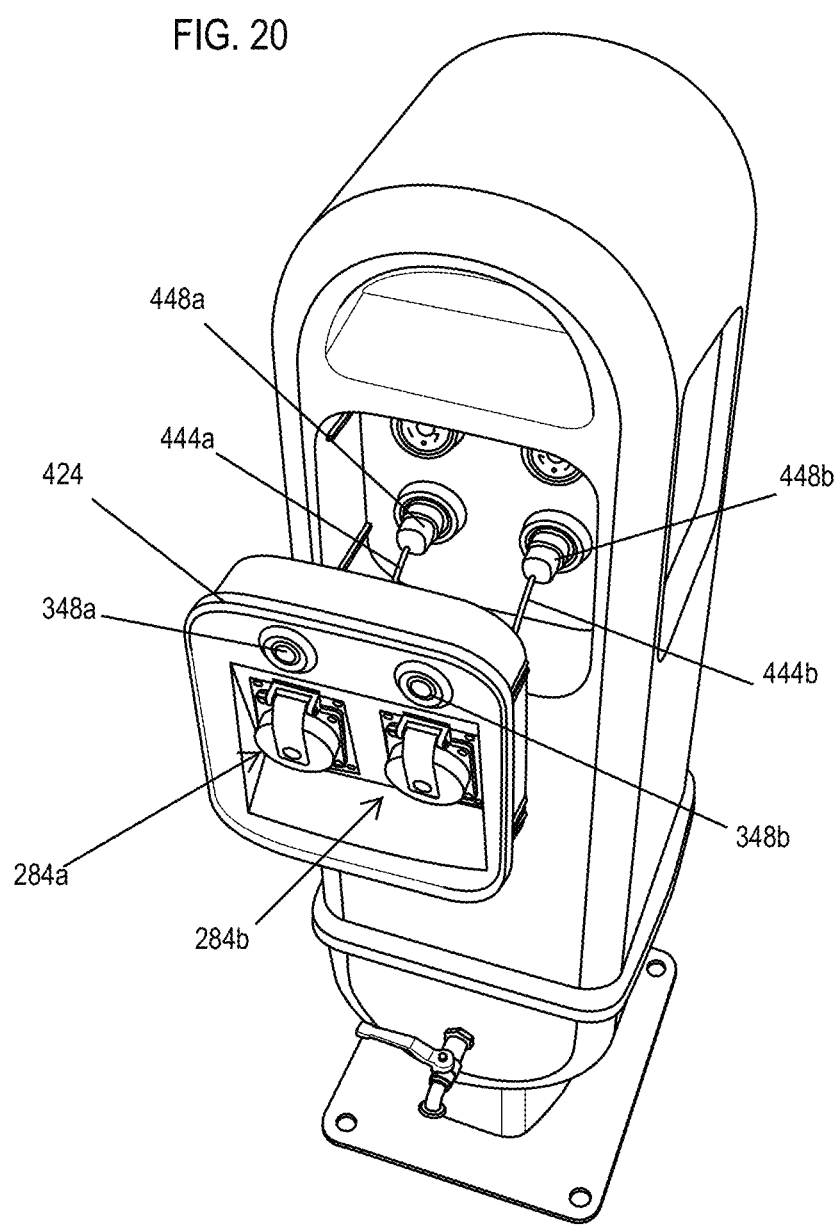
FIG. 20 is another partially exploded perspective view of the marine electric charging station of FIG. 14.

FIGS. 14-16 illustrate a marine electric charging station 210 according to another embodiment. With particular respect to FIG. 15, the coupling mechanism 242 of the base assembly 218 includes four polygonal-shaped apertures 400 that are positioned in adjacent corners of the body 246 and extend parallel to the longitudinal axis A. In other or additional embodiments, the apertures 400 may have any suitable number, shape, or orientation relative to the body 246. Similarly, the head assembly 214 includes four shafts or posts 404 that extend from the first end 212 and in parallel to the longitudinal axis A. Each of the posts 404 correspond to (align with) an aperture 400 in the coupling mechanism 242 of the base assembly 218. In the illustrated embodiment, the posts 404 have the same polygonal cross-section as the apertures 400 and are positioned in the corners. To couple the head assembly 214 to the base assembly 218, the posts 404 are inserted into the corresponding aperture 400 along the longitudinal axis. A. There may be a snap-fit engagement or interference fit between the posts 404 and the apertures 400.

In other or additional embodiments, the coupling mechanisms used to connect the head assembly 14, 214 and the base assembly 18, 218 may have any suitable configuration. For example, the coupling mechanisms have may be a snap fit connection, a tongue and groove connection, or an electromagnetic (e.g., radio-frequency identification (RFID)) connection, among other suitable coupling mechanisms.

With respect to FIGS. 17-21, a plurality of electrical connectors 420a-420d are positioned in each of the recesses 340, 344 and supported by the respective first and second sides 320, 324. Each of the electrical connectors 420a-420d is configured to be in communication with the controller 308 of the head assembly 214. In the illustrated embodiment, the plurality of electrical connectors 420a-420d includes a first electrical connector 420a, a second electrical connector 420b, a third electrical connector 420c, and a fourth electrical connector 420d. In the illustrated embodiment, the first and second electrical connectors 420a, 420b may include a first power rating (e.g., 30 A) and the third and fourth electrical connectors 420c, 420d may include a second power rating (e.g., 50 A). In other embodiments, each of the electrical connectors 420a-420d may have other or different power ratings (e.g., 30 A, 50 A, 100 A, 400 A, etc.). In the illustrated embodiment, each of the electrical connectors 420a-420d include the same interface (only two of which are shown). In other embodiments, the plurality of electrical connectors 420a-420d may include different interfaces.

Further with respect to FIGS. 17-20, on each of the first and second sides 320, 324 of the head assembly 214, a static plug board or switch board 424 is positioned adjacent to the plurality of connectors 420a-420d and interfaces with the connectors 420a-420d and covers the respective connectors. That is, the plug board 424 is integrally formed with or otherwise coupled to the head assembly 214 such that the switch board 424 forms part of each of the respective first and second sides 320, 324. The switch board 424 defines a first pair of openings 428a, 428b and a second pair of openings 432a, 432b. The first pair of openings 428a, 428b are each configured to removably receive a power unit 284a, 284b (e.g., receptacle or plug assembly). That is, a first receptacle assembly 284a is received and secured in the first opening 428a of the first pair of openings and a second receptacle assembly 284b is received and secured in the second opening 428b of the first pair of openings. Each of the first and second receptacle assemblies 284a, 284b includes an interface configured to receive a mating interface plug of the vessel and a wire or pigtail 444a, 444b in electrical communication with the interface. For each receptacle assembly 284a, 284b the pigtail 444a, 444b includes an electrical connector 448a, 448b on its distal end that has an interface that is configured to mate with one of the plurality of electrical connectors 420a-420d of the head 280. The pigtail 444a, 444b allows the flexibility to have different combinations of receptacle assemblies 284a, 284b with different interfaces and power ratings to be part of the power assembly 210.

The second pair of openings 432a, 432b receive and secure the micro-switch or actuator 348a, 348b. The actuators as described herein (e.g., actuators 348a, 348b) may be in electrical communication with circuit breakers, discussed in greater detail below, which connect to the connectors on the left side of the board shown in FIG. 21B. In particular, a first actuator 348a is received and secured in the first opening 432a of the second pair of openings, and a second actuator 348b is received and secured in the second opening 432b of the second pair of openings. The first actuator 348a is associated with the first receptacle 284a and the second actuator 348b is associated with the second receptacle 284b. The first and second actuators 348a, 348b are configured to toggle power on or off to the respective first and second receptacles 284a, 284b. The actuators 348a, 348b may also ensure that the power will be disconnected to the receptacle assemblies 284a, 284b should the service not be turned off to the pedestal prior to swapping the removable receptacle assemblies 284a, 284b. Although not shown, a sealing device (e.g., a gasket) may seal the interface of the first and second receptacle assemblies 284a, 284b and the first and second actuators 348a, 348b relative to the respective openings 428a, 428b, 432a, 432b in the switch board 424 to prevent moisture and debris from entering the space between the switch board 424 and the plurality of electrical connectors 420a-420d. Moreover, as shown, removable caps 460a, 460b may be used to cover the interfaces of the receptacle assemblies 284a, 284b when not in use.

The first and second receptacle assemblies 284a, 284b on each side 320, 324 may have the same power rating (e.g., the first and second receptacle assemblies 284a, 284b may have 30 A or 50 A power ratings) or the first and second receptacle assemblies 284a, 284b may have different power ratings (e.g., the first receptacle assembly 284a may have a 30 A power rating and the second receptacle 284b assembly may be 50 A power rating or vice versa). The first and second receptacle assemblies 284a, 284b may be couplable to one or more of the plurality of connectors 420a-420d of the head 280 via the electrical connectors 448a, 448b of the pigtails 444a, 444b. For example, if the first and second receptacle assemblies 284a, 284b both have 30 A power ratings, the electrical connector 448a of the first receptacle assembly 284a may couple to one of the first and second electrical connectors 420a, 420b of the head 280 and the electrical connector 448b of the second receptacle assembly 284b may couple to the other of the first and second electrical connectors 420a, 420b of the head 280. In another example, if the first and second receptacle 284a, 284b assemblies both have 50 A power ratings, the electrical connector 448a of the first receptacle assembly 284a may couple to one of the third and fourth electrical connector 420c, 420d of the head 280 and the electrical connector 448b of the second receptacle assembly 284b may couple to the other of the third and fourth electrical connector 420c, 420d of the head 280. In yet another example, if the first receptacle assembly 284a has a 30 A power rating and second receptacle assembly 284b has a 50 A power rating, the electrical connector 448a of the first receptacle assembly 284a may couple to either the first or second electrical connectors 420a, 420b of the head 280 and the electrical connector 448b of the second receptacle assembly 284b couples to either the third or fourth electrical connector 420c, 420d of the head 20.

Figure 21B:
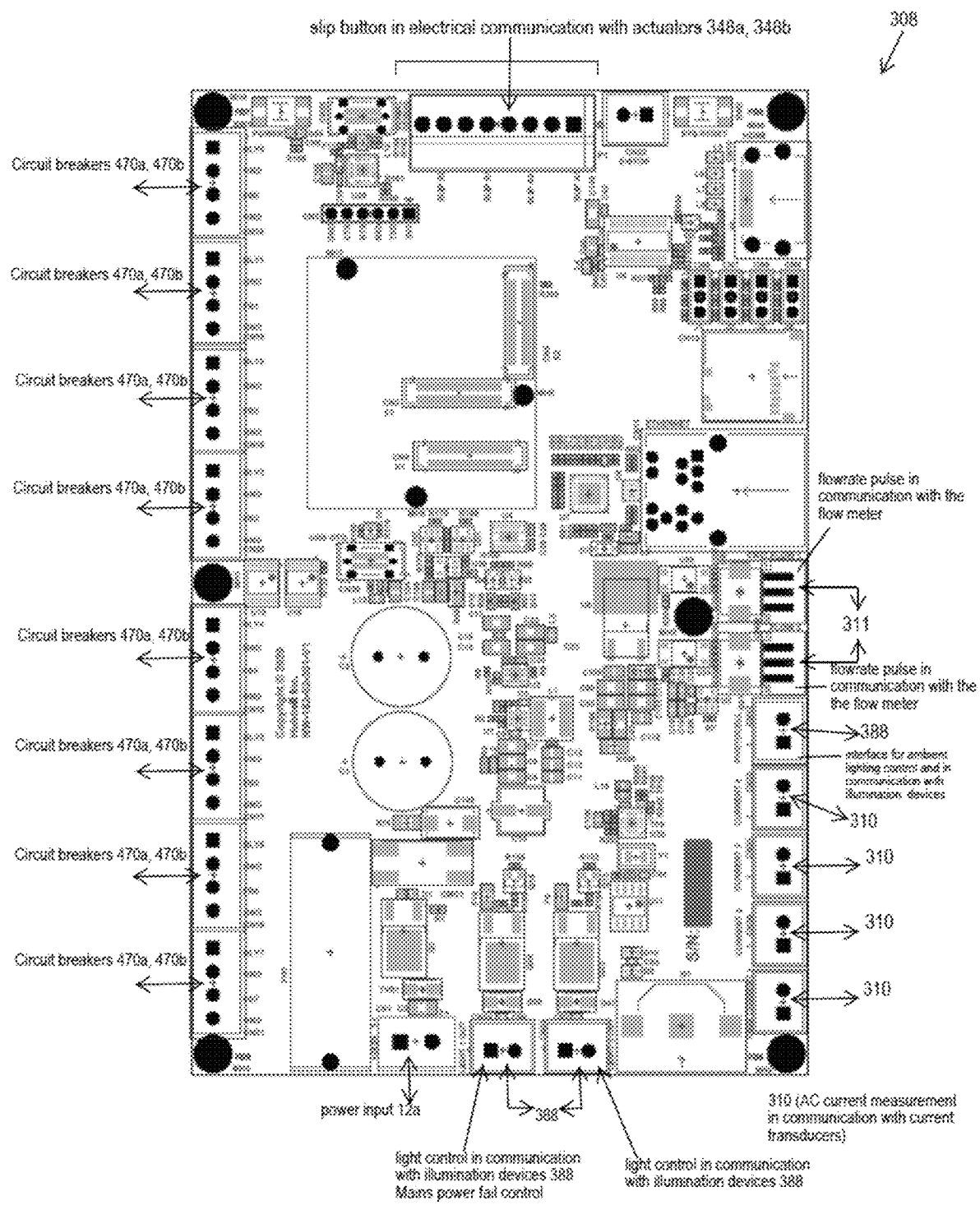
FIG. 21B is an electrical schematic of a portion of the marine electric charging station of FIG. 14.
Figure 22:
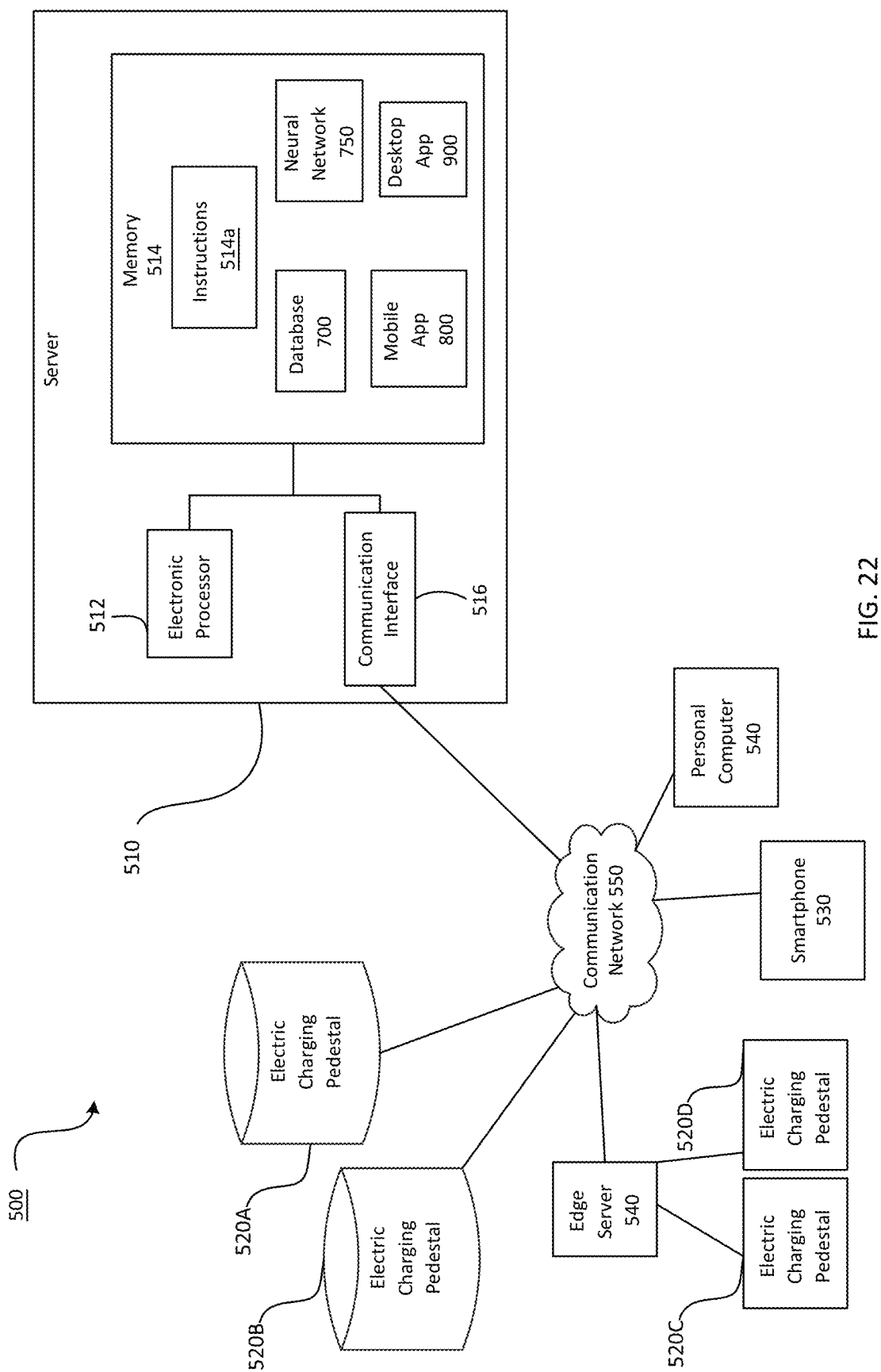
FIG. 22 shows a networked computer system according to an embodiment of the disclosure.

FIGS. 21A and 21B show various schematics with relation to the control board and controller 308 and other electrical components discussed above. With respect to FIGS. 21A and 21B, a motorized breaker 470a, 470b is in electrical communication with each of the receptacle assemblies 284a, 284b and associated electrical connector 420a-420d of the head 280 and actuator 348a, 348b. Moreover, a low voltage circuit is in communication with each of the motorized breakers 470a, 470b and the controller 308 of the head assembly 18. The motorized breakers 470a, 470b allow for a user to switch between different receptacle assemblies 284a, 284b by rotating between various receptacle assemblies 284a, 284b (e.g., a USB receptacle assembly, a two-prong receptacle assembly, a three-prong receptacle assembly, etc.). The low voltage circuit controls the respective breaker 470a, 470b to prevent damage to the receptacle assembly 284a, 284b, and therefore the vessel, caused by excess current from an overload or short circuit. Moreover, a ground-fault circuit interrupter (GFCI) 480, 484 may be in electrical communication with each of the first and second receptacle assemblies 284a, 284b, as well. It should be understood that the functionality described herein (e.g., the application functionality for marina owners and vessel managers (owners or captains)) can be performed via one or more electronic devices, such as a mobile device (e.g., a smartphone or tablet) that communicates with the head assembly 14 (e.g., by communicating with the controller 108). For example, FIG. 22 illustrates a networked computer system 500 for remote control management of electric charging pedestals (or electric charging stations). As illustrated in FIG. 22, the system 500 may include a plurality of electronic devices configured to communicate via a communication network 550. The electronic devices may include a server 510, one or more electric charging pedestals or stations 520A, 520B, 520C and 520D, electronic user devices (e.g., a smartphone 530 and a personal computer (PC) or console 540), and an edge server 540. The server 510 may be a main server of a cloud server (distributed computing) system 500, and may interact with the edge server 540 to provide a seamless user experience. Reference to a server may refer to the server 510 or the edge server 540 that communicates with the server 510 as an intermediary. Each of the electronic devices may be configured to communicate with each other over one or more wired or wireless communication networks, such as communication network 550. The edge server may communicate with the electric charging pedestals 520C and 520D via a different communication protocol (e.g., Bluetooth™ or Near-Field Communication (NFC) or via the communication network 550). Portions of the wireless communication networks may be implemented using a wide area network (WAN), such as the Internet, a local area network (LAN), such as a Bluetooth™ network or Wi-Fi, and combinations or derivatives thereof. The system 500 may include more or fewer servers and the server 510 and the edge server 540 illustrated in FIG. 22 are purely for illustrative purposes. For example, in some embodiments, the functionality described herein is performed via a plurality of servers in a distributed or cloud-computing environment. Also, in some embodiments, the server 510 may communicate with multiple edge servers for managing multiple docks. The edge server 540 may be located at a marine dock. The system 500 may include more or fewer electric charging pedestals and the electric charging pedestals 520A-520D illustrated in FIG. 22 are purely for illustrative purposes.

As illustrated in FIG. 22, the server 510 may include an electronic processor 512, a memory 514, and a communication interface 516. The electronic processor 512, the memory 514, and the communication interface 516 communicate wirelessly, over wired communication channels or buses, or a combination thereof. The server 510 may include additional components than those illustrated in FIG. 22 in various configurations. For example, in some embodiments, the server 510 includes multiple electronic processors, multiple memory modules, multiple communication interfaces, or a combination thereof. Also, the functionality described herein as being performed by the server 510 may be performed in a distributed nature by a plurality of computers or servers (e.g., edge server 540) located in various geographic locations. For example, the functionality described herein as being performed by the server 510 and/or edge server 540 may be performed by a plurality of servers (e.g., other intermediary edge servers) included in a cloud computing environment.

The electronic processor 510 may be, for example, a microprocessor, an application-specific integrated circuit (ASIC), or another suitable central processing unit (CPU). The electronic processor 110 is generally configured to execute software instructions to perform a set of functions, including the functions described herein. The memory 514 may include random access memory (RAM) and read-only memory (ROM). The memory 514 may include a non-transitory computer-readable medium and may store data, including instructions executable by the electronic processor 512. The communication interface 516 may be configured to perform communication with the other electronic devices as discussed above. For example, the communication interface include a wired or wireless transceiver or port, for communicating over the communication network 550 and, optionally, one or more additional communication networks or connections.

As illustrated in FIG. 22, the memory 514 of the server 510 includes instructions 514a, a database 700, a neural network 750, mobile application information 800 and desktop application information 900. The instructions 514 correspond to the computer-executable instructions described above. The database includes information related to the mobile application 800 and the desktop application 900. For example, the database may store an alert event log 1131 (FIG. 23A) and an association table 1231 (FIG. 23B). The neural network 750 may be a convolutional neural network (CNN), a multilayer perception, or some other neural network.

The electric charging pedestals 520A-520D may correspond to the electric charging stations 10, 210 described above.

The smartphone 530 may include a touch screen display, one or more cameras (e.g., a forward facing camera located on an opposite side of the touch screen display and at least one that camera that is located on the same side of the touch screen display), a processor, memory and a network communications interface. The processor, memory and network communications interface of the smartphone 530 may include a similar structure as the electronic processor 512, memory 514 and communication interface 516 discussed above but with a smaller size. The touch screen display is configured to receive user inputs on buttons and transmit those user inputs (and corresponding indication of actions associated with the pressed/touched button) to the server 510 (directly or indirectly, such as via edge server 540). The smartphone 530 may display the user interface "mobile app" screens discussed below. Although only one smartphone 530 is shown for illustrative purposes, a plurality of smartphones may be connected to use the various "mobile apps." For purposes of explanation, only one user interface of a smartphone is discussed but multiple smartphones may be used.

When referring to top and bottom (and similarly above and below) of the smartphone 530, it should be noted that a forward facing camera (i.e., on the opposite side as the touch screen display) may be located at a top end of a smartphone 704, according to various embodiments. Thus, when referring to top, the end of the smartphone providing the forward-facing camera is used when describing positional relationships below (e.g., with reference to the user interfaces/screens).

As discussed above, the memory 514 of the server may store a mobile application and a desktop application 900. The mobile application may include a dockmaster mobile application 800A and an end user (e.g., captain or vessel owner) application 800B. The mobile applications 800A, 800B may include user interface control information that controls the smartphone 530 to display various user interface screens as described below. The server 510's communication interface 516 may be controlled to transmit the user interface control information to the smartphone 530 to control the smartphone 530 to display the various user interface (screens) of the various mobile applications 800.

The dockmaster mobile application 800 is designed for control of the electric charging pedestals 520A, 520B. As discussed below with reference to FIGS. 24A-24L, the dockmaster mobile application 800 provides visibility to the pedestal operating conditions, and remote commissioning and decommissioning of an individual or group of pedestals. The discussion of the dockmaster application herein relates to a dockmaster mobile application 800A, but it should be understood that this functionality is equally applicable to the desktop application 900 (dockmaster portal/administrative application) that is accessible via a personal computer. That is, the dockmaster apps (both mobile and desktop) can remotely control the electric charging pedestals 520A, 520B via the dockmaster portal in a similar manner as discussed herein with the dockmaster mobile application. In FIGS. 24a-24l and 25a-25f "slip" may refer to a slip pedestal itself, a location of a pedestal on a dock, or a side of a pedestal.

Figure 24A:
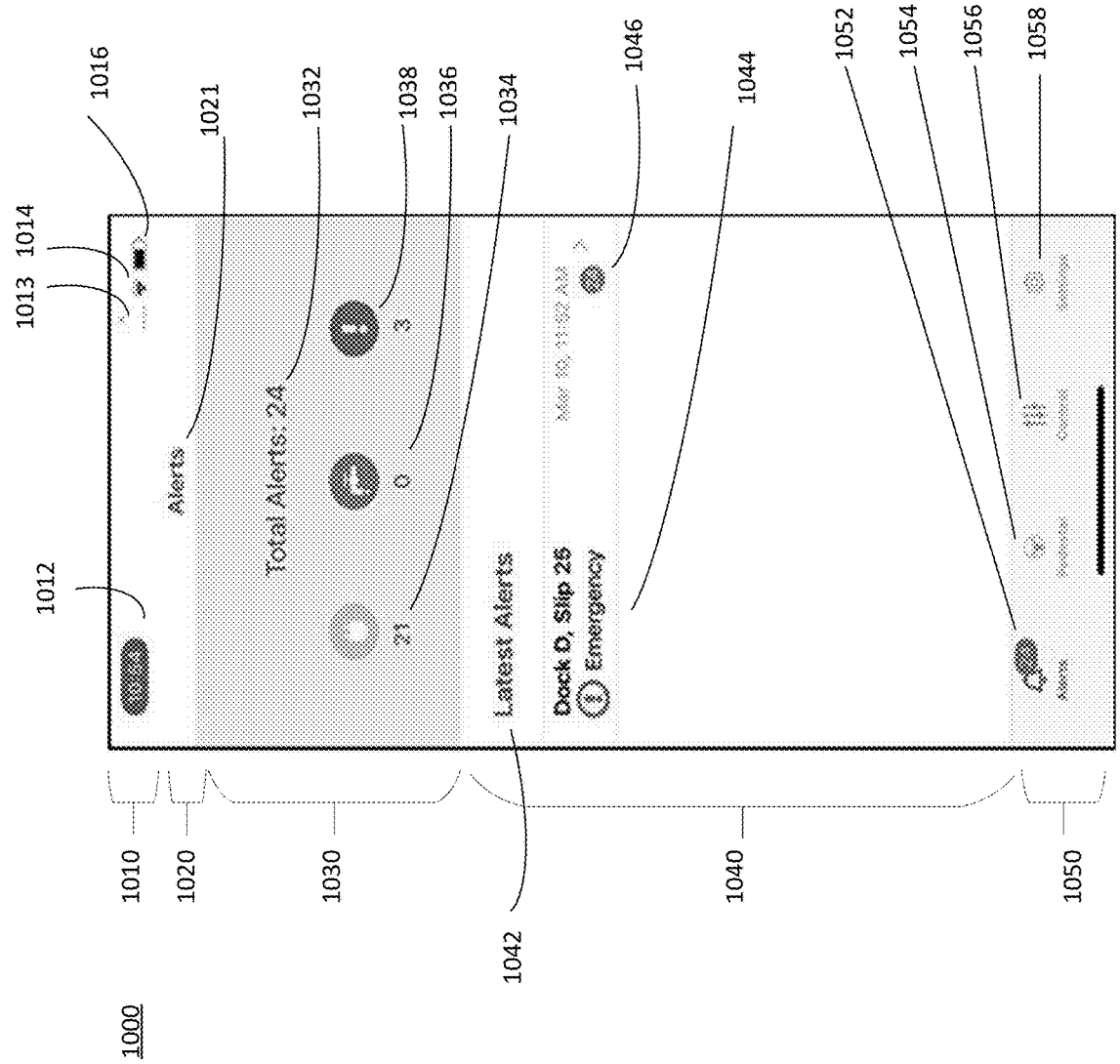

FIG. 24A illustrates an alerts home screen 1000, according to an embodiment. The alerts home screen 1000 may be the first screen of a plurality of hierarchical screens that is displayed on the smartphone 702 after a user logs into a dockmaster administrative application 800A. The alerts home screen 1000 includes multiple display areas including a status bar 1010, a navigation bar 1020, a first active pane 1030, a second active pane 1040 and a tab bar 1050. However, these are merely examples and less or more display areas may be used (e.g., for example, the status bar 1010 may be hidden during use of the a screen). Each different display area may have the same color, or specific display areas may have varying colors (e.g., a color scheme).

The status bar 1010 may be displayed along an upper edge of a screen. In the illustrated embodiment, the status bar 1010 displays device information, such as the device's current state including one or more of the local time 1012, cellular connection status 1013 (e.g., three dots as shown for no service, and a cellular service level indicator in other states), a network status, such as a wireless network connection status or level 1014, a battery level 1016, and/or a cellular carrier name. In other embodiments, the status bar 1010 may include other suitable device information. The navigation bar 1020, which may be adjacent to and below the status bar 1010 as shown in FIG. 24A, may display a title 1021 of a home screen (e.g., "Alerts" as the title of the alerts home screen 1000). The navigation bar 1020 may also include a "Back" button (which may include a previous screen title) and an "Edit or Done" button.

The first active pane 1030 may include information regarding the current total number of alerts 1032 (e.g., twenty-four total alerts, as shown in FIG. 24A), and a breakdown by type of alert, such as, for example, a total number of power spike alerts 1034 (e.g., twenty-one power spike alerts), a total number of water alerts 1036 (e.g., zero alerts), or a total number of emergency buttons pressed alert 1038 (e.g., 3 alerts). According to various embodiments, the emergency icon (emergency alert 1038) may be reserved for the physical emergency button on the head assembly of the electric charging station (or pedestal) itself. Customers or employees may press this button when they feel there is a serious emergency. This is different than the power spike 1034 which is not considered an emergency as there are hardware mechanisms in place to mitigate these occurrences. Each different type of alert may have a different color (e.g., different background colors) and a different icon. For example, the power spike alert 1034 may display an icon related to electrical power (e.g., an electrical connector) with a first color, the water alert 1036 may display an icon related to water (e.g., a dripping faucet) with a second color that is different from the first color, and the emergency buttons alert 1038 may display an emergency icon (e.g., an exclamation point or an electrical hazard lightning bolt) with a third color (e.g., red background with white exclamation point or yellow background with black electrical hazard lightning bolt). The power alert may be generated by the processor/controller (e.g., controller 108) when the measured/metered power is determined/detected to be greater than equal to a power threshold, or when the measured/metered power has a rate of change above a power rate of change threshold. Either or both thresholds could be used. The water alert may be based on the measured amount of water being above a water threshold, or the measured rate of change being above a water rate of change threshold. For example, as shown in FIG. 25D, the Water Alert in pane 3340 has an unexpected increase alert, and the Power Alerts indicate power spikes. The emergency stop alert may be generated by the pedestal when the emergency stop button has been activated. The flow meters 111 each measures the amount of water provided via the respective first and second valves 34, 38. The transducers 110 discussed above measure the amount of electrical power provided via the respective power units.

The second active pane 1040 may include one display area or be further segmented into multiple display areas. For example, the second active pane 1040 may display a header 1042 (e.g., "Latest Alerts") for the most recent or latest alerts text area (active pane 1040), as a first display area of the second active pane 1040, and a second display area including a list of groups (e.g., docks) that are navigable. For example, the list of groups may include information related to each slip in a group (e.g., each slip in a dock group). For example, the list of groups in FIG. 24A includes a latest alert 1044 that includes identifying information (e.g., "Dock D, Slip 25), an indication of type of the latest alert (e.g., text string of "Emergency" and/or an icon (e.g., exclamation point icon) corresponding to the type of the latest alert). The latest alert 1044 may also include date and time information (as shown in FIG. 24A) and a total group count 1046. The date and time information in the latest alert 1034 may correspond to a timing that the most recent (latest) alert was received.

Based on a user pressing the latest alert 1044 (e.g., the total group count 1036) on the second active pane 1040 of the screen 1000, a slip screen 1100 may be displayed (explained below with reference to FIG. 23). The tab bar 1050 may be positioned at the bottom of the screen 1100 and include various icons for quickly switching between different screens of the dockmaster administrative application 800A. For example, the tab bar 1050 may include an alerts icon 1052, a pedestal icon 1054, a control icon 1056 and a settings icon 1058. The alerts icon 1152 may indicate the total number of alerts and be represented by an alarm bell icon. The pedestal icon 1054, the control icon 1056 and the settings icon 1058 may be indicated by suitable imagery corresponding to the type of icon (e.g., an electrical probe and/or electrical outlet for the pedestal icon 1054, a control panel icon for the control icon 1056 and a gear icon for the settings icon 1058). Selecting (e.g., by touch pressing) the alerts icon 1152 may navigate the user to the alerts events listing screen 1100. Selecting (e.g., by touch pressing) the pedestal icon 1152 may navigate the user to the pedestal control screen. Selecting (e.g., by touch pressing) the control icon 1152 may navigate the user to the alerts events listing screen 1100. Selecting (e.g., by touch pressing) the alerts icon 1152 may navigate the user to the alerts events listing screen 1100.

Figure 24B:
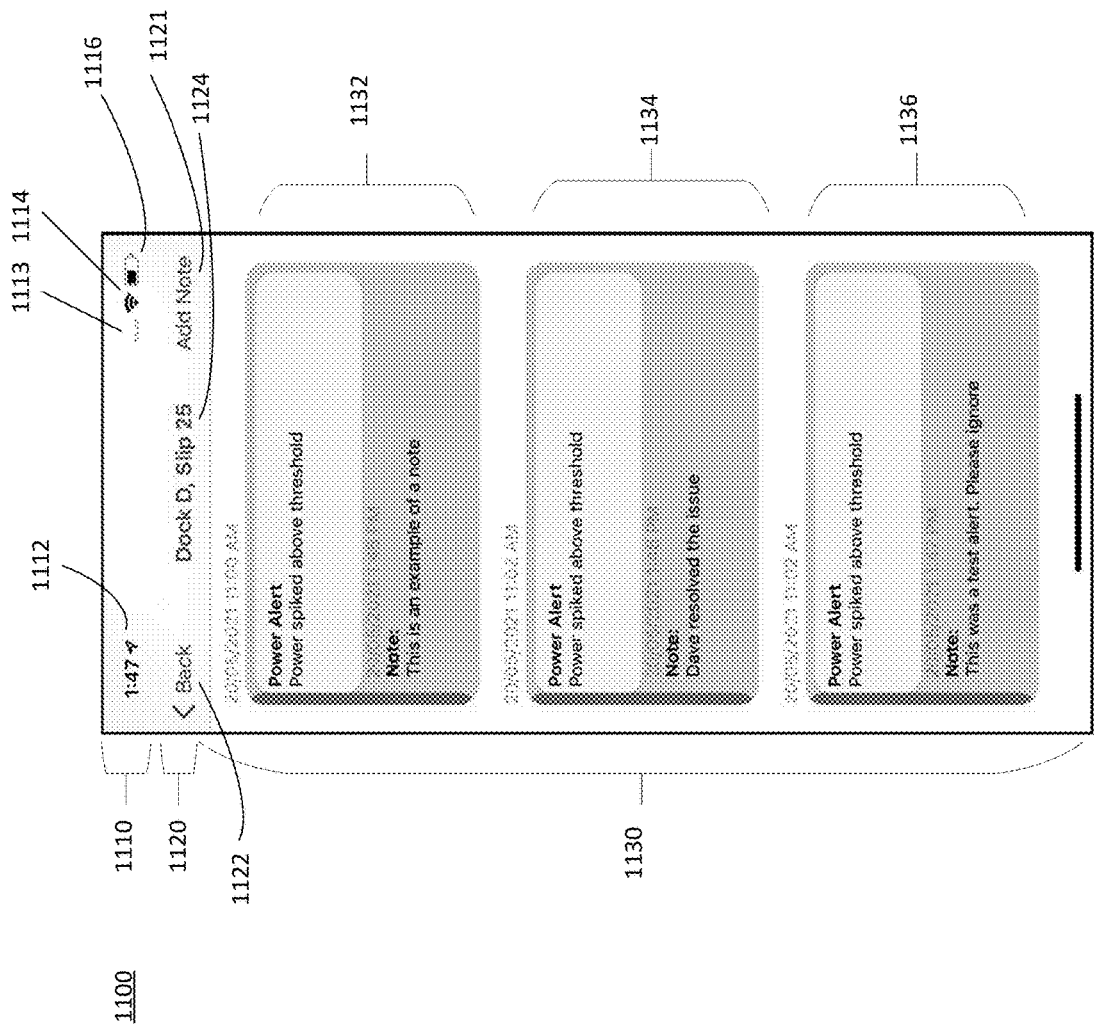

FIG. 24B illustrates a slip alert events listing screen 1100, according to an embodiment. The slip alert events listing screen 1100 may correspond to one slip (e.g., Slip 25 of Dock D) or a group of slips. The slip alert events listing screen 1100 includes multiple display areas including a status bar 1110, a navigation bar 1120, and an active pane 1130. However, these are merely examples and less or more display areas may be used (e.g., for example, a tab bar similar to tab bar 1050 may be displayed). Each different display area may have the same color, or specific display areas may have varying colors (e.g., a color scheme).

Device status bars may be statically displayed in a same format, while being updated in real time. Thus, the status bar 1110 may be similar to status bar 1010 and the displayed device information may include similar items (e.g., the local time 1112, cellular connection status 1113, a wireless network connection status or level 514, a battery level 1116, and other suitable device information) with similar or the same configurations. The navigation bar 1120, which may be adjacent to and below the status bar 1110 as shown in FIG. 24B, may display a title 1121 of the slip screen 1100 (e.g., "Dock D, Slip 5"), which may uniquely identify a slip. However, other unique identifiers may be used (e.g., a unique number or combination of letters and numbers). The navigation bar 1120 may also include a "Back" button 1122 and an "Add Note" button 1124.

The (first) active pane 1130 may include a history of alert events 1132, 1134 and 1136, which may be populated from an alert event log 1131, as shown in FIG. 23A and discussed below). Although active pane 1130 shows information regarding three alert events 1132, 1134 and 1136, more or less alert events may be displayed on the active pane 1130. According to various embodiments, a user may set the number of events displayed per page. The order of events may be sorted in a chronological order, such that oldest alert event 1132 is displayed at the top, followed by the next oldest alert event 1134, and so on. Each of the alert events 1132-1178 may include an alert event type 1130A, an alert event type description 1130B, an alert event date/time 1130C, a note text/comment area 1130D and a corresponding note date/time 1130E. However, more or less items may be stored in the alert event log 1131, for example, the description of the event types 1130B may be unnecessary/ optional to store in the alert event log 1131. In addition, the note text 1130D (and corresponding date/time column 1130E) may be removed, according to various embodiments. Alternatively, the note text 1130D field may include additional or alternative user feedback features (e.g., pre-written text options, a contact button, a help information button, an attach photo button, an attach video button, an attach audio button). The alert event type 1130A may be a value corresponding to an event type (e.g., power event type=1 or the word Power, emergency event type=2 or the word Emergency).

Although the order of events displayed in FIG. 24B is shown in chronological order (oldest first) based on the alert date/time 1130C first, and the note date/time 1130E as a secondary sorting value, the order of alert events may be based on different criteria, such as a different chronological order (e.g., the most recent alert date/time 1130C events first with note date/time 1130E being used as a secondary sorting value), or based on status (e.g., resolved indicated by note text 1130d are hidden or displayed last). Further, the alert events may be sorted based on alert event date/time 1130C or note date/time 1130E. Each of the alert events may be associated with the one slip (e.g., Dock D, Slip 25). Further, active pane 1130 is a scrollable display area, such that the user can view other events (e.g., events 1138-1178) from the alert event log 1131 (see FIG. 23A).

Based on a user pressing one of the displayed alert events 1132, 1134 or 1136 of the screen 1100, a slip control main screen 1200 may be displayed (explained below with reference to FIG. 23A).

Figure 24C:
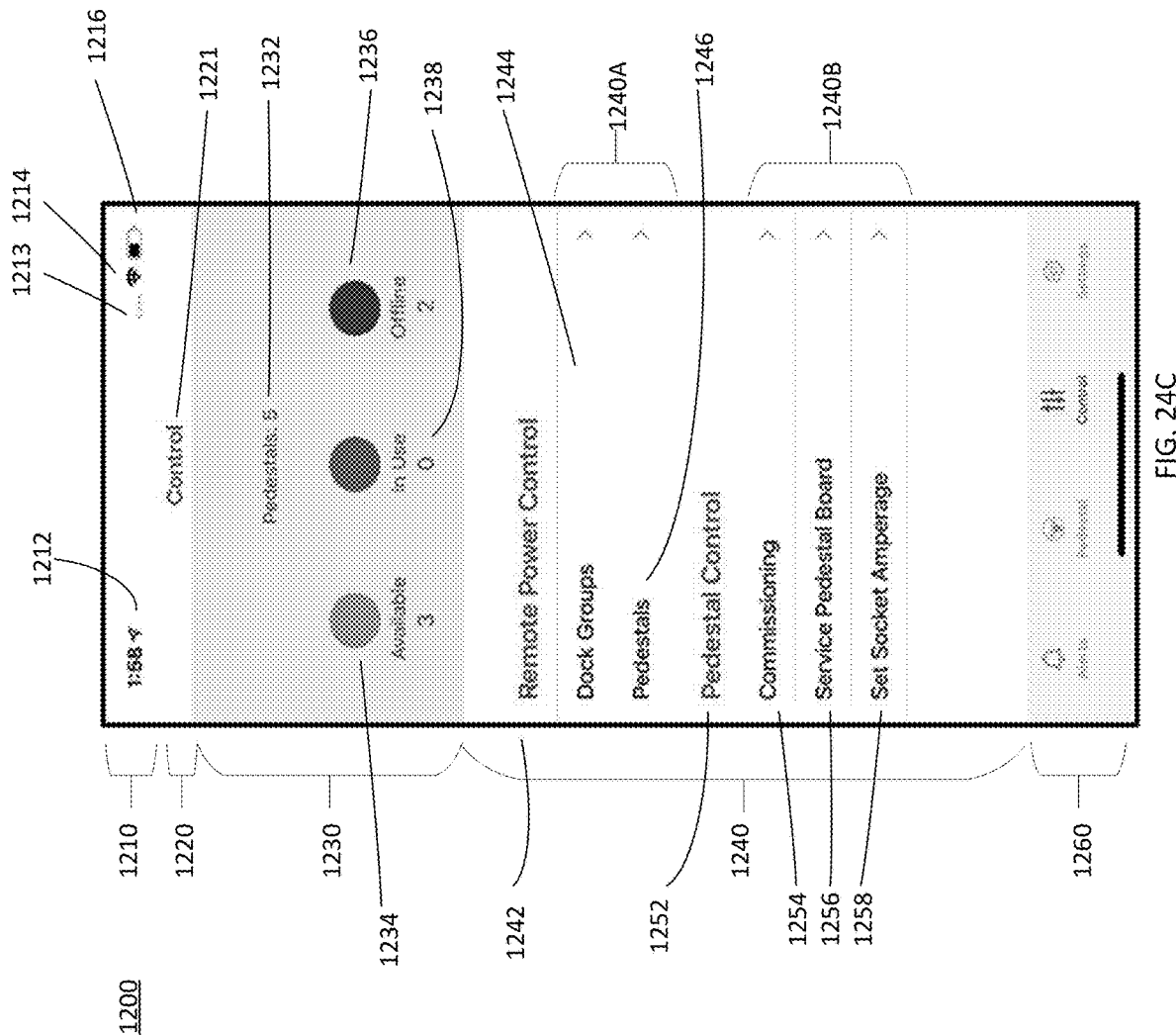

FIG. 24C illustrates a control main screen 1200, according to an embodiment. The control main screen 1200 may correspond to one slip (e.g., Slip 25 of Dock D) or a group of slips. The control main screen 1200 includes multiple display areas including a status bar 1210, a navigation bar 1220, a first active pane 1230, a second active pane 1240 and a tab bar 1260. However, these are merely examples and less or more display areas may be used. Each different display area may have the same color, or specific display areas may have varying colors (e.g., a color scheme).

Device status bars may be statically displayed in a same format, while being updated in real time. Thus, the status bar 1210 may be similar to status bars 1010 and 1110 and the displayed device information may include similar items (e.g., the local time 1212, cellular connection status 1213, a wireless network connection status or level 1214, a battery level 1216, and other suitable device information) with similar or the same configurations. The navigation bar 1220, which may be adjacent to and below the status bar 1210 as shown in FIG. 24C, may display a title 1221 of the screen 1200 (e.g., "Control"). However, other unique identifiers may be used (e.g., a unique number or combination of letters and numbers). The navigation bar 1220 may also include a "Back" button and a "Back," "Done" or "Add Note" button(s). The tab bar 1260 may correspond to the previously discussed tab bar 1050 but, as shown in FIG. 24C, the control icon may include a different color than the other icons to show that the control icon is currently active/ selected.

The first active pane 1230 may include a total number of pedestals 708 (e.g., five total pedestals as shown in FIG. 24C) associated with the logged-in user (dockmaster) and an indication by operating status. For example, the first active pane 1230 may further display an icon 1234 indicating three pedestals of the dockmaster that are available for use, icon 1236 indicating that two pedestals of the dockmaster are offline, and icon 1238 indicating that zero pedestals of the dockmaster are currently in use).

The second active pane 1240 may include a first display area 1240A with a first header 1042 (e.g., "Remote Power Control") and a second display area 1240B with a second header 1252 (e.g., "Pedestal Control"). The first display area 1240A and the second display area 1240B may each include navigation buttons for switching screens. For example, the first display area 1240A may include a dock groups navigation button 1244 and a pedestals navigation button 1246. The second display area 1240B may include a commissioning navigations button 1254, a service pedestal navigations button 1256 and a set socket amperage navigations button 1258.

The dock groups navigation button 1244 may cause a first remote power control screen 1300 to be displayed (FIG. 24D), when selected/pressed. The pedestals navigation button 1246 may cause a second remote power control screen 1400 to be displayed (FIG. 24E), when pressed/selected.

Figure 24D:
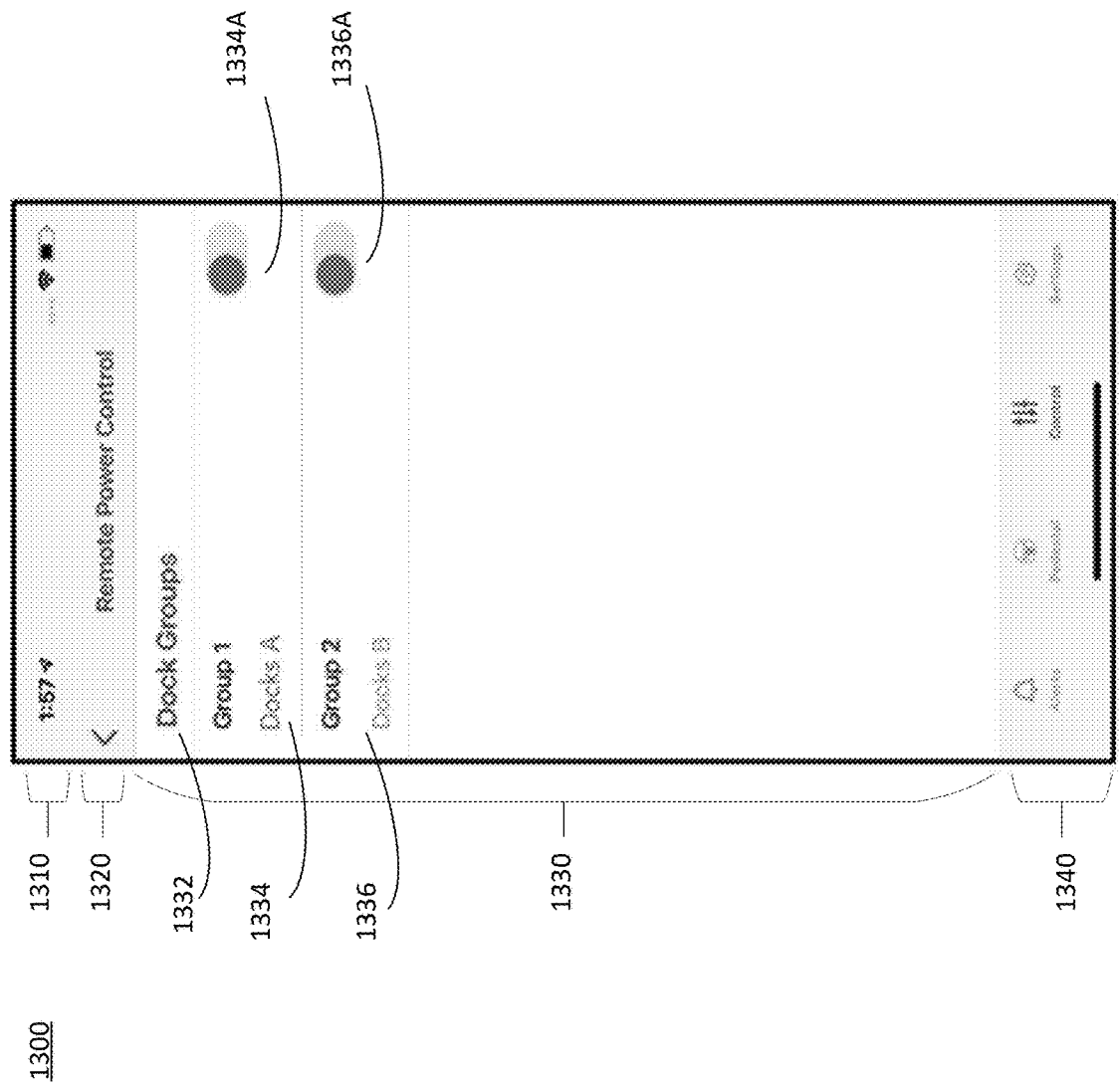

As shown in FIG. 24D, the first remote power control screen 1300 may correspond to a dock group navigation screen for controlling remote power. For example, as shown in FIG. 24D, the first remote power control screen 1300 may include multiple display areas including a status bar 1310, a navigation bar 1320, an active pane 1330, and a tab bar 1340. However, these are merely examples and less or more display areas may be used. Each different display area may have the same color, or specific display areas may have varying colors (e.g., a color scheme). The status bar 1310, navigation bar 1320 and tab bar 1340 may be similar to the functionality previously discussed with regards to status bars, navigation bars and tab bars. The navigation bar 1320 may include text related to the first remote power control screen 1300 (e.g., "Remote Power Control"). The active pane 1330 may include a header 1332 that indicates the type of remote power control (e.g., by "Dock Groups") and a listing of groups (e.g., display banner 1334 ("Group 1") and display banner 1336 ("Group 2"). The display banners 1334 and 1336 may also include a sub-listing of docks associated with the group (e.g., Dock A is associated with Group 1 and is displayed in display banner 1334). The display banners 1334 and 1336 may each include a toggle button 1334A and 1336A for turning on/off power to the respective dock group (e.g., turning off toggle button 1334A turns off all power to all pedestals associated with respective dock group (docks associated with Group 1)). The toggle buttons may be a push button with two positions that alternate between each press (e.g., 1334A could indicate left for "on" and right position for "off"). When the user presses to toggle 1334A on, a remote control signal (e.g., Wi-Fi or infrared) could be sent to the pedestal from the edge server, main server or user device. The remote control signal according to this example would control the pedestal to power on, when the user toggles the group remote control button 1334A or 1336A on. Likewise, when "off" is toggled to (e.g., the right position of 1334A or 1336B), the remote control signal may cause the pedestal to power off.

Figure 24E:
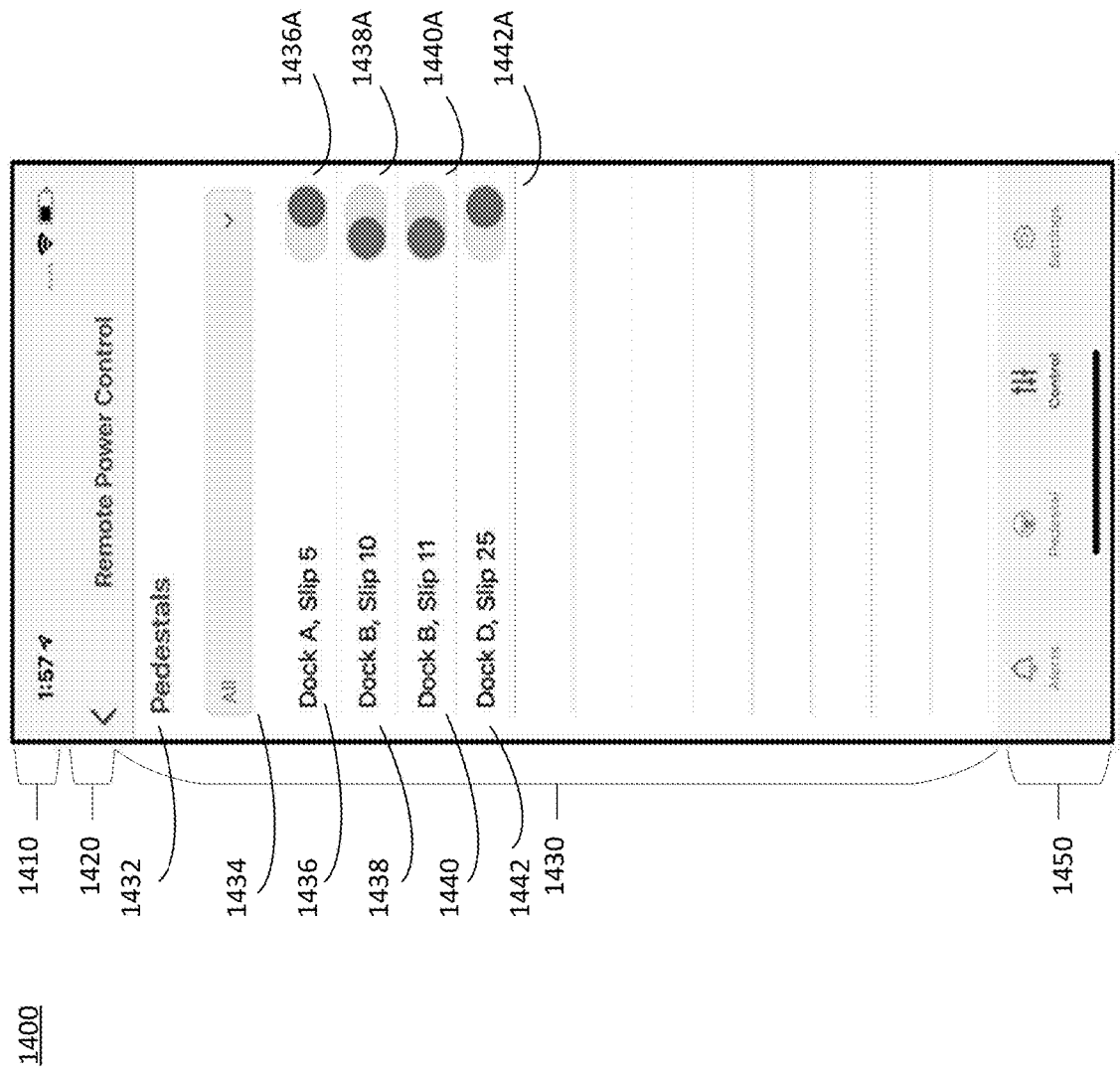

As shown in FIG. 24E, the second remote power control screen 1400 may correspond to a customizable pedestal navigation screen for controlling remote power. For example, as shown in FIG. 24E, the second remote power control screen 1400 may include multiple display areas including a status bar 1410, a navigation bar 1420, an active pane 1430, and a tab bar 1450. However, these are merely examples and less or more display areas may be used. Each different display area may have the same color, or specific display areas may have varying colors (e.g., a color scheme). The status bar 1410, navigation bar 1420 and tab bar 1450 may be similar to the functionality previously discussed with regards to status bars, navigation bars and tab bars. The navigation bar 1420 may include text related to the second remote power control screen 1400 (e.g., "Remote Power Control"). The active pane 1430 may include a header 1432 that indicates the type of remote power control (e.g., by "Pedestals"), a selectable display component 1434 and a listing of individual pedestals (e.g., display banner 1436 ("Dock A, Slip 5"), display banner 1438 ("Dock B, Slip 10"), display banner 1440 ("Dock B, Slip 11") and display banner 1442 ("Dock D, Slip 25").

The selectable display component 1434 may include selectable options for filtering the individual pedestals that are displayed (e.g., in FIG. 24E "all" pedestals associated with the user are displayed, however, the user may select an operating status option (e.g., only available pedestals, or only offline (e.g., decommissioned) pedestals may be displayed) or an association (e.g., by dock or by dock group) to filter the display results for active pane 1430). That is, the selectable display component 1434 may reduce the number of display banners associated with slips/pedestals (e.g., 1436, 1438, 1440 and 1442).

The display banners 1436, 1438, 1440 and 1442 may each include a toggle button (1436A, 1438A, 1440A and 1442A) for turning on/off power to the respective pedestal (e.g., turning off toggle button 1436A turns off all power to the pedestal(s) located at Dock A, Slip 5, and so on).

With renewed reference to FIG. 24C, when the dockmaster wants to make a pedestal available for use (e.g., commission a pedestal), the dockmaster may press the commissioning navigations button 1254. When the commissioning navigations button 1254 of screen 1200 is pressed, a commission control screen 1500, as shown in FIG. 24F, may be displayed. The commission control screen 1500 may correspond to a commission screen for activating a pedestal (e.g., from offline/decommissioned to available or commissioned). As shown in FIG. 24F, the commission control screen 1500 may include multiple display areas including a status bar 1510, a navigation bar 1520, an active pane 1530, and a tab bar 1550. For example, the commission control screen 1500 may include a text prompt area 1532 and an input button 1534. The text prompt area 1532 may display text and/or an image that prompts the user to take an action to commission a pedestal indicated in the navigation bar 1520 (e.g., "Dock A, Slip 1"). For example, the text prompt area 1532 may display text that recites "The slip is vacant. Scan Pedestal QR Code to commission to this location." In the illustrated embodiment, the input button 1534 may correspond to a scan QR code function. However, in other embodiments, other functionality may be additionally or alternatively used. For example, in other embodiments a user may be prompted to enter a unique identifier corresponding to the QR code or the pedestal). When a user touches/presses the input button 1534, the function related to the input button may be executed. For example, when the user touches/presses the input button 1534, a camera application may be activated such that the user may scan a QR code located near or on a pedestal. The QR code may correspond to a unique pedestal identifier.

Figure 24G:
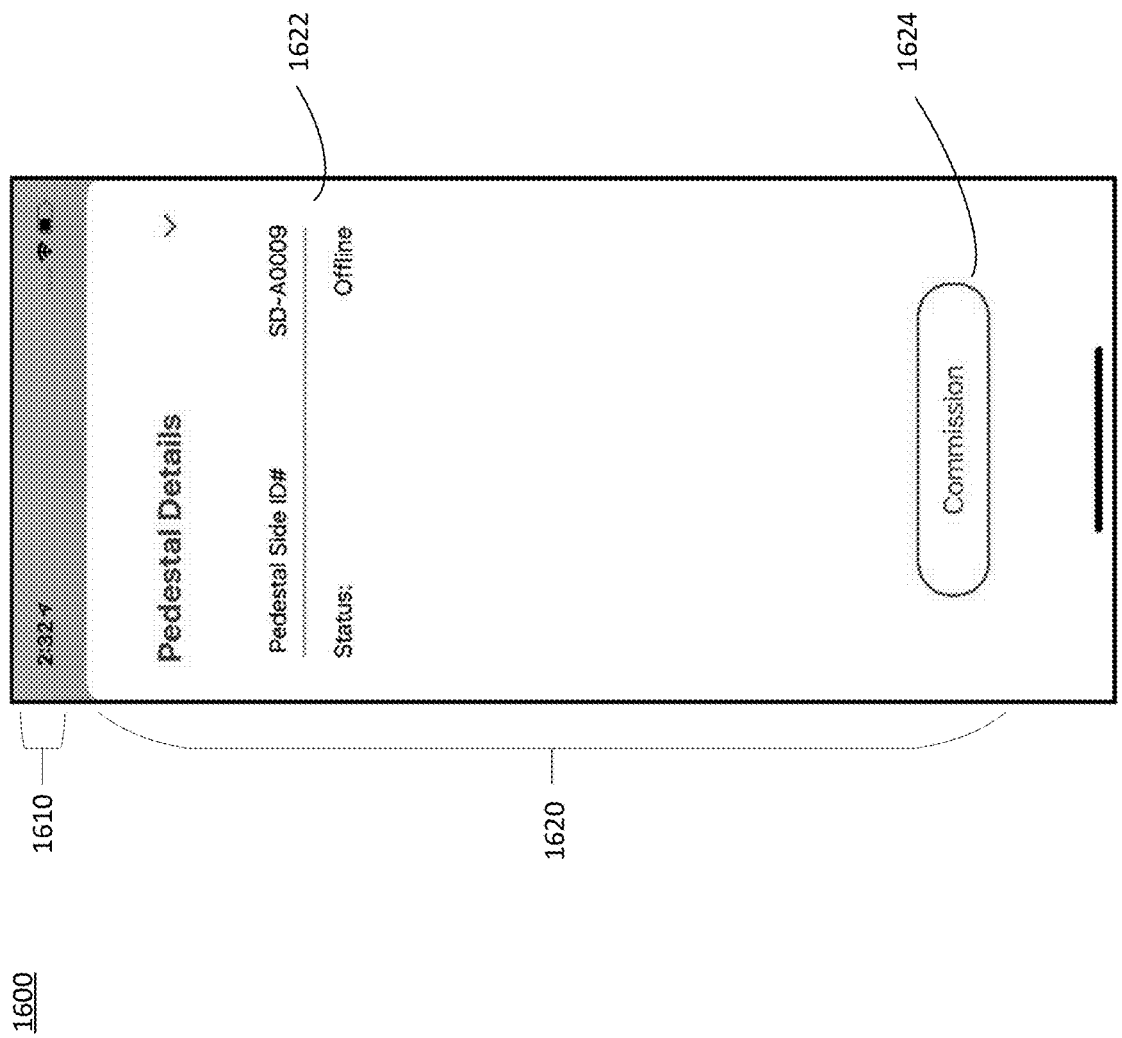

After the unique identifying information of the pedestal has been entered (e.g., the QR code has been scanned), the pedestal may be identified, and a pedestal details screen 1600 may be displayed, as shown in FIG. 24G. The commission pedestal details screen 1600 may correspond to a confirmation (e.g., confirm commission) screen for activating a pedestal (e.g., from offline/decommissioned to available or commissioned). As shown in FIG. 24G, the pedestal details screen 1600 may include multiple display areas including a status bar 1610 and an active display pane 1620.

For example, the pedestal details screen 1600 may include a pedestal details display area 1622, which may include the pedestal side identifier (ID) number and the current status. The pedestal details screen 1600 may also include a confirmation button 1624 (e.g., a button that displays the word "Commission") for confirming the commissioning of the pedestal having the details displayed by the pedestal details display area 1622. After the user presses the confirmation button 1624, the pedestal indicated by the displayed pedestal details may be commissioned (e.g., the operating status may be changed from offline to available in the database 700). According to various embodiments, commissioning of the pedestal may cause the power of the pedestal be started (turned on) by remote control.

The pedestal details screen 1600 may be displayed when the respective pedestal 708 has not yet been commissioned (e.g., after scanning the QR code, the identified pedestal may be offline). In a case that the scanned QR code identifies a pedestal 708 that is online (e.g., available or in use, or that has already been commissioned), or after the pedestal 708 has been commissioned via the confirmation button 1624, a second pedestal details screen 1700 may be displayed (as shown in FIG. 24H).

Figure 24H:
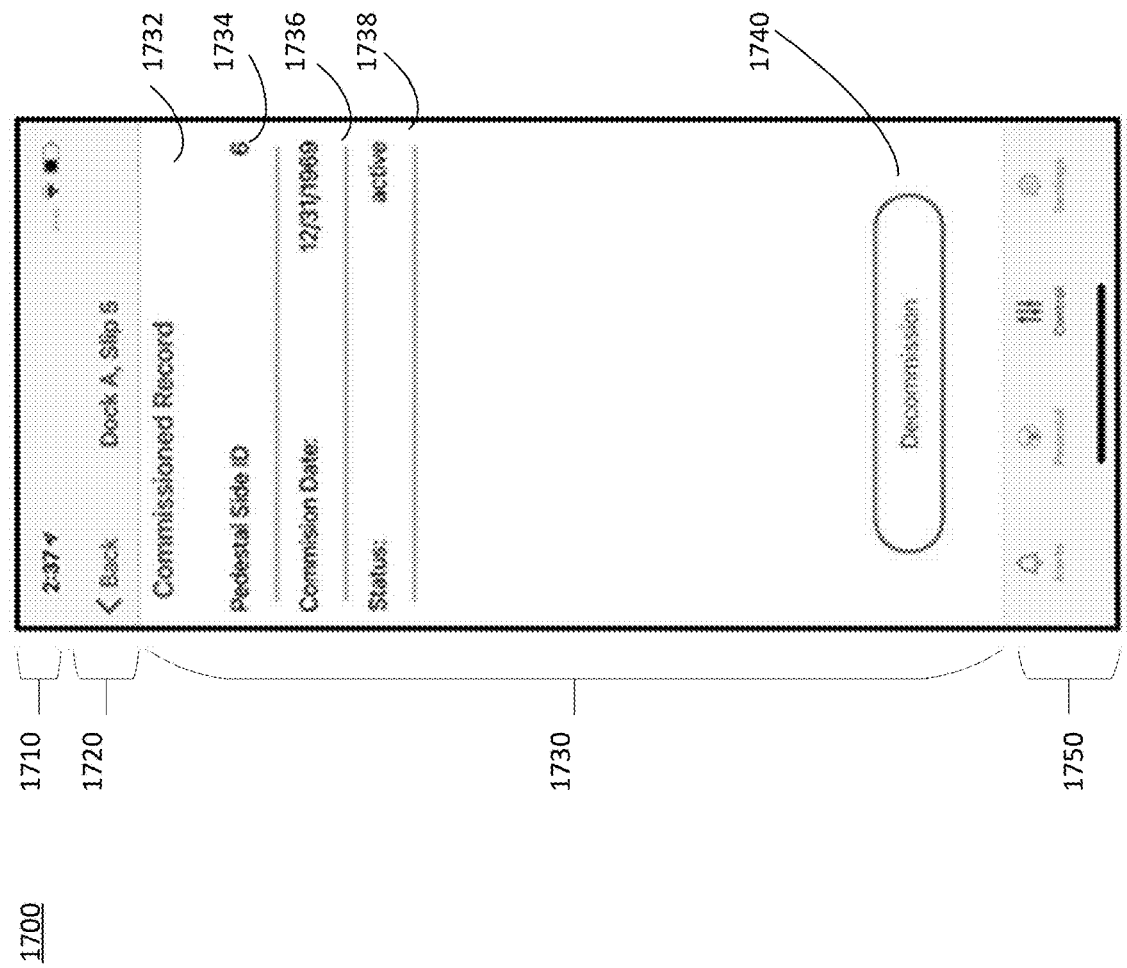

As shown in FIG. 24H, the second pedestal details screen 1700 may include multiple display areas including a status bar 1710, a navigation bar 1720, an active display pane 1730, and a tab bar 1740. The navigation bar may include a name of the pedestal (e.g., "Dock A, Slip 5"). The second pedestal details screen 1700 shows details of a pedestal that is currently online (commissioned) and provides a decommission button 1740, which allows a user (dockmaster) to decommission the pedestal indicated by the navigation bar 1720 (e.g., "Dock A, Slip 5"). The active display pane 1730 may further include pertinent details regarding the respective pedestal, such as pedestal side identifying information 1732 (e.g., 6), commission date 1736 (e.g., Dec. 31, 1969, which may correspond to the most recent or first commission date) and status information 1738 (e.g., active, online, etc.). The active pane 1730 may also include a header 1732 that indicates that the displayed information is a commissioned record.

The pedestal details screen 1700 may also include a confirmation button 1740 (e.g., a button that displays the word "Decommission") for confirming decommissioning of the pedestal having the details displayed by the pedestal details display area (e.g., 1734 shows a Pedestal Side ID). When the user presses the decommission button 1740, the pedestal indicated by the displayed pedestal details 1734 may be decommissioned (e.g., the operating status may be changed from available (or in-use) to offline in the database 700). According to various embodiments, decommissioning of the pedestal may cause the power of the pedestal be turned off by remote control (or turning off the power to the pedestal could be a prerequisite requirement for decommissioning, such that the decommission screen is greyed out while still in use). The database 700 may also store timestamps related to database actions (e.g., a timestamp for each commission, a timestamp for each decommission).

Figure 24I:
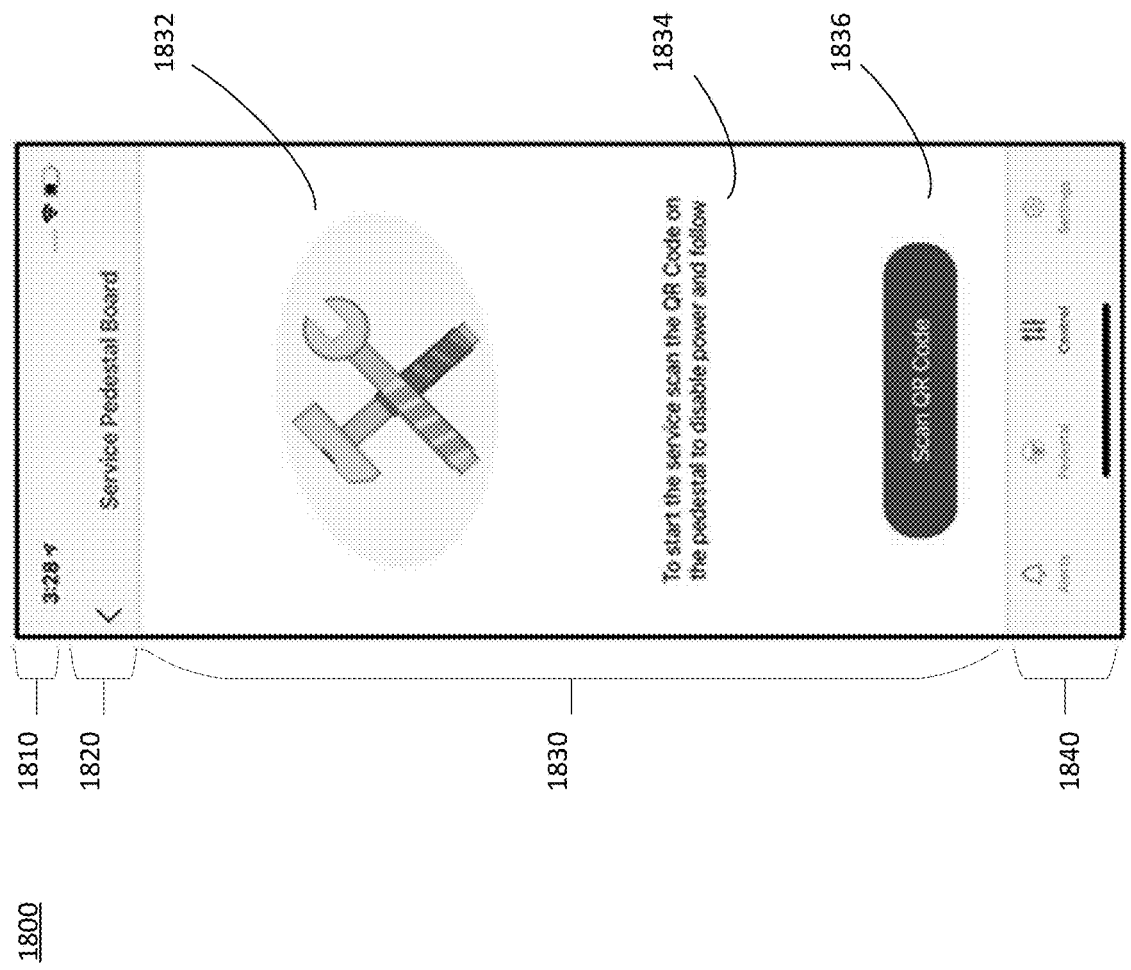

With renewed reference to FIG. 24C, when the dockmaster wants to service a pedestal board 105, 305, the dockmaster may press the service pedestal board button 1256 of screen 1200. When the service pedestal board button 1256 of screen 1200 is pressed, a service pedestal board control screen 1800, as shown in FIG. 24I, may be displayed. The service pedestal board control screen 1800 may correspond to a screen for replacing the pedestal control board (i.e., updating the associated board identifier) and controller 108, 308. As shown in FIG. 24I, the service pedestal board control screen 1800 may include multiple display areas including a status bar 1810, a navigation bar 1820, an active pane 1830, and a tab bar 1840. For example, the active pane 1830 may include imagery 1832 (e.g., tools indicating this is a repair/upgrade/service page), a text prompt 1834 to instruct the user how to use the input button 1836 (e.g., "To start the server scan the QR Code on the pedestal to disable power") to begin service.

The input button 1836 may have similar functionality as input button 1534 discussed above. For example, the input button 1836 may provide functionality for scanning a QR code (and display text reciting "Scan QR Code") to initialize a camera scan function of the smartphone. However, other functionality may be used, such as functionality related to entering a unique identifier corresponding to the QR code, or the pedestal or pedestal control board identifier. When a user touches/presses the input button 1836, the function related to the input button may be executed. For example, when the user touches/presses the input button 1836, a camera application may be activated such that the user may scan a QR code located near or on a pedestal. The QR code may correspond to a unique pedestal board identifier or a unique pedestal identifier.

Figure 24J:
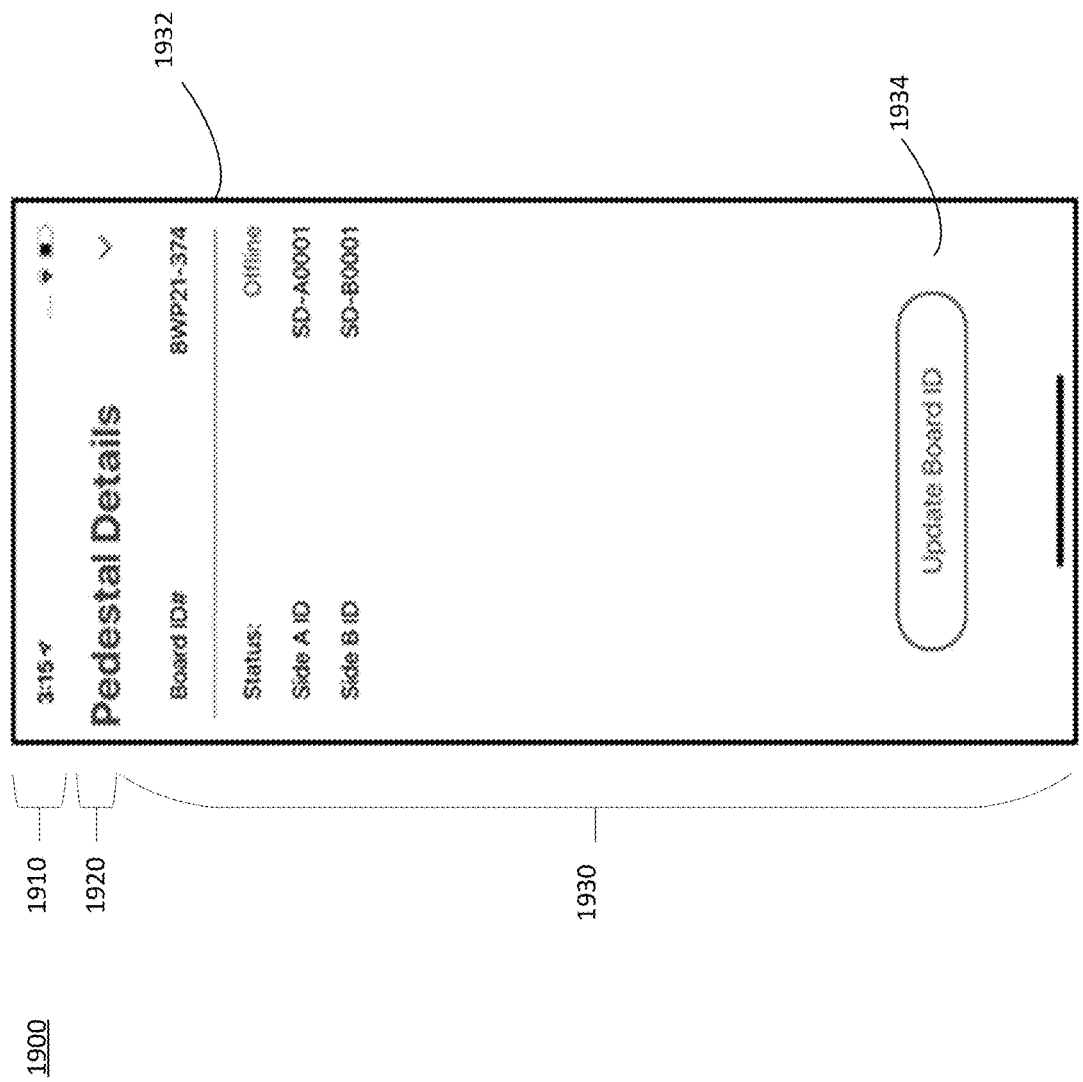

After the unique identifying information of the pedestal has been entered (e.g., the QR code has been scanned), the pedestal may be identified, and a pedestal details screen 1900 may be displayed, as shown in FIG. 24J. The pedestal details screen 1900 may correspond to a confirmation (confirm update of board ID) screen for activating a pedestal board (e.g., a new pedestal board). As shown in FIG. 24J, the pedestal details screen 1900 may include multiple display areas including a status bar 1910, a navigation bar 1920 and an active display pane 1930.

For example, the pedestal details screen 1900 may include a pedestal details display area 1932, which may include the board identifier number (e.g., 8WP21-374), a current status (e.g., offline) and one or more sides corresponding to the user input (e.g., Side A ID: SD-A0001, and Side B ID: SD-B0001). The pedestal details screen 1900 may also include a confirmation button 1934 (e.g., a button that displays the word "Update Board ID") for confirming the updating of the board identifier (in the database 700) having the details displayed by the pedestal details display area 1932. After the user presses the confirmation button 1934, the board identified by the board ID number may be associated with the pedestal (e.g., the Side A and Side B IDs) in the database. Using the pedestal details screen 1900, a technician can replace a main board 105, 305 and scan the QR code of the new main board 105, 305, and update the database.

Figure 24K:
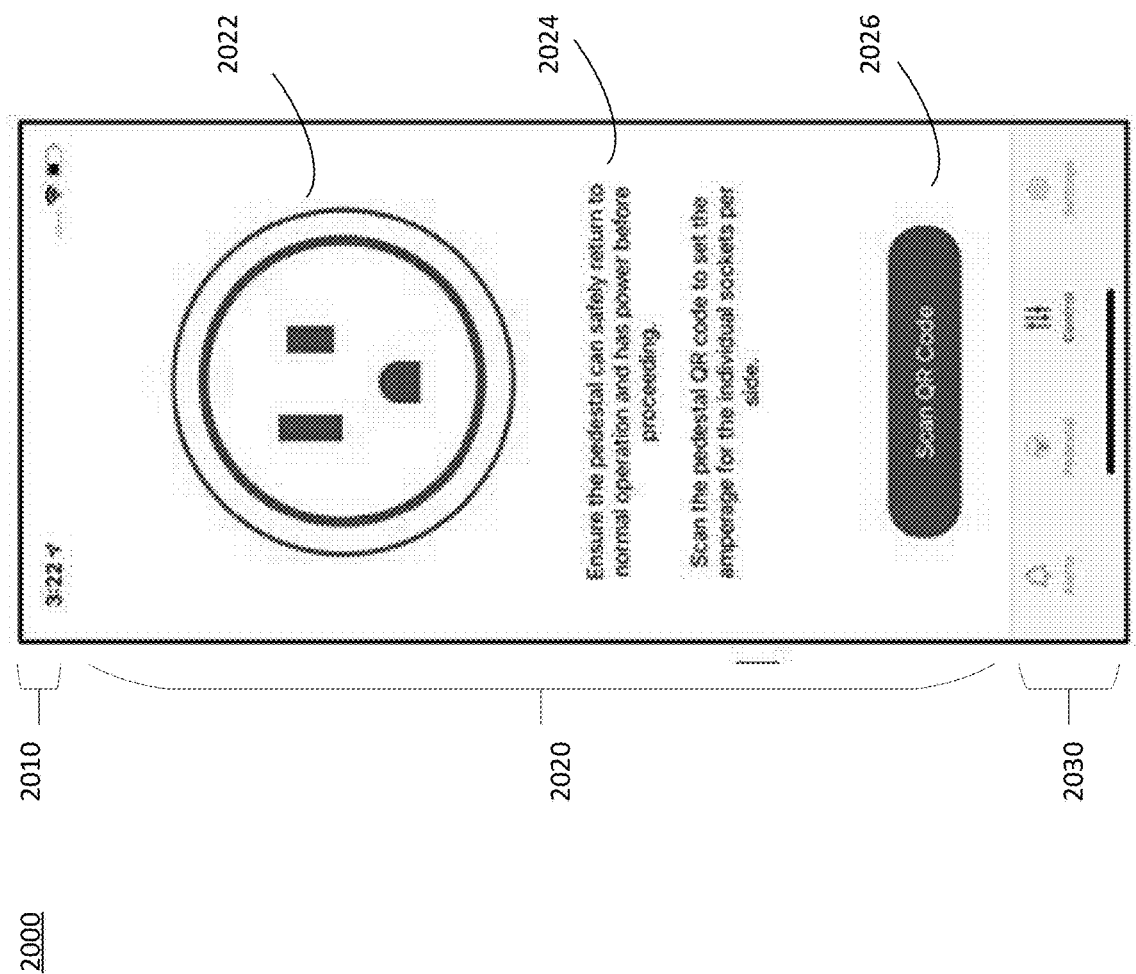

With renewed reference to FIG. 24C, when the dockmaster wants to set the socket amperage of one of the power units 84, 284, the dockmaster may press the set socket amperage button 1258 of screen 1200. When the set socket amperage button 1258 of screen 1200 is pressed, a set socket amperage control screen 2000, as shown in FIG. 24K, may be displayed. The set socket amperage control screen 2000 may correspond to a screen for setting the amperage limit of one or more sockets of a pedestal. As shown in FIG. 24K, the set socket amperage control screen 2000 may include multiple display areas including a status bar 2010, an active pane 2020, and a tab bar 2030. For example, the active pane 2020 may include imagery 2022 (e.g., an electrical wall socket), a text prompt 2024 to instruct the user how to use the input button 2026 to begin setting the amperage (e.g., the text prompt 2024 may recite "Ensure the pedestal can safely return to normal operation and has power before proceeding. Scan the pedestal QR code to set the amperage for the individual sockets per side.").

The input button 2026 may have similar functionality as input button 1534 discussed above. For example, the input button 2026 may provide functionality for scanning a QR code (and display text reciting "Scan QR Code") to initialize a camera scan function of the smartphone. However, other functionality may be used, such as functionality related to entering a unique identifier corresponding to the QR code, or the pedestal or pedestal control board identifier. When a user touches/presses the input button 2026, the function related to the input button may be executed. For example, when the user touches/presses the input button 2026, a camera application may be activated such that the user may scan a QR code located near or on a pedestal. The QR code may correspond to a unique pedestal board identifier or a unique pedestal identifier.

Figure 24L:
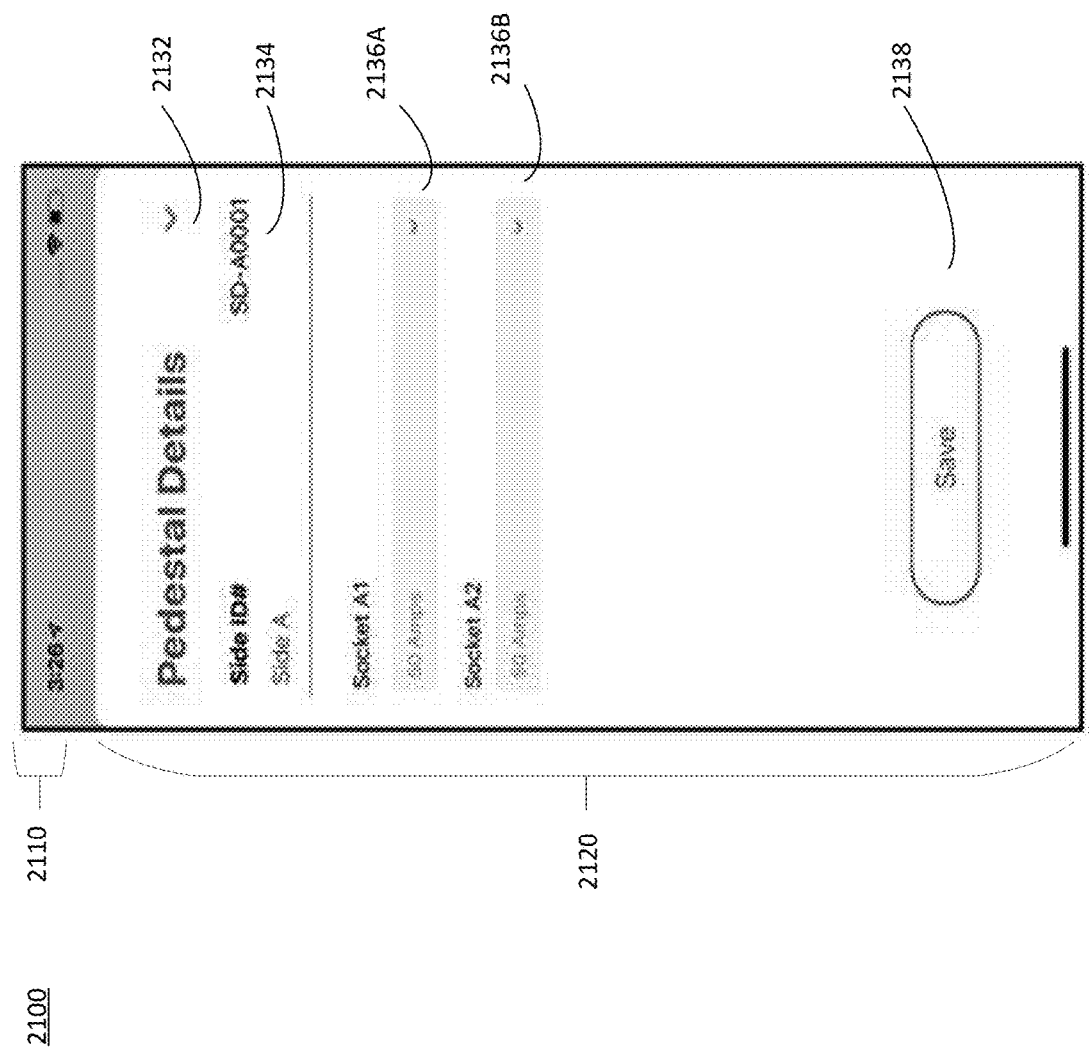

After the unique identifying information of the pedestal has been entered (e.g., the QR code has been scanned), the pedestal may be identified, and a pedestal details screen 2100 may be displayed, as shown in FIG. 24L. The pedestal details screen 2100 may correspond to a screen for adjusting amperage of one or more sockets (e.g. Socket A1 and Socket A2, as shown in FIG. 24L, corresponding to the sockets of the power units 84, 284). As shown in FIG. 24L, the pedestal details screen 2100 may include multiple display areas including a status bar 2110, and an active display pane 2120.

For example, the pedestal details screen 2100 may include a togglable button 2132, a current pedestal details display area 2134, and a togglable socket button(s) 2136A and 2136B, and a save button 2138. The togglable button 2132 may be used to hide the side ID # details (e.g., to provide more screen space to show the socket details). The togglable buttons 2136A and 2136B may include a list of amperage values (e.g., off, 25 amps, 50 amps) to allow the dockmaster to change the amperage of the corresponding socket listed above the buttons 2136A (Socket A1) and 2136B (Socket A2). The save button 2138 allows the user to save the settings, thereby updating the amperage provided by the pedestal side (e.g., based on the Side ID number or the board ID number) in the database 700. For example, the new amperage value will be saved in the cloud database, and when changed from previous amperage value, will send a message to that pedestal (e.g., the pedestal control board) informing it to switch the circuit breakers to the new amperage setting. For example, because the circuit board has different (customizable) receptacles, the amp (or amp limit) may be remotely set by the dockmaster. In an embodiment, a remote control signal may be sent to the pedestal to set the internal amperage limits of the pedestal board. This, allows for flexibility of power output. Different screens may be used in different mobile applications.

The end user mobile application 800B is designed for a captain of vessel owner (e.g., less than ultimate control of the pedestals 520). For example, the mobile application 800B may provide reporting and power condition alerts perspective and retain their pedestal preferences through the cloud-based database, which can then be downloaded to their slip pedestal.

Figure 25A:
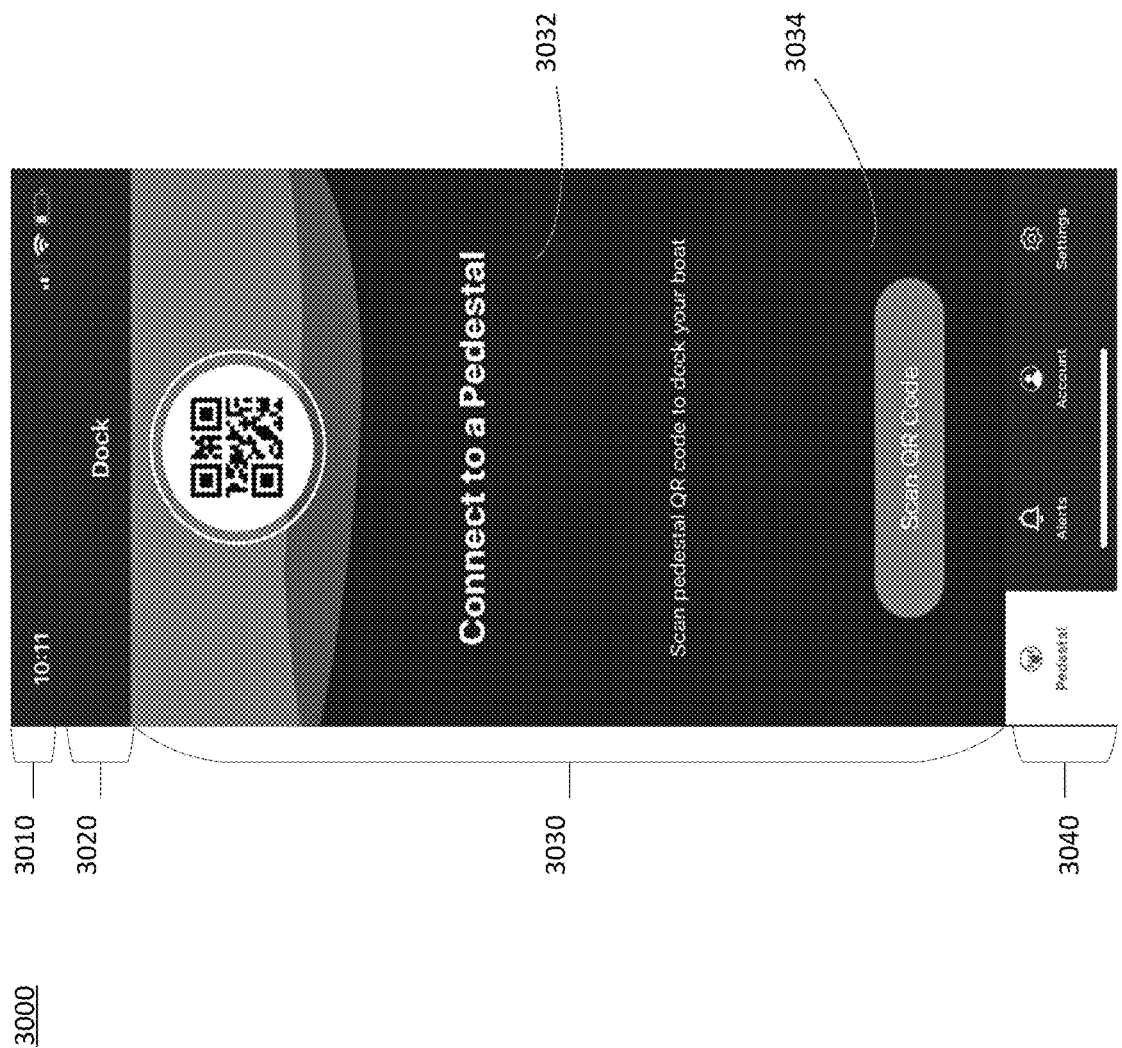

With regards to FIG. 25A, when the end user wants to view details on a pedestal, the end user may do so by way of the end user input screen 3000. The end user input screen may accept a user input similar to the commission control screen 1500 (e.g., via QR code scanning). As shown in FIG. 25A, the input screen 3000 may include multiple display areas including a status bar 3010, a navigation bar 3020, an active pane 3030, and a tab bar 3040. For example, the end user input screen 3000 may include a text prompt area 3032 and an input button 3034.

The text prompt area 3032 may display text and/or an image that prompts the user to take an action to connect a vehicle to a pedestal by scanning the QR code of the pedestal. For example, the text prompt area 3032 may display text that recites "Connect to a Pedestal" and "Scan pedestal QR code to dock your boat." In the illustrated embodiment, the input button 3034 may correspond to a scan QR code function. However, in other embodiments, other functionality may be additionally or alternatively used as discussed above. The QR code may correspond to a unique pedestal identifier and the functionality for scanning the QR code may be similar to the functionality described above.

Figure 25B:
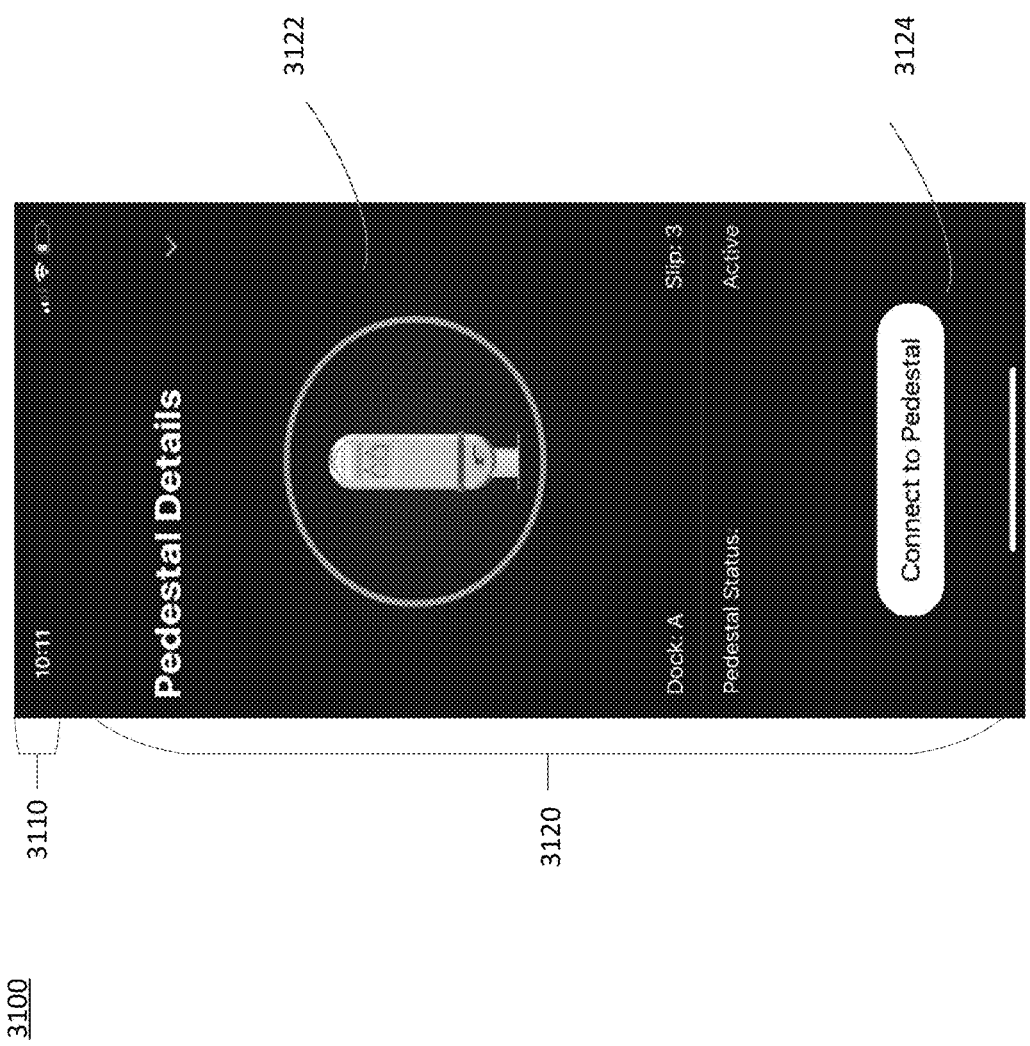

After the unique identifying information of the pedestal has been entered (e.g., the QR code has been scanned), the pedestal may be identified, and a pedestal details screen 3100 may be displayed, as shown in FIG. 25B. The pedestal details screen 3100 may correspond to a confirmation (e.g., confirm connection) screen for activating a connection to a pedestal (e.g., an online/commissioned and available pedestal). As shown in FIG. 25B, the pedestal details screen 3100 may include multiple display areas including a status bar 3110 and an active display pane 3120.

For example, the pedestal details screen 3100 may include a pedestal details display area 3022, which may include imagery of a pedestal and pedestal side identifying information (e.g., "Dock: A, Slip: 3" or dock name and location or a pedestal identifier (ID) number) and the current status (e.g., active, offline, in use). The pedestal details screen 3100 may also include a confirmation button 3124 (e.g., a button that displays the word "Connect to Pedestal") for confirming the connection of the pedestal having the details displayed by the pedestal details display area 3122. After the user presses the confirmation button 3124, the pedestal indicated by the displayed pedestal details may be connected to (e.g., the operating status may be changed from available to in use).

Figure 25C:
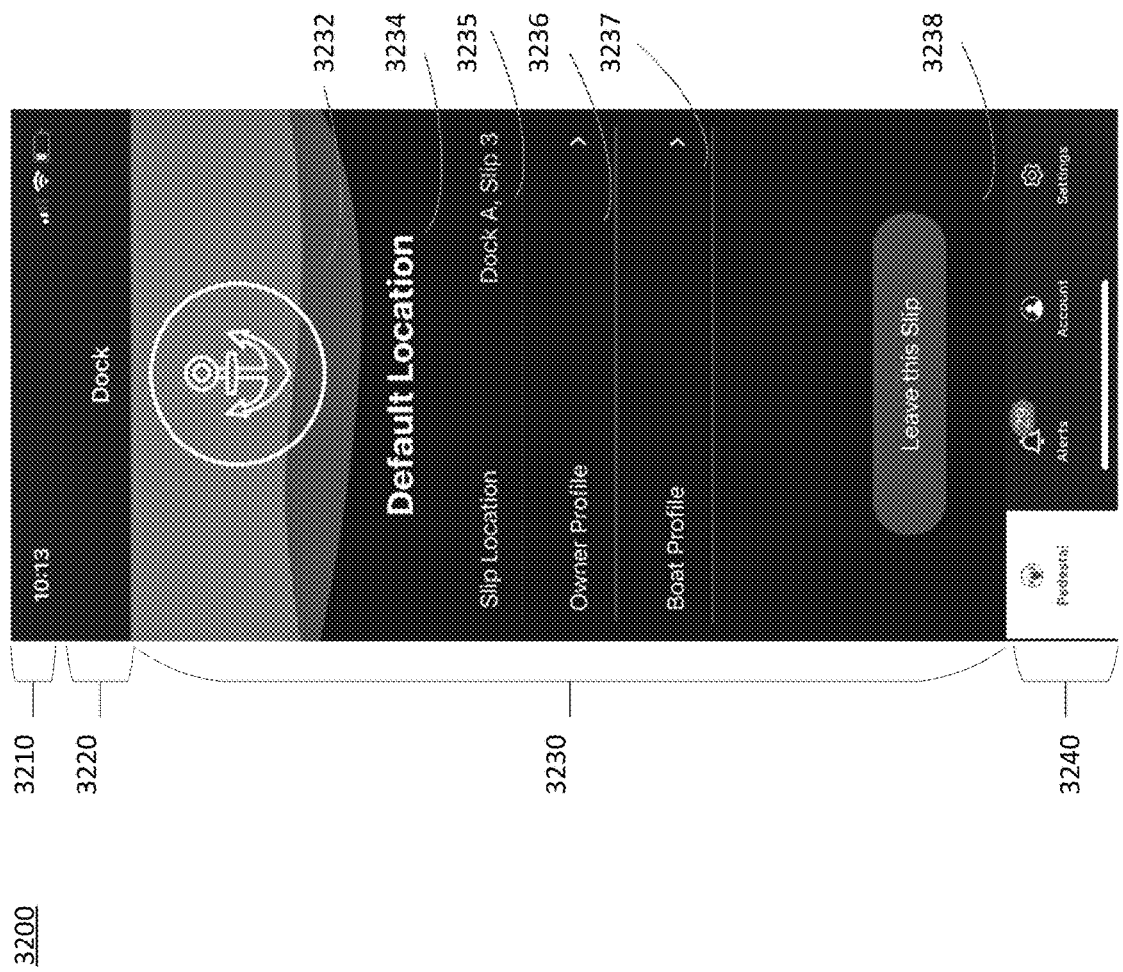

In a case that the end user connects to a pedestal, a second end user pedestal details screen 3200 may be displayed (as shown in FIG. 25C).

As shown in FIG. 25C, the second pedestal details screen 3200 may include multiple display areas including a status bar 3210, a navigation bar 3220, an active display pane 3230, and a tab bar 3240. The navigation bar may include a name of the pedestal (e.g., "Dock A, Slip 5" or just the name of the dock). The second pedestal details screen 3200 shows details of a pedestal that is currently connected to and provides a disconnect button 3238, which allows a user (captain/boat owner) to disconnect from the pedestal indicated by the navigation bar 3220 (e.g., "Dock A, Slip 5"). The active display pane 3230 may further include pertinent details regarding the respective pedestal, such as imagery 3232 (e.g., an anchor), a header 3234, location information 3235, an owner profile button 3236, a boat profile button 3237 and the disconnection button 3238.

The owner profile button 3236 and the boat profile button 3237 may be used to cause user interface screens for updating profile information (e.g., name and address, payment such as credit card information, contact information such as email/phone, and other suitable profile information.)

While viewing the screen 3200 (or an of the end user mobile application 800B screens), the user may press the alerts icon in the tab bar 3240. When the alerts icon from the tab bar is pressed in the end user mobile application 800B, an alerts user interface screen 3300 may be displayed, as illustrated by FIG. 25D. The alerts screen 3300 may be similar to the alerts home screen 1000 of the dockmaster mobile application 800A. It is noted that FIG. 25D shows a water alert ("Unexpected increase") in the second active pane 3340. The thresholds for power alerts and water alerts for the end user may be the same or different from the thresholds for power and water alerts for the dockmaster.

The alerts may be triggered based on pedestal states. For example, power and water consumption may be monitored (as measured by the transducers 110, 310 and the flow meters 111, 311 of the pedestal 10, 210). Thus, when the power usage or rate of increase is above a power alert threshold, a power alert may be generated. Likewise, when a water usage or rate of increase is above a water alert threshold, a water alert may be generated. When an emergency stop button (or actuator) on the pedestal is activated, an emergency alert may be generated. Each generated alert may be stored in the database in association with the pedestal information. Although three types of alerts (power, water and emergency) have been described, other suitable alerts may be generated (e.g., hazardous weather alert, dangerous situation alert).

Figure 25E:
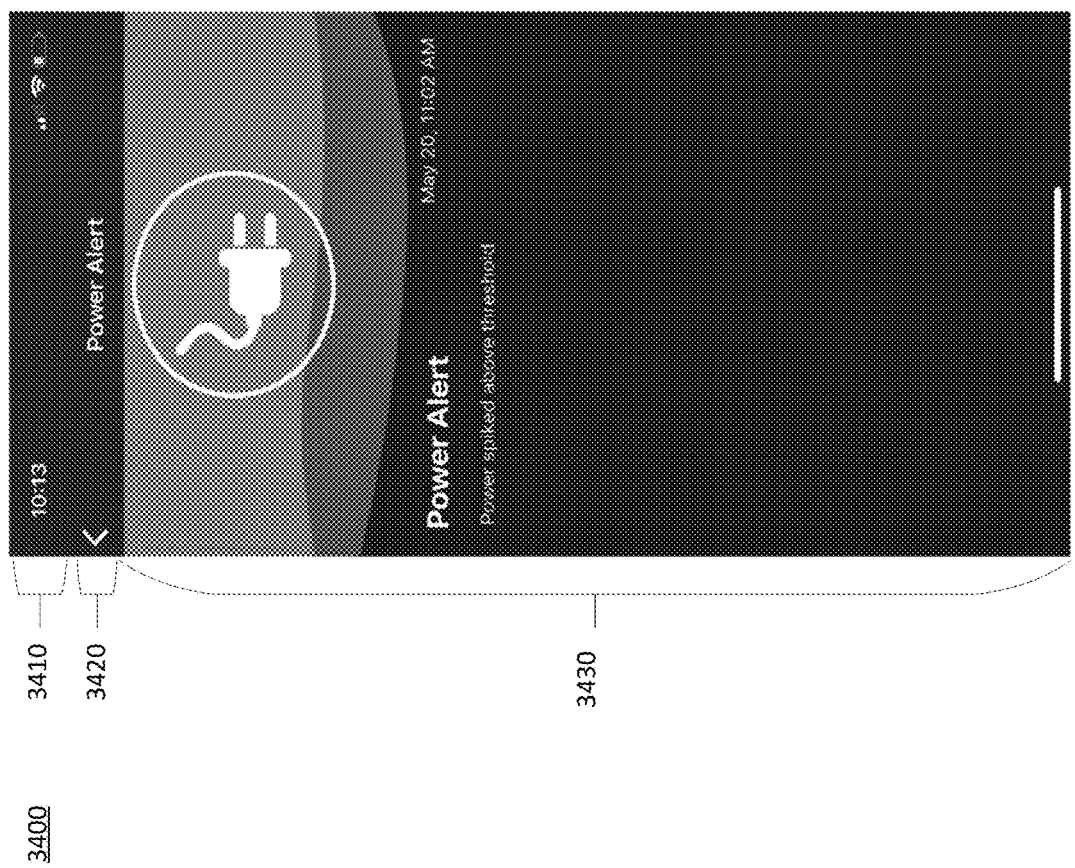

FIG. 25E shows a power alerts screen 3400 of the mobile application 800B. The alerts screens 3300 and 3400 of the mobile application 800B may be similar (e.g., display the same information but, for example, without the notes) to the alert screens 1000 and 1100 of the mobile application 800A. For example, when the user presses one of the alerts in the screen 3300, the power alerts screen 3400 may be displayed.

Figure 25F:
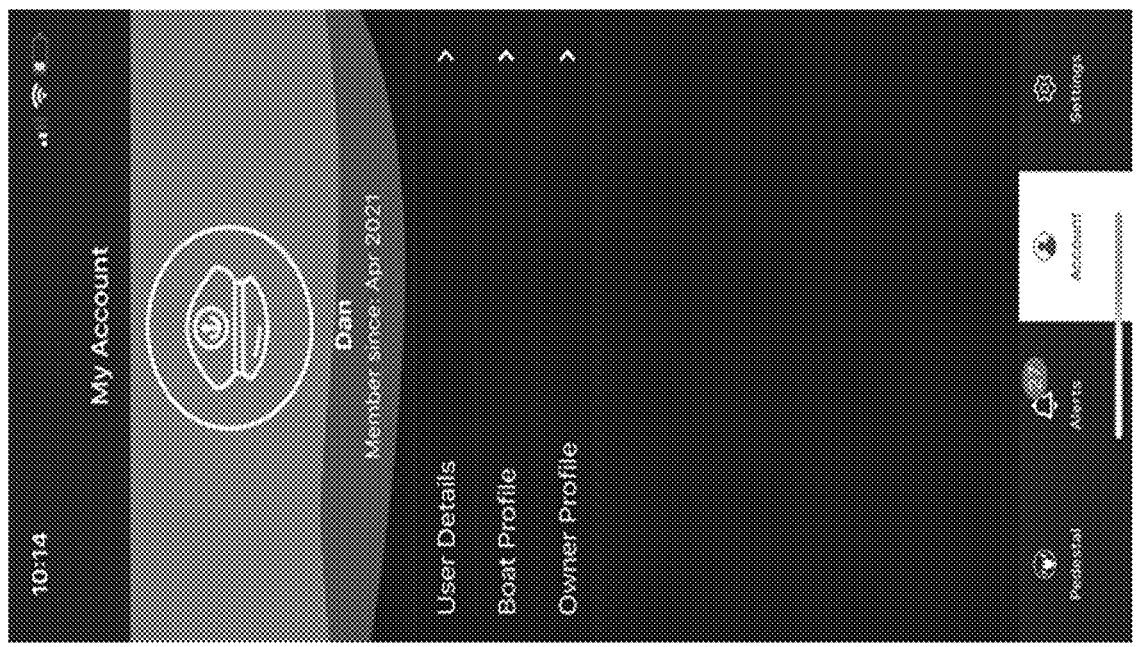

FIG. 25F shows a "My Account" screen 3500, which allows the end user to update account details as previously described herein. The "My Account" screen may be displayed at any time when the user presses the account button of the navigation bar of any of the mobile application 800B navigation bars.

The desktop application 900 may be a cloud/browser-based Admin Platform that provides everything at the fingertips of the Harbormaster/Marine Manager/Dockmaster. For example, the user may receive and manage alerts via the desktop application 900. With this cloud data monitoring the user can control and monitor the Pedestals, including multi-site management, and local management. The desktop application 900, which may be a web browser application (e.g., used by a smartphone browser or PC) may include various display screens. For example, the desktop application 900 may transmit webpage information that causes a web browser to form a webpage on an end user electronic device (e.g., PC).

Figure 26A:
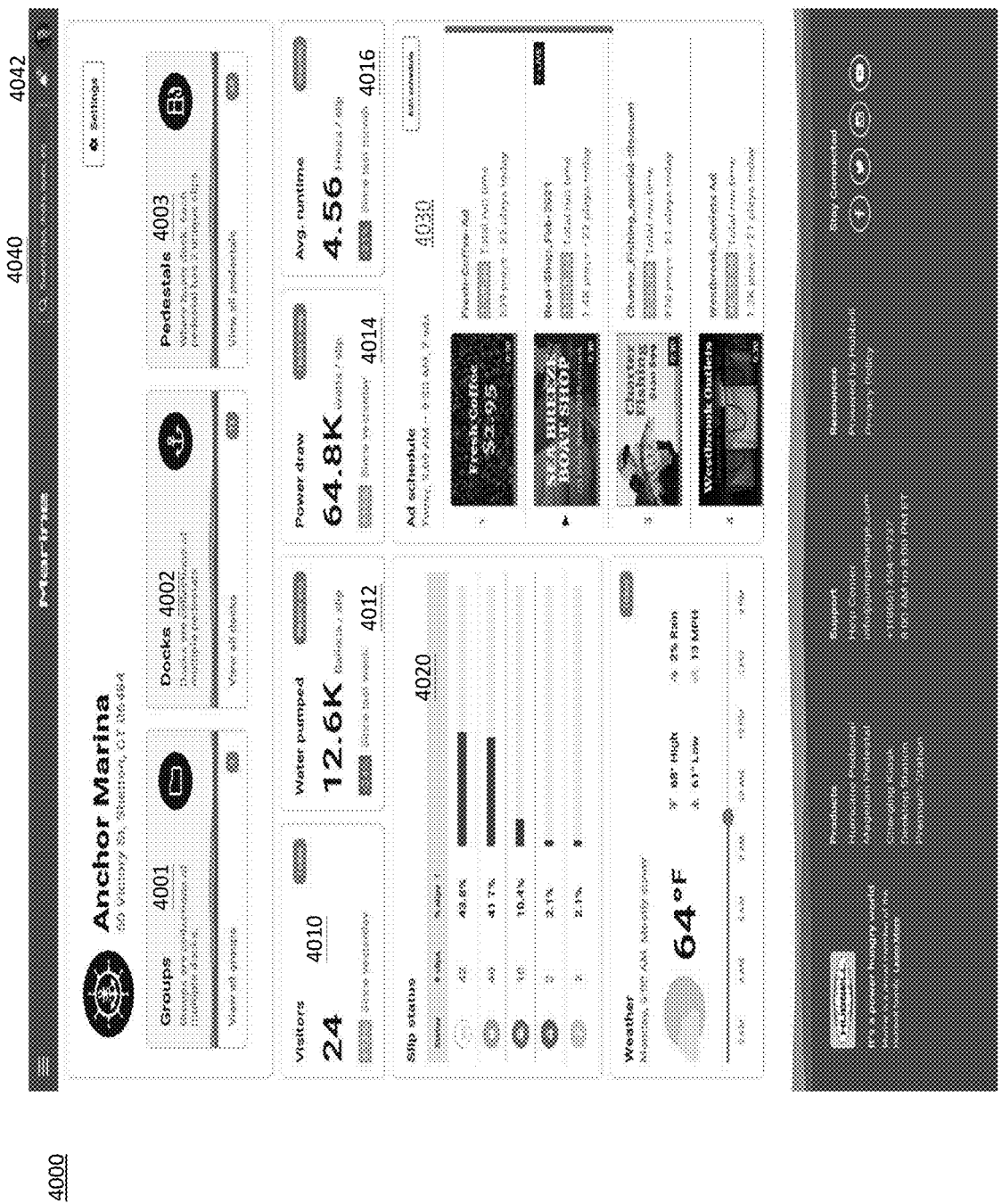
FIGS. 26A-26E show various webpages in accordance with various embodiments of a desktop administrative portal.
Figure 26B:
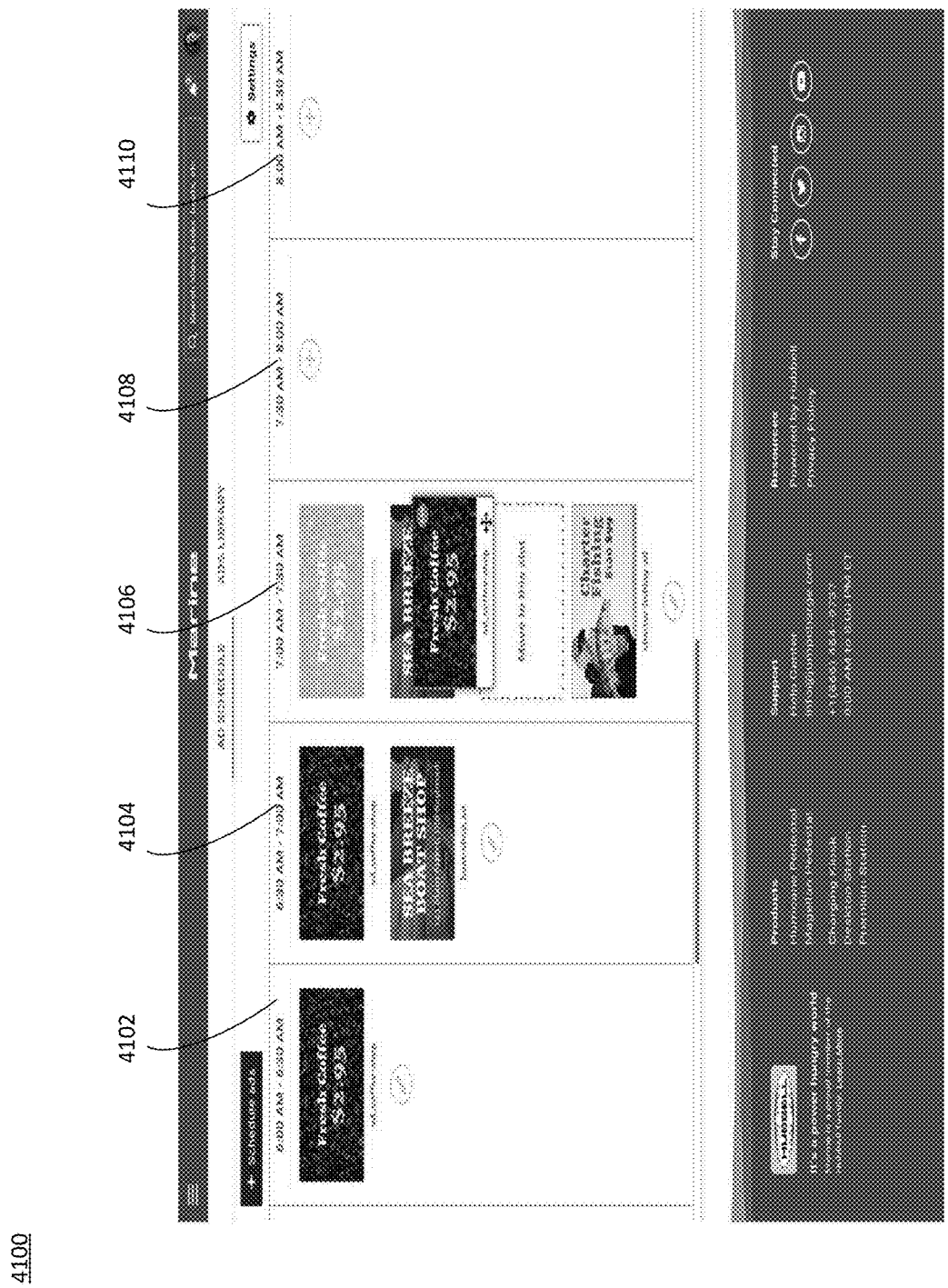

For example, after an initial login, a main administrative portal screen 4000 may be displayed as shown in FIG. 26A. The main screen 4000 may include clickable elements 4001, 4002 and 4003 that allow for traversing to a groups page, a docks page and a pedestal page, respectively. The groups page may correspond to a collection of multiple docks, the docks page may correspond to a collection of multiple pedestals and the pedestals page may correspond to where a boat docks. Each pedestal may have two unique slips. However, a pedestal may have one slip or more than two slips.

The main page 4000 may also include various data analytics, such as a visitor's pane 4010, a water pumped pane 4012, a power draw pane 4014 and an average runtime pane 4016. As shown in FIG. 26A, the panes 4010-4016 may include data regarding the respective item (e.g., visitors, water pumped, power drawn, average runtime) based on different temporal criterion (e.g., today, since yesterday, since last week, today's average, monthly, since last month, since last week) that associated with the displayed value (e.g., "24" for visitors, "12.6K gallons/slip" for water pumped, "64.8K watts/slip" for power drawn and "4.56 hours/slip" for average runtime.

The main page 4000 may also include a slip status pane 4020 and an advertisement schedule area 4030. The slip status page 4020 may provide similar information as active pane 1030 of the screen 1000 of the dockmaster administrative application 800A. For example, the slip status page 4020 may include five rows with four columns. The five rows may be for different slip status groups. In the embodiment shown, row 1 is slip available (e.g., active/commissioned and no boat currently checked in), row 2 is "online" or "commissioned" where a boat is connected to the electric charging station/pedestal and drawing power, row 3 is where a boat is connected to the pedestal but not drawing electrical power, row 4 is boats that need attention (e.g., an "emergency" button has been pressed) and row 5 is no connection and/or unknown status, as shown in FIG. 26A. The columns of pane 4020 may include a status icon column (corresponding to the status), a number of slips column (e.g., 40 active slips), a percent of slips the number of slips corresponds to.

The advertisement schedule area 4030 may show a schedule of ads that are to be played. For example, pane 4030 shows four ads ("Fresh-Coffee" ad, "Boat-Shop" ad, "Charter Fishing" ad and a shopping outlet ad). The ad schedule screen 4030 may include an edit schedule button that may be used to edit the displayed ad schedule. The ad schedule screen may also display a summary of the current time and ads being displayed during a time block (e.g., "Today, 9:00 AM-9:30 AM, 7 ads"). The screen 4030 may also display additional information in association with each ad (e.g., total run time, number of plays/views, and number of plays today).

When the user clicks on (or presses) the edit schedule button of the pane 4030, an edit ad schedule screen 4100 may be displayed. The edit ad schedule screen may be in a calendar format including time block columns (e.g., columns 4102, 4104, 4106, 4108 and 4110) each corresponding to consecutive blocks of time. The blocks of time may be in 30 minute increments or other suitable increments (e.g., 15 minutes, or an hour or multiple hours). The blocks of time may include all blocks of time (all day, every day) or blocks of time when the dock is open or other suitable filters. As can be seen by screen 4100, the user may drag and drop an ad to one of the blocks of time 4102-4110 to edit the ad schedule. Once the user drops the ad, or drops the ad and clicks save, the database may update the ad tv schedule for that dock, group or pedestal.

Figure 26C:
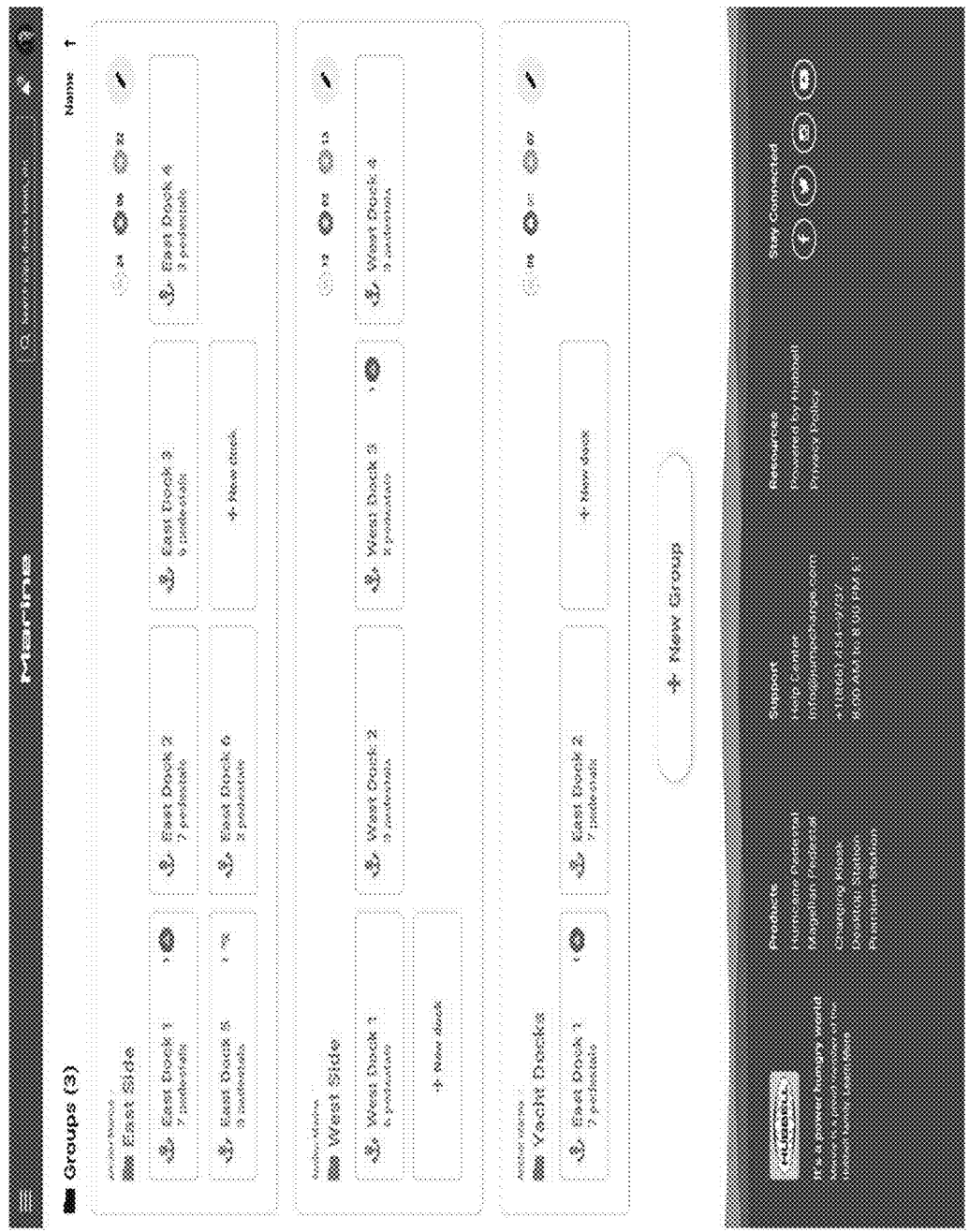

FIG. 26C shows a groups page 4200 that allows organizes pedestals within docks and docks within groups. The groups page 4200 may be similar to the group's functionality of the mobile application 800A. The groups page 4200 may include multiple groups displayed at one, such as the "East Side" group, the "West Side" group and the "Yacht" docks group as shown in FIG. 26C). Each group section (e.g., the "East Side" group section) may include a button for adding a new dock, information regarding each dock (e.g., East Docks 1-6) that are associated/registered with the logged in dockmaster user. The groups page 4200 may also include a new group button that can be used for updating the database. When a user adds a new group or new dock to a group, the database (e.g., the data tables of FIGS. 23A and 23B) may be updated to save the new association in the database.

The main page 4000 may also include a search bar 4040 and an alerts or notifications icon 4042. The search bar 4040 may allow a dockmaster/administrator to search for slips, docks, boats or groups using words or values associated with the slip, dock, group or boat (e.g., the dock name of the group, the location of the dock, the pedestal board identifier number).

Figure 26D:
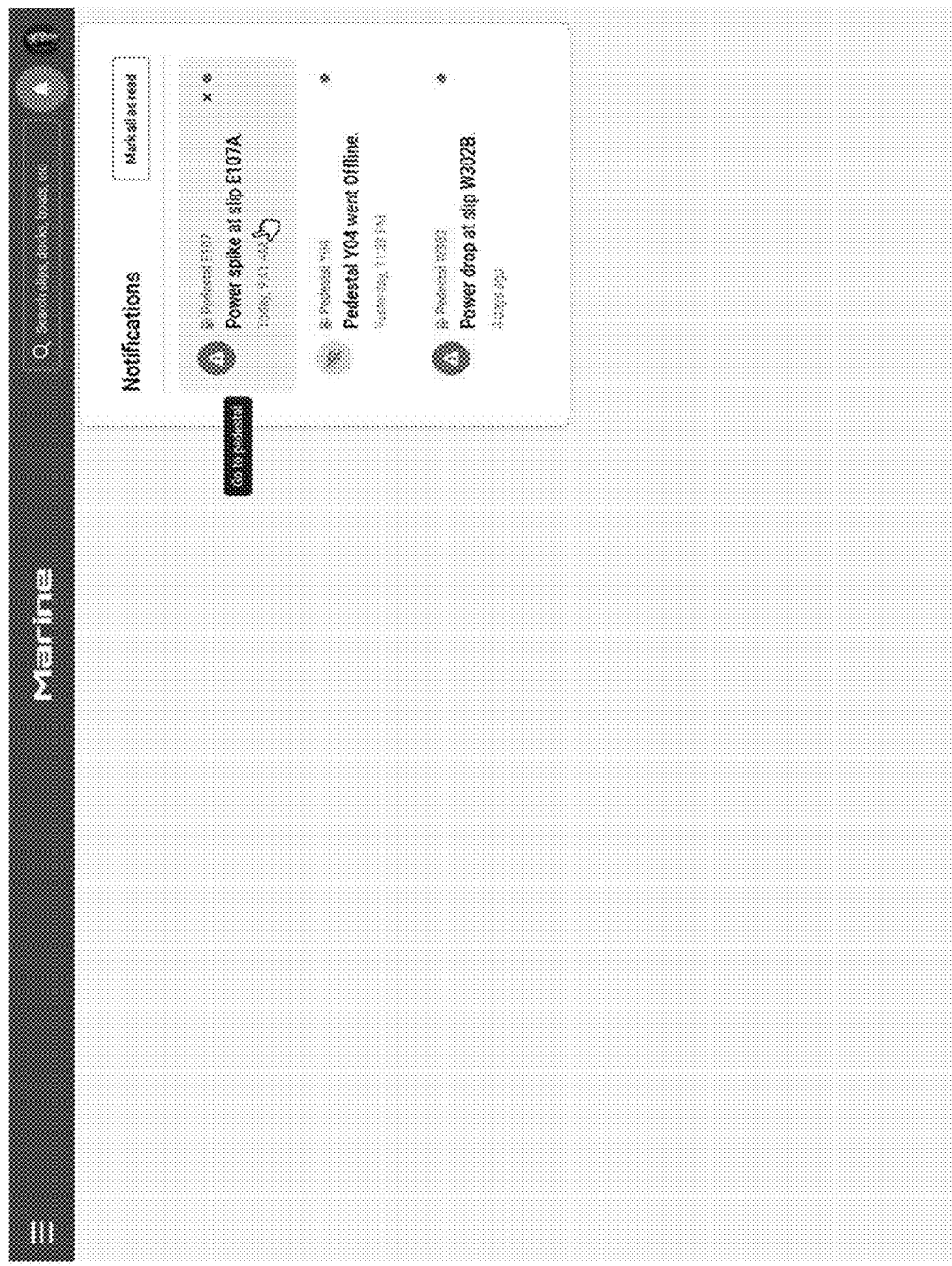

The alerts or notifications icon 4042 may be pressed to navigate to an alerts screen (e.g., alerts screen 4300 of FIG. 26D), which may be similar to the alerts screen of the mobile application 800 discussed above. The alerts screen 4300 of the desktop application 900 may be a drop down item notification that provides the various alerts as shown in detail of FIG. 26D. For example, the alerts screen 4300 may include three power alerts including pedestal identifying information (e.g., Pedestal E107), a description of the alert ("Power spike at slip E107A") and a timestamp (e.g., of the alert generation).

Figure 26E:
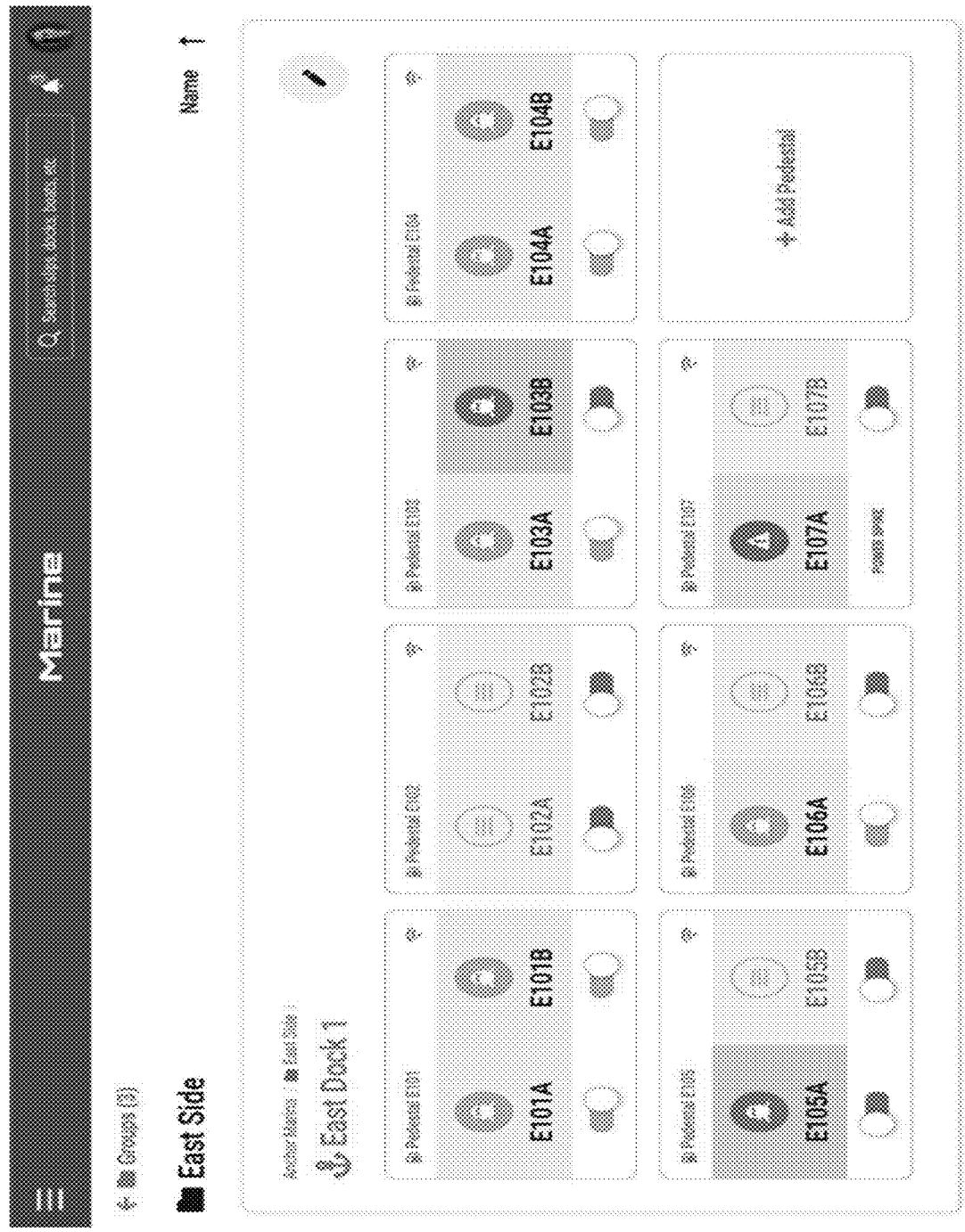

When a group is clicked on (or selected) in the desktop application 900 (e.g., East Dock 1 is clicked on from screen 4200), a live status page 4400 may be displayed. The live status page 4400 may include a navigation button ("Groups (3)") for navigating back to a previous groups page. The live status page may include various icons and color schemes to show if a pedestal is online, offline, in use or available for use. For example, a first color (e.g., green) may be used to show online and a second color (e.g., red) may be used to show emergency (e.g., power spike for E107A in FIG. 26E). According to various embodiments, a third color (e.g., grey) may be used to show the pedestal (or pedestal side) is offline or in use. A fourth color (e.g., a darker shade of grey) may be used for "in use" and a fifth color (e.g., a lighter shade of grey) may be used for decommissioned, as shown in FIG. 26E. An add pedestal button may be available on the screen 4400 for adding a pedestal.

The server 510 may also include various data analytics engines which may be based on use of the neural network (e.g., artificial intelligence, machine learning, etc.) as previously described above. For example, the server 510 may collect user interest/preference information and train the neural network to predict content (e.g., advertisements) that an end user (e.g., a boat owner or captain) may be interested in. The user interest information may be based on the user's use of pedestals/docks or from other sources (e.g., a third party information providing service, such as social media). The neural network may learn from the end user's behavior on the end user mobile application 800B and engagement with advertisements, which leads to more effective targeted ads. The targeted ads may be provided in a targeted ads library for use with dragging and dropping into the editable schedule as previously discussed.

The cloud/browser-based applications 800A and 900B are intended for use by platform administrators, multi-site management, and local management to control and monitor a set of intelligent power pedestals. The server 510 and database may assign unique pedestal IDs to a marina slip map. Tiered reporting and control (e.g., all units, units by ownership group that may cross multiple locations), units by individual marina, units by dock location within individual marina) may be provided. The database may use an ID convention of Parent ID/Marina ID/Dock ID/Slip ID/Unit ID.

The server 510 may provide the ability to reassign units by ID within the marina to a different slip and provide control of units by group (commissioning/decommissioning).

The applications 800A and 900 may include downstream controls. For example, the downstream controls may include control of units by individual unit and group (commissioning/decommissioning), reset of emergency lighting, rules-based lighting control, manual lighting control, message creation for display on Hurricane unit or display of pedestal, message transmission to individual pedestals or pedestals by group (i.e. entire marina, individual docks), such as a targeted banner ad or an alert. For example, the downstream controls may further or alternatively include delivery of advertising content by group (e.g., in application or via text/email). For example, the downstream controls may further or alternatively include the ability to adjust frequency of individual advertising placements (super user) (i.e. 10 seconds, 20 seconds, etc.). For example, the downstream controls may further or alternatively include the ability to set power output tolerance alerts (high/low) per side of pedestal/kiosk.

The applications 800A and 900 may include upstream data including an emergency alert display by individual pedestal location and a current configuration of each power center by pedestal location (e.g., left/right, L/R). A table of possible power configurations (per side) may include one of 2×30 (e.g., two 30 A power units 84, 284), 2×50 (e.g., two 50 A power units 84, 284), 1×30/1×50 (e.g., one 30 A power unit 84, 284 and one 50 A power unit 84, 284), 100 (e.g., a 100 A power unit 84, 284) or 200 (e.g., a 200 A power unit 84, 284). On base units, there may be one set of configurations per side, while on various embodiments, there may be a combination of configurations in addition to 200 A connections.

The applications 800A and 900 may include reporting functions. For example, tolerance alerts may be used (power spikes/drops outside of variable levels), power usage, water usage, pedestal emergency alerts (including a remote reset button), alert data transmitted to a mobile app, such as the mobile application 800A or 800B. Further, a power off alert may be provided to an occupied slip (e.g., alert dockmaster if power should be on and is turned off).

The dockmaster mobile application 800A may be a smartphone application designed to be a superset of the captain/owner mobile app. It will provide limited visibility of pedestal operating conditions and allow remote commissioning and decommissioning of an individual or group of pedestals. For example, the application 800B may include an identification function (e.g., an ability to scan pedestal QR code for quick access to pedestal data), a reporting function (e.g., reporting power alerts outside of range (set at admin console app)), a control function (e.g., emergency alerts (remote reset), remote shutdown of pedestal/groups, and remote commissioning of pedestal/groups.

The end user application 800B (the captain/owner mobile app) may be a subset of the dockmaster applications 800A and 900 from a reporting/alerts perspective. According to an embodiment, there may be no pedestal controls whatsoever available to the captain/owner. In addition to receiving alerts, the end user application 800B is intended to link preference information to the kiosk from the cloud-based database as well as receiving power condition alerts.

For example, the end user application 800B may include an ability to scan the QR code associated with the appropriate side of the power pedestal since some implementations will serve two slips from a single device, and collect basic registration data including: Owner/captain contact information, Boat LOA, draft, beam, Power requirements, Home port, and News/sports preferences. The end user application 800B may also include an ability to set power alert parameters and receive power alerts.

For example, the end user application 800B may include sending arrival/departure alerts (e.g., alerts dockmaster that a new vessel has plugged in with auto population of relevant information on dockmaster cloud console from smartphone profile including power amperage in use).

Figure 27:
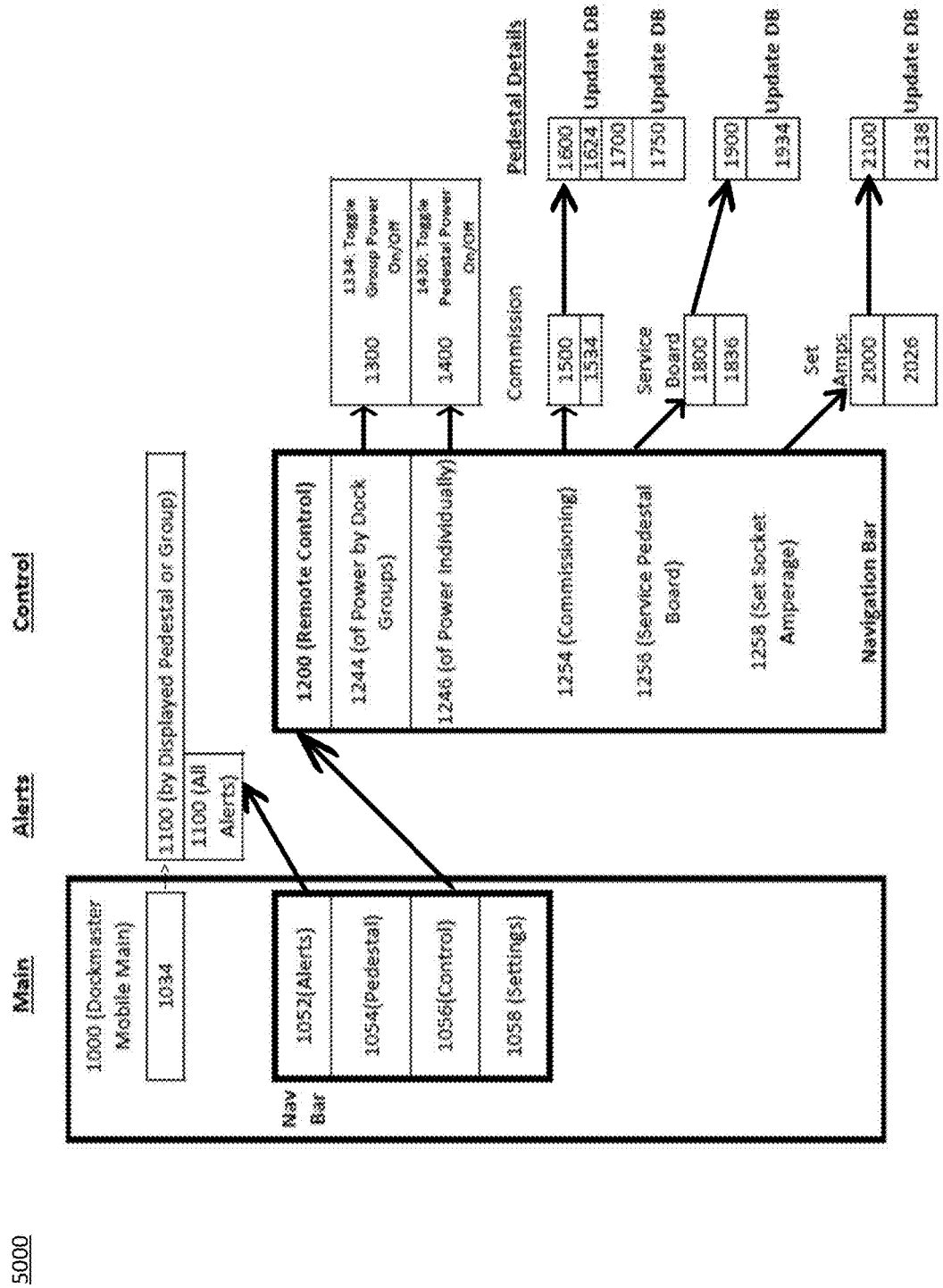
FIG. 27 shows a flowchart of the user interface screens and buttons of an embodiment of the dockmaster mobile application shown in FIGS. 24A-24L.

FIG. 27 shows a flowchart 5000 of the user interface screens and buttons 800A of an embodiment of the dockmaster mobile application 800A. The arrows of FIG. 27 indicate where a button takes the user (i.e., how the screens transition). The "Update DB" area indicates that the database of the server (main server or edge server) is updated based on each of the actions that recite "Update DB." That is, when a dockmaster changes a commission status, or sets a wattage, the database is updated accordingly. The captain mobile application 800B and desktop application 900 may have similar flows.

Figure 28:
FIG. 28 shows a launch screen of the dockmaster mobile application according to an embodiment of the disclosure.

FIGS. 28 and 29 show a launch screen 6000 and login screen 6100 of a dockmaster mobile application 800A. The launch screen may splash across a display of the device launching the dockmaster mobile application 800A when the dockmaster mobile application 800A is launched. The login screen 6100 may automatically follow the launch screen 6000 and be configured to receive user login credentials via a username or email textbox 602, and a password textbox 604. The login screen 6100 may be used to authenticate a user (e.g., locally or at the server 510) as a dockmaster using an entered username or email and password.

Figure 30:
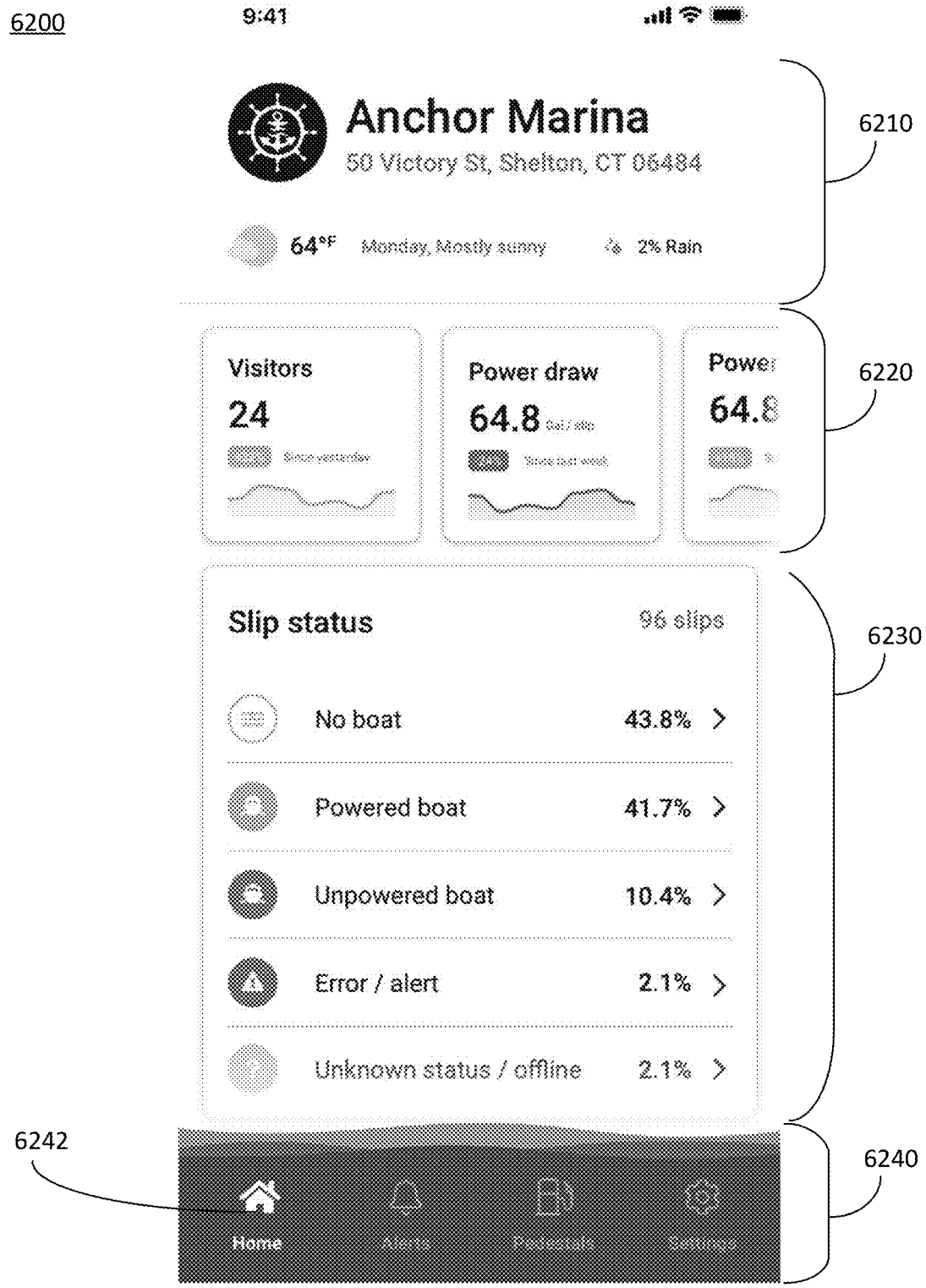
FIG. 30 shows a dashboard screen of the dockmaster mobile application according to an embodiment of the disclosure.

FIG. 30 shows a dashboard screen 6200 that a logged-in user of the dockmaster mobile application 800A may be directed to upon logging into the dockmaster mobile application 800A. In the embodiment shown, the dashboard screen 6200 includes a weather forecast portion 6210, a power pedestal usage statistics portion 6220, a slip status portion 6230, and a navigation banner 6240 including a home button 6242 associated with the dashboard screen 6200. In the slip status portion 6230, a user of the dockmaster mobile application 800A can select different icons to see a list of electric charging pedestals 520A, 520B associated with slips having a listed status (e.g., an error/alert status.)

Figure 31A:
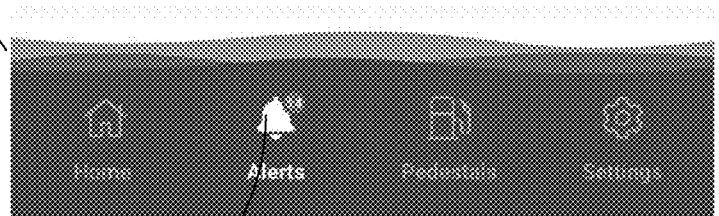
Figure 31C:

FIGS. 31A-31C show alert reporting and handling screens of the dockmaster mobile application 800A. The alerts screen 6400 displays alerts and is associated with an alerts icon 6422 shown in a navigation banner 6420. An alerts list portion 6410 of the alerts screen 6400 lists alerts and charging pedestals 520A, 520B or slips associated with those alerts. A user may choose to place the alerts screen 6400 in edit mode by selecting an edit button 6424. The user may then select and dismiss the selected alerts or cancel out of the edit mode. Alerts may also be dismissed with a swiping motion, as shown in FIG. 31C.

Figure 32:
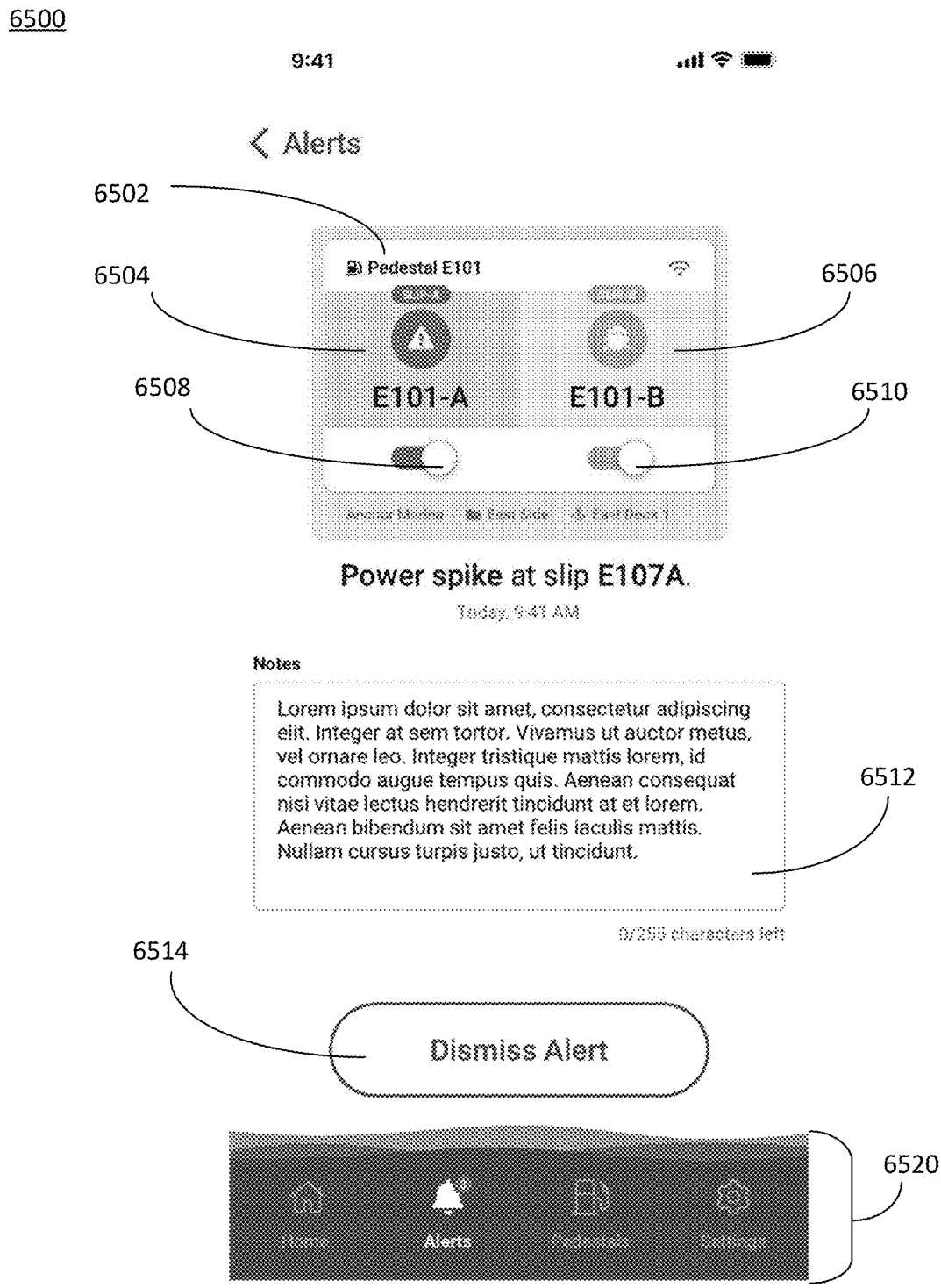
FIG. 32 shows an alert details screen of the dockmaster mobile application according to an embodiment of the disclosure.

FIG. 32 shows an alert details pages, where a user is enabled to write notes on the alert in a notes textbox 6514. The user may also dismiss the alert on this page by selecting a "dismiss alert" button 6514. The user is also enabled to control power to one or more electrical power units 84 of a charging pedestal 520A, 520B using a pedestal window 6502 and interactive features located therein (e.g., toggles 6508, 6510).

Figure 33:
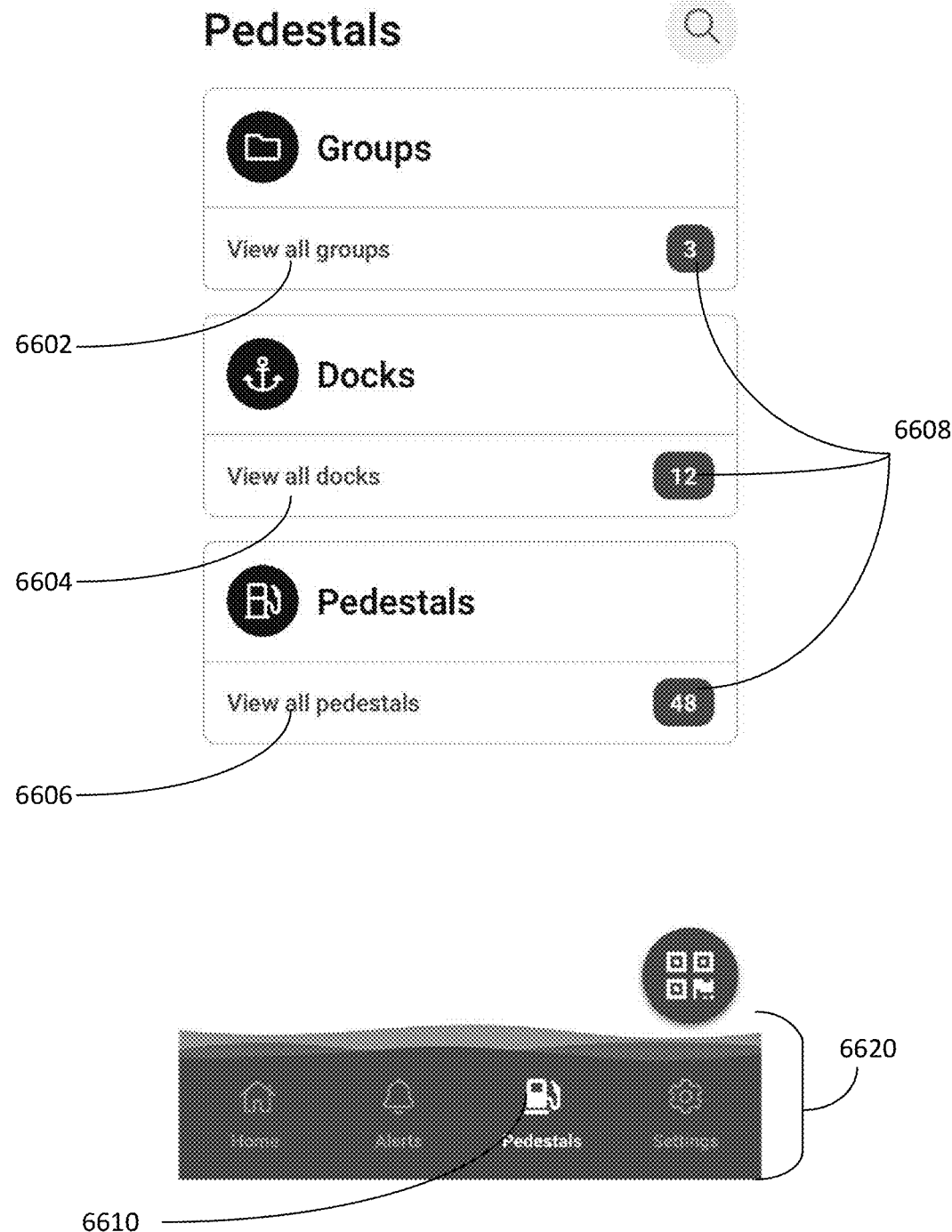
FIG. 33 shows a pedestals navigation screen of the dockmaster mobile application according to an embodiment of the disclosure.

FIG. 33 shows a pedestals navigation screen 6600 of the dockmaster mobile application 800A, associated with a pedestals icon 6610 of a navigation banner 6620. Charging pedestals 800A may be associated with physical docks and user-definable groups. At the pedestals navigation screen, the user may view groups of charging pedestals 520A, 520B by selecting a "View all groups button" button 6602. The user may also view all docks associated with charging pedestals 800A by selecting a "View all docks" button 6604, and may view all pedestals by selecting a "View all pedestals" button 6606. Counters 6608 may indicate how many groups, docks, and charging pedestals 520A, 520B can be viewed.

Figure 34A:
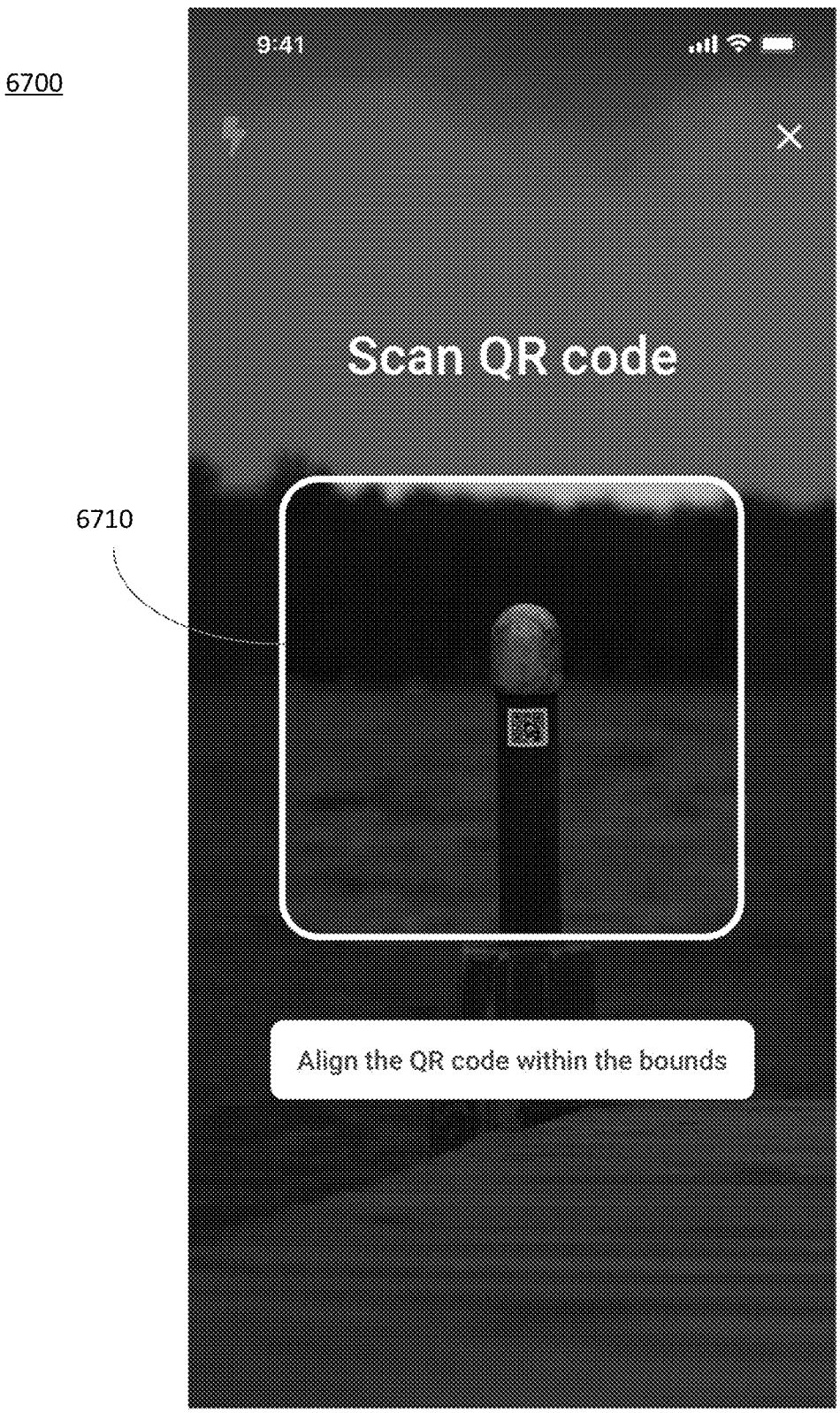
FIG. 34A-34C shows a pedestal scanning screen of the dockmaster mobile application according to a plurality of embodiments of the disclosure.
Figure 34B:
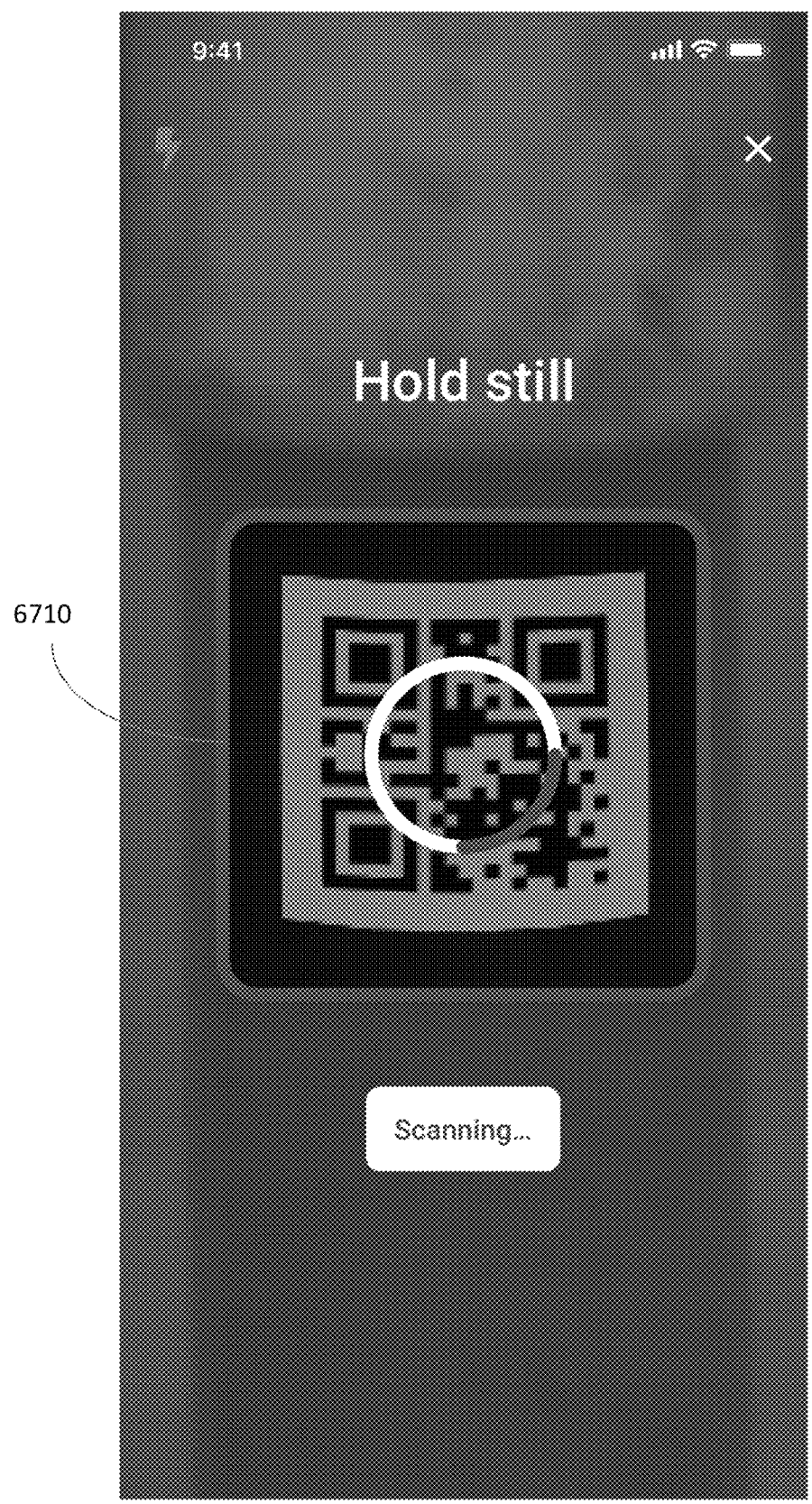
Figure 34C:
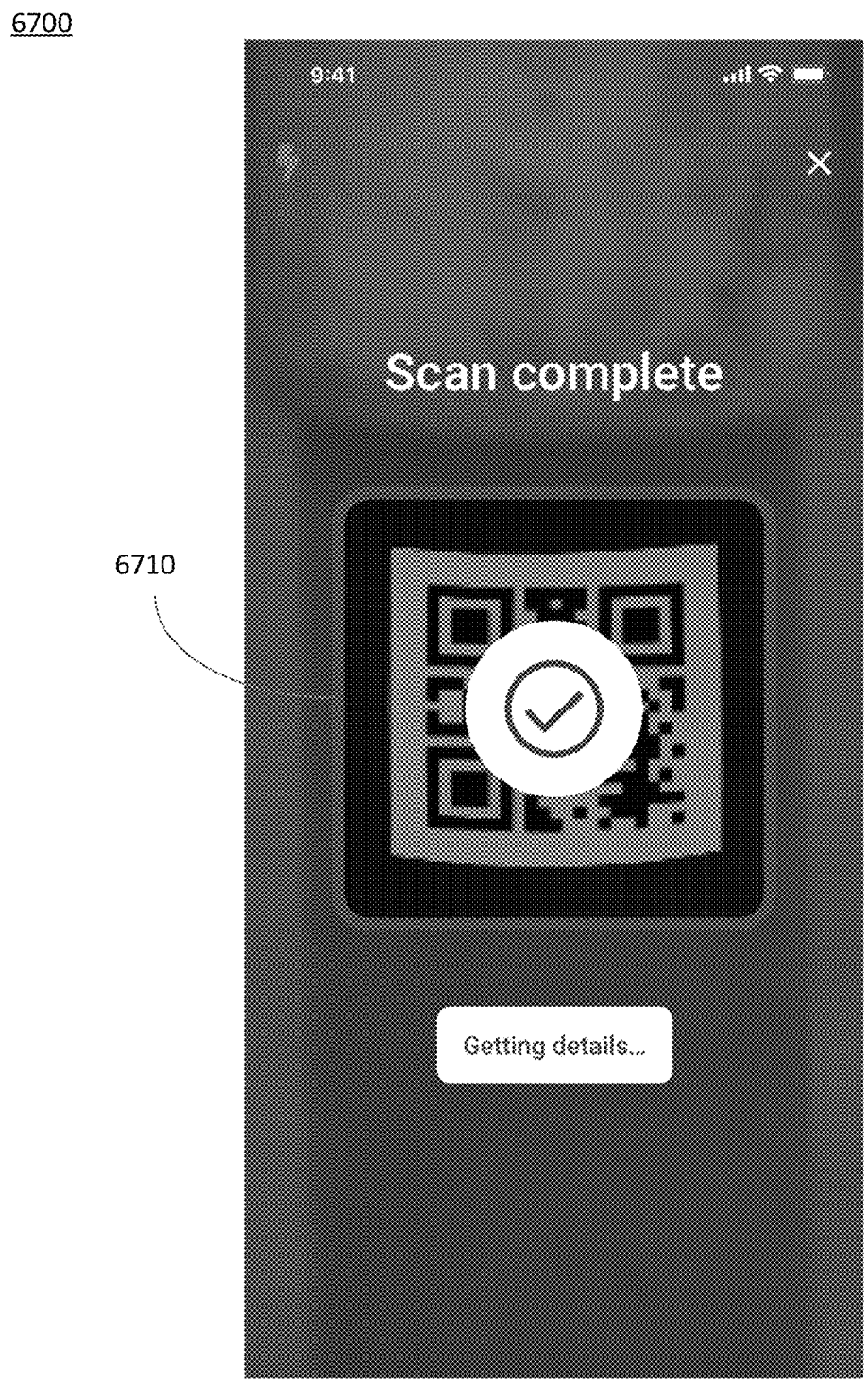
Figure 35A:
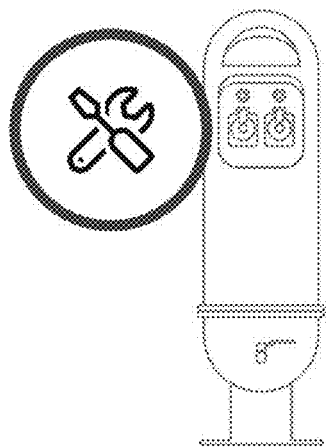
Figure 35B:
Figure 35C:
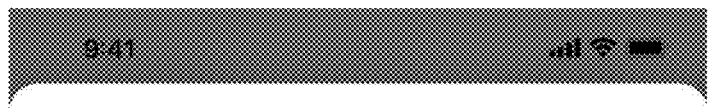
Figure 35D:
Figure 35H:
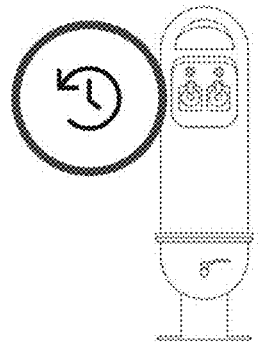
Figure 35I:
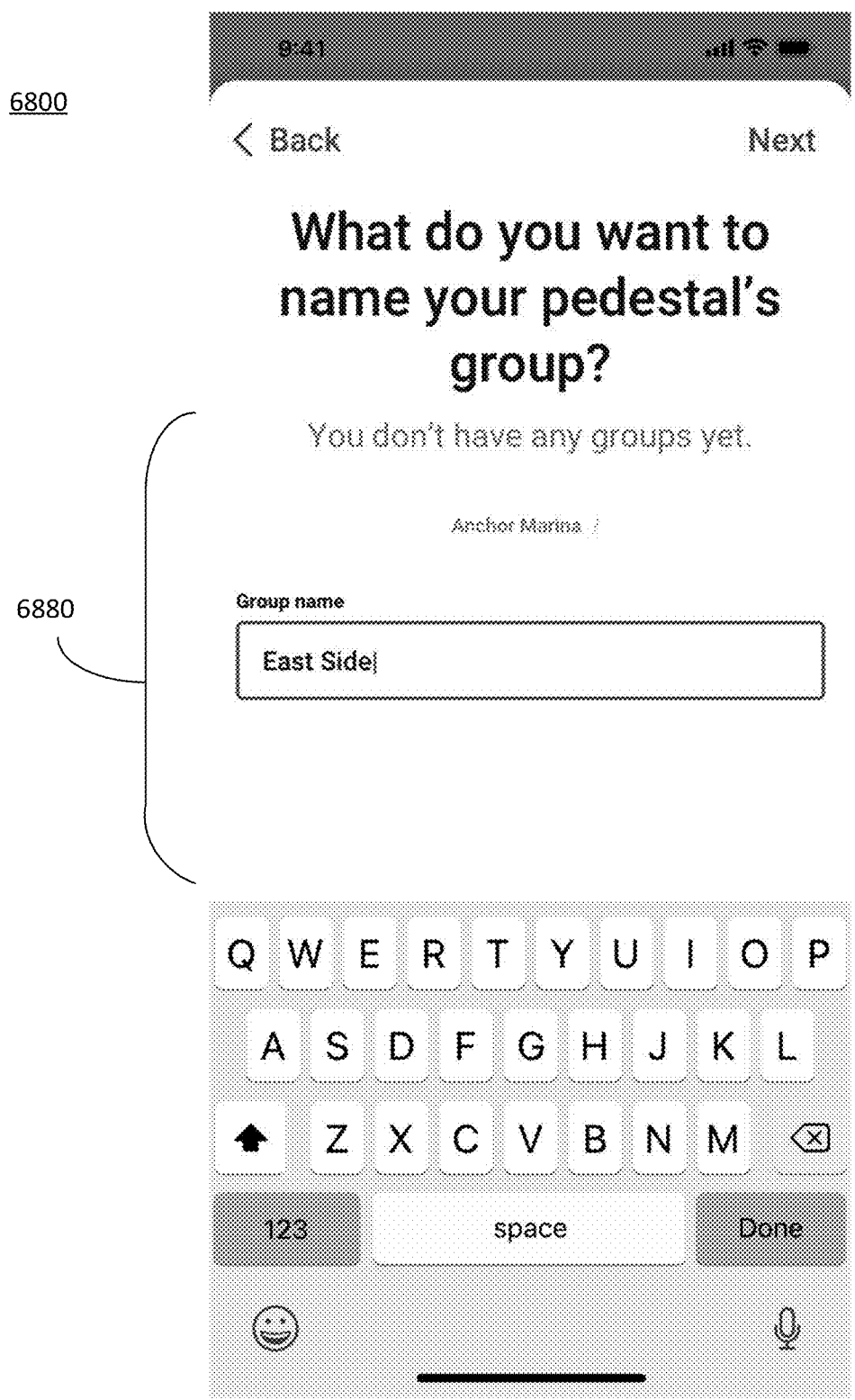
Figure 35J:
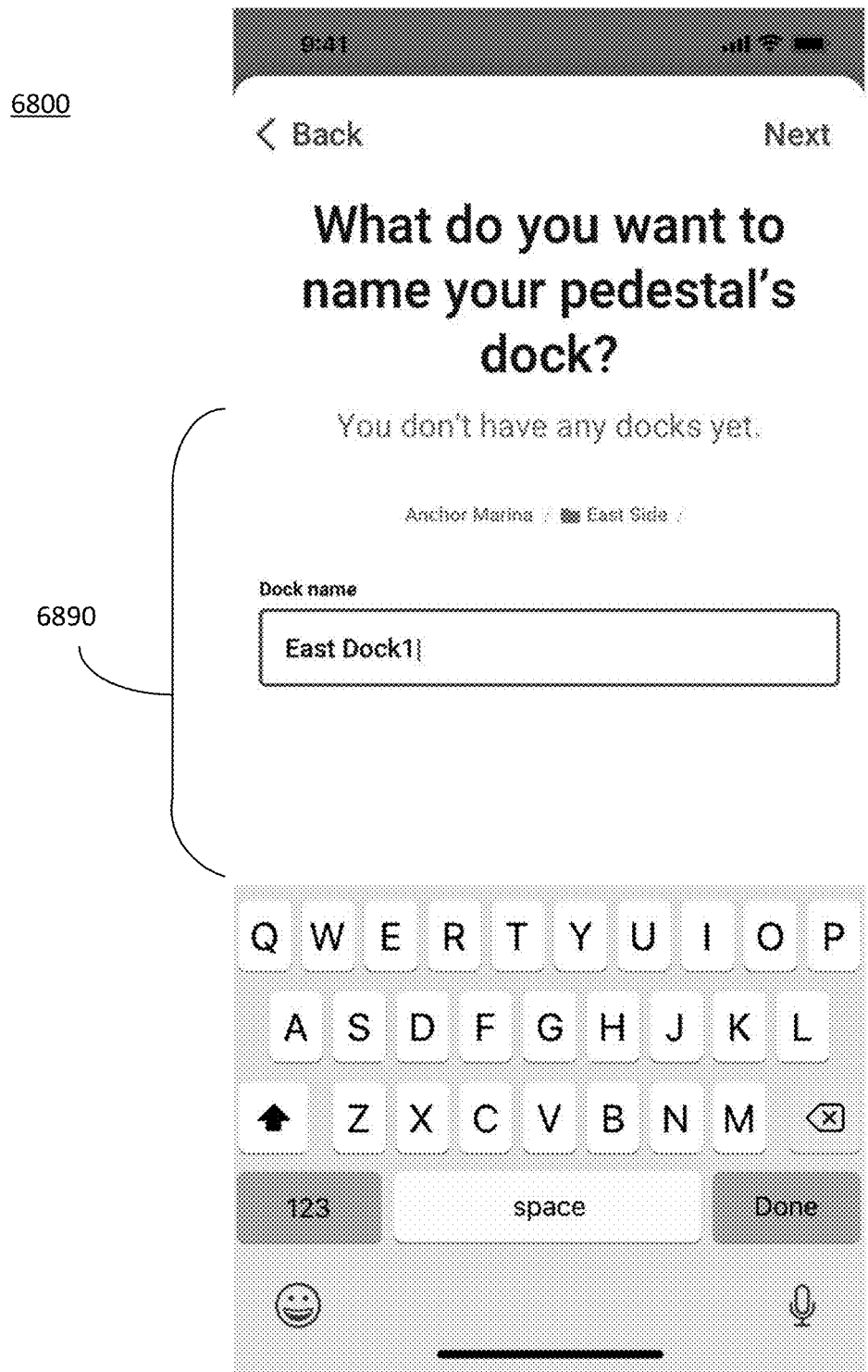
Figure 35K:
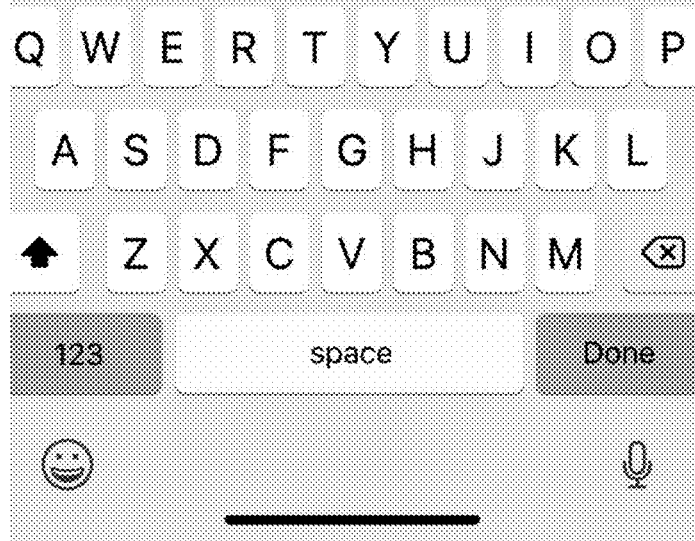

FIGS. 34A-34C show a pedestal scanning screen 6700 of the dockmaster mobile application. A scanning reticle 6710 of the pedestal scanning screen is configured to be used to align a camera or scanner of the device on which the dockmaster mobile application 800A is running with a QR code or bar code. Once aligned, the pedestal scanning screen 6700 communicates to the user that it is scanning the QR code or bar code. When the scan is successfully completed, the pedestal scanning screen 6700 communicates to the user that the scan is complete.

FIGS. 35A-35K show numerous screens, subscreens, and overlays of a pedestal commissioning screen 6800. In the embodiment shown, a charging pedestal 520A, 520B has been selected by a user by scanning its QR code, as described and shown above. In some embodiments, a pedestal may be selected by entering its serial number into the dockmaster mobile application 800A. A pedestal details portion of the pedestal commissioning screen displays information about the selected charging pedestal 520A, 520B. When the "Start commissioning" button is pressed, the user is led through a plurality of commissioning steps in order to commission the selected charging pedestal 520A, 520B. In the embodiment shown, one of the steps includes selecting a group to add the selected charging pedestal 520A, 520B to a group using the available groups portion 6820 of the pedestal commissioning screen 6800, or by using the "Add a new group" button 6822. Another step includes selecting a dock to associate the selected charging pedestal 520A, 520B in a similar fashion to that described with respect to selecting groups (by using an available docks portion 6830 or an "Add new dock" button 6832). An additional step may include confirming the charging pedestal 520A, 520B being commissioned via an available pedestals portion 6840 of the pedestal commissioning screen 6800 or using an add new pedestal button 6842. The name of the slips on each side of the charging pedestal 520A, 520B can be entered using the overlays shown in FIGS. 35E and 35F, and the commissioning of the charging pedestal 520A, 520B is confirmed via the confirmation overlay shown in FIG. 35G. These settings of the commissioned charging pedestal 520A, 520B may then be edited using the subscreens/overlays of the commissioning screen 6800 shown in FIGS. 35H-35K

Figure 36:
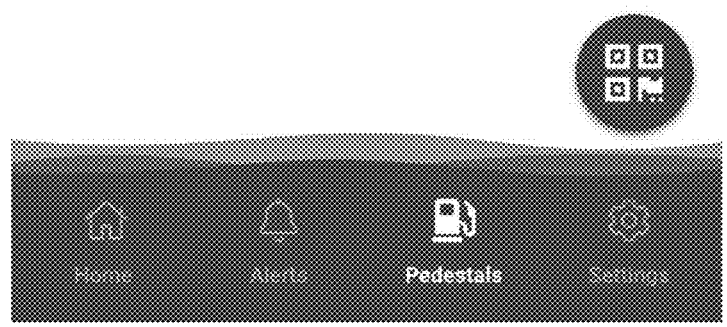
FIG. 36 shows an all-pedestal-groups screen of the dockmaster mobile application according to an embodiment of the disclosure.

FIG. 36 shows an all-pedestal-groups screen 7000 at which a user can select a group of charging pedestals 520A, 520B via a group list portion 7010.

Figure 37:
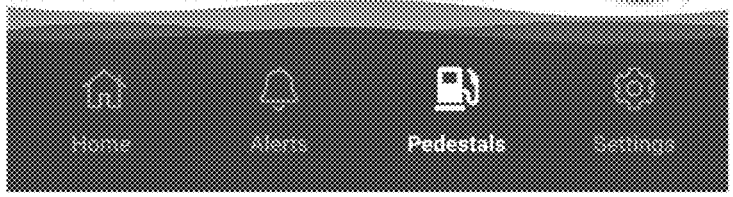
FIG. 37 shows an all-docks listing screen of the dockmaster mobile application according to an embodiment of the disclosure.

FIG. 37 shows an all-docks screen 7100 at which a user can select a dock associated with charging pedestals 520A, 520B via a dock list portion 7110.

Figure 38A:
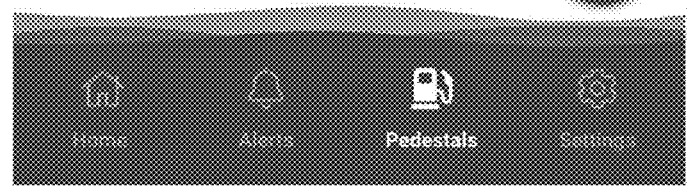
FIGS. 38A and 38B show all-pedestal listing screens of the dockmaster mobile application according to various embodiments of the disclosure.
Figure 38B:
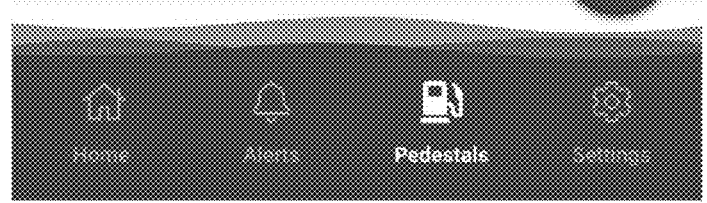

FIGS. 38A and 38B shows an all-pedestals screen 7200 at which a user can select charging pedestals 520A, 520B via a pedestal list portion 7210. In the embodiment shown, the all-pedestals screen 7200 also shows decommissioned charging pedestals 520A, 520B in a decommissioned pedestals portion 7230.

Figure 39:
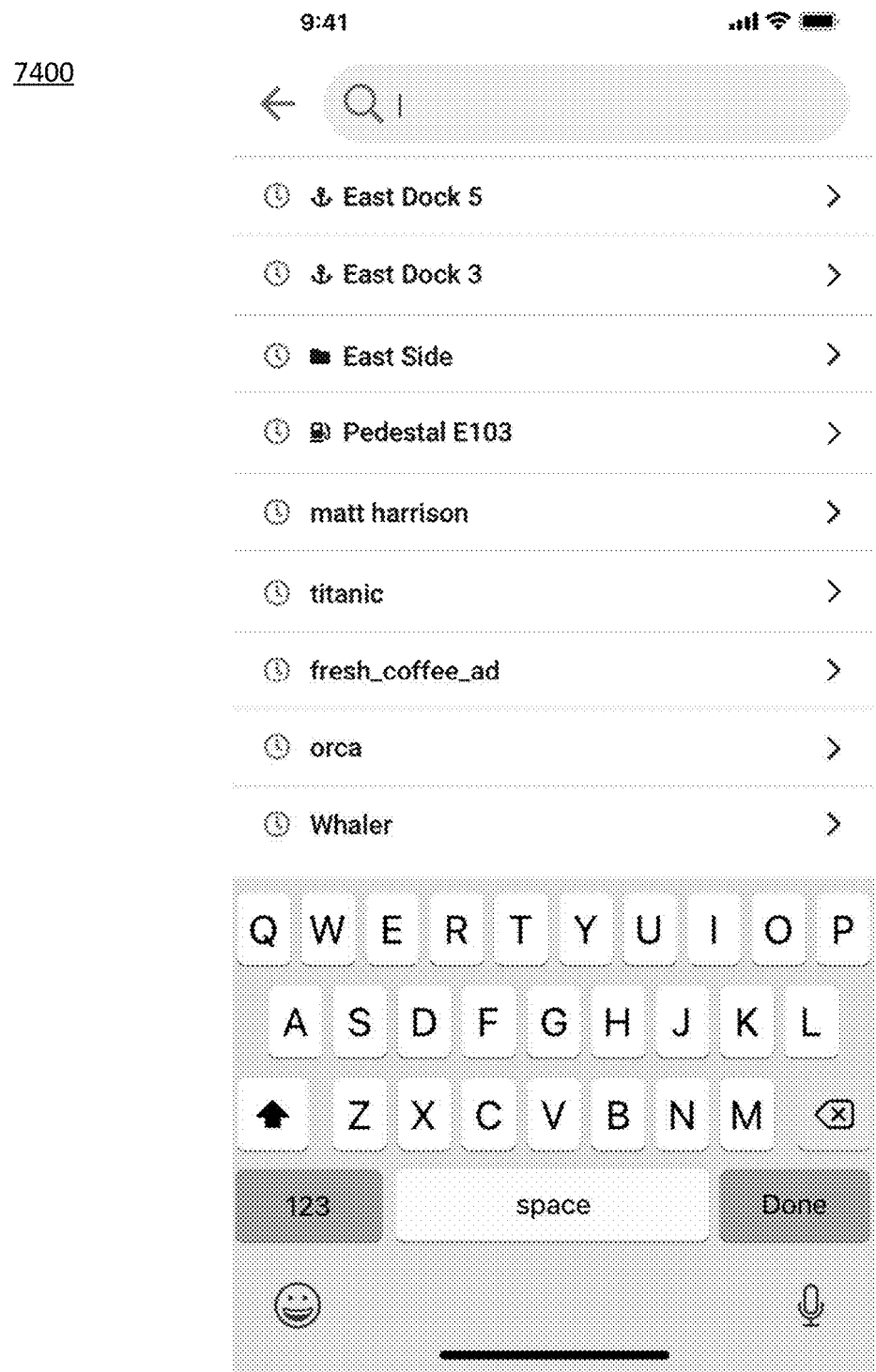
FIG. 39 shows a search screen of the dockmaster mobile application according to an embodiment of the disclosure.

FIG. 39 shows a search screen 7300 of the dockmaster mobile application 800A at which a user may search for charging pedestals 520A, 520B, groups of pedestals, docks, etc.

Figure 40:
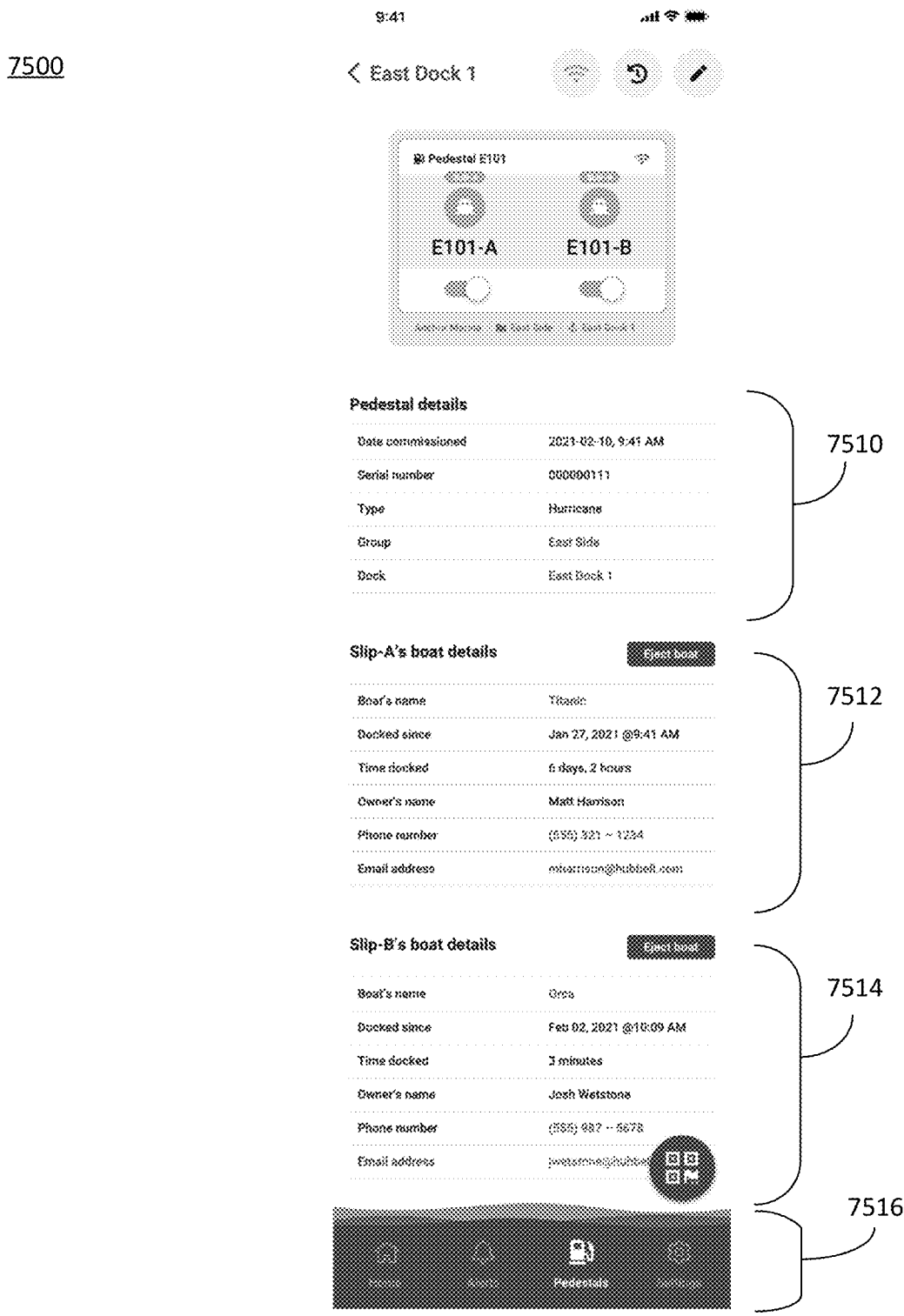
FIG. 40 shows a pedestal details and control screen of the dockmaster mobile application according to an embodiment of the disclosure.

FIG. 40 shows a pedestal details and control screen 7400 of the dockmaster mobile application 800A. The pedestal details and control screen 7400 includes a pedestal details portion 7510 displaying an identifier and commissioning date for a charging pedestal 520A, 520B, and a plurality of boat details portion 7512, 7514 including boat names, boat owners' names, time-docked measurements associated with the boats, and other relevant information.

Figure 41A:
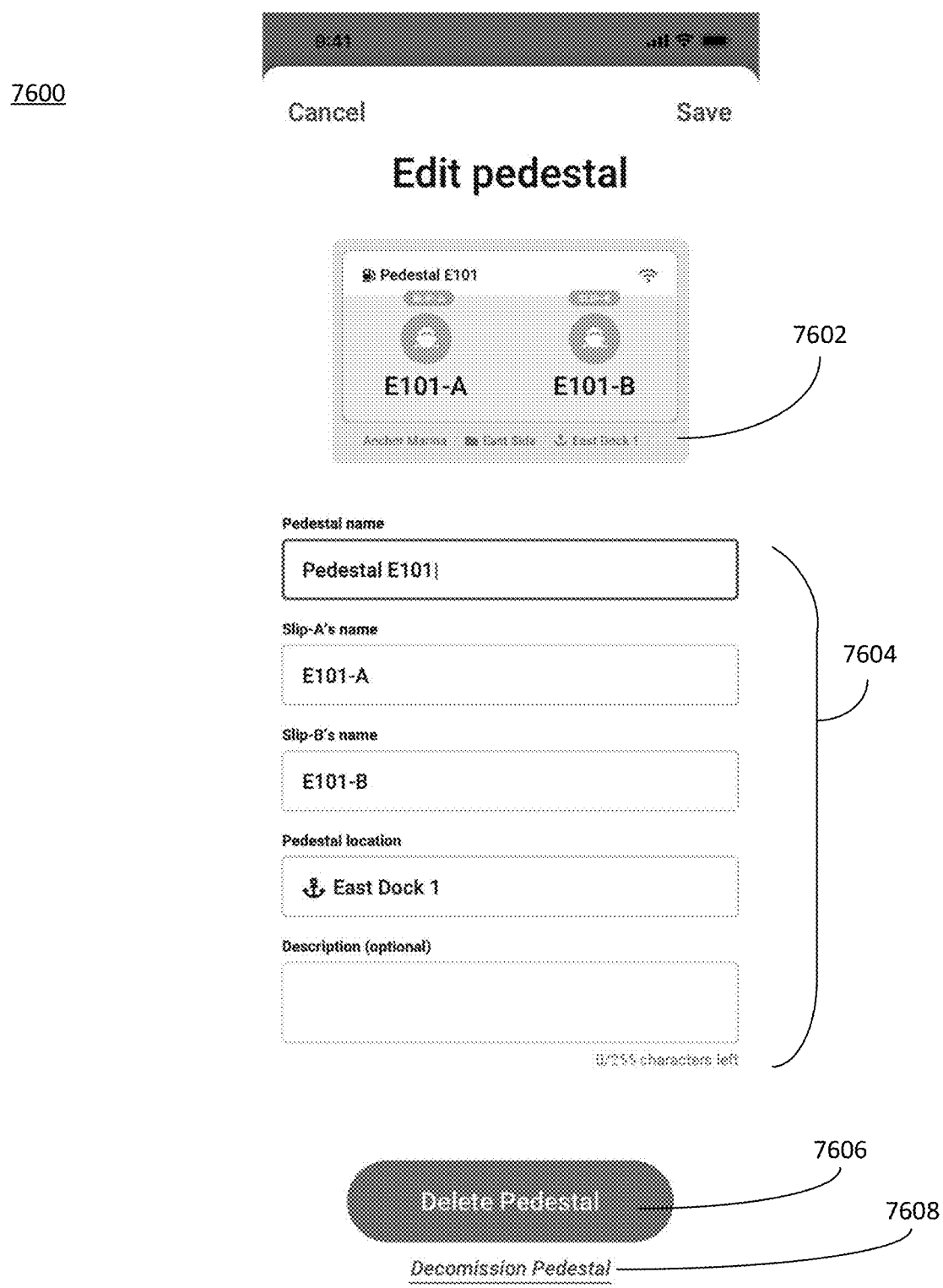
Figure 41C:
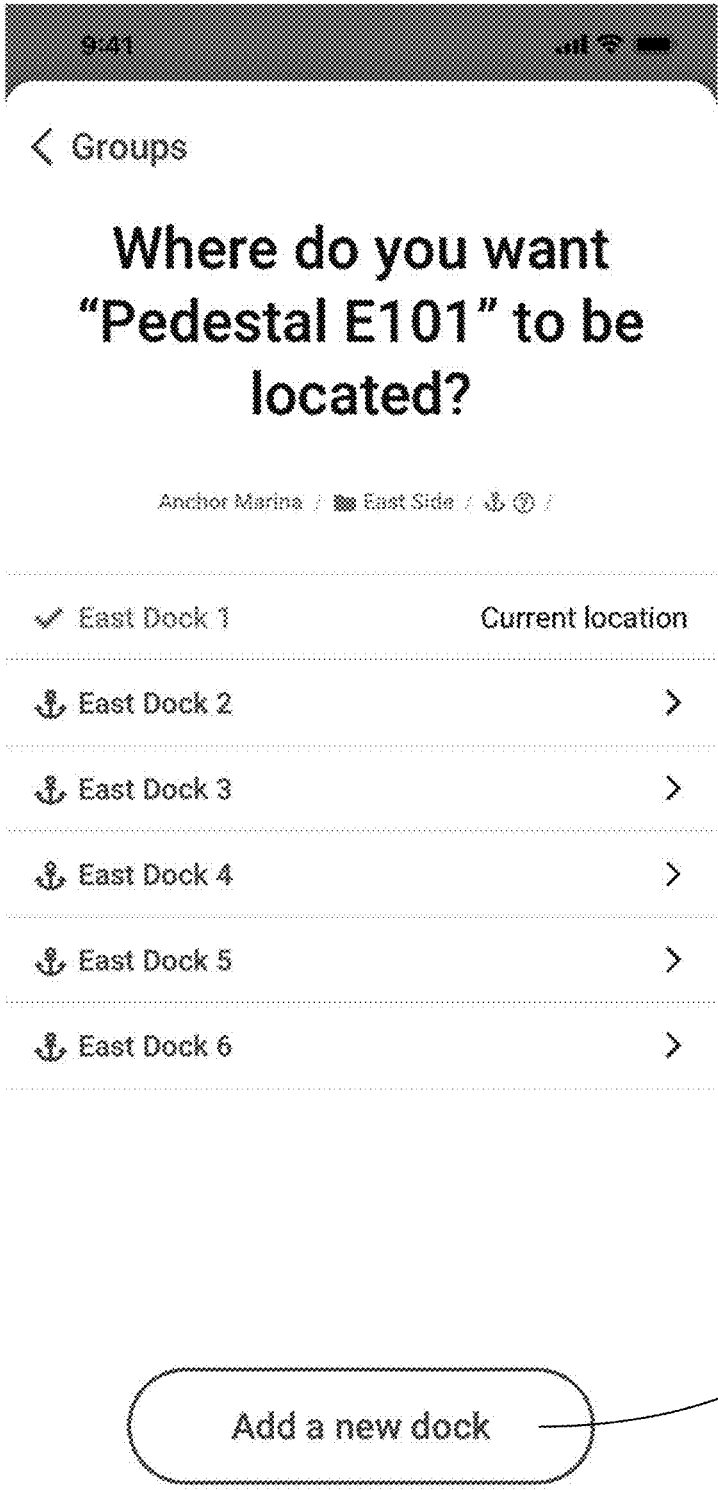

FIGS. 41A-41C pedestal editing screens of the dockmaster mobile application 800A. Using these screens, the user can change the name of a charging pedestal 520A, 520B via a pedestal details portion 7604 change it's preferred location and slip names, decommission the charging pedestal 520A, 520B via a "decommission pedestal button" 7608, or delete the charging pedestal 520A, 520B via a "delete pedestal" button 7606. As shown in FIGS. 41B and 41C, a group and dock to associate the charging pedestal 520A, 520B can also be chosen while editing the details of the charging pedestal 520A, 520B via the pedestal editing screens 7600.

Figure 42:
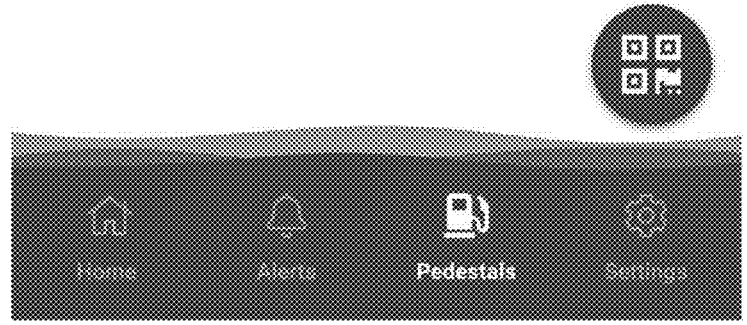
FIG. 42 shows a docks-per-group screen of a dockmaster mobile application according to an embodiment of the disclosure.

FIG. 42 a docks-per-group screen 7700 of a dockmaster mobile application 800A at which a user can view which docks are associated with which groups via a dock list portion 7702.

FIG. 43A-43C show pedestal group editing screens 7800 of the dockmaster mobile application 800A. Using these screens, a user can change the name of a group, move the content of the group, or delete the group.

FIG. 44 a pedestals-per-dock screen 7900 of a dockmaster mobile application 800A at which a user can view which charging pedestals 520A, 520B are associated with which groups via a pedestal list portion 7910.

Figure 45A:
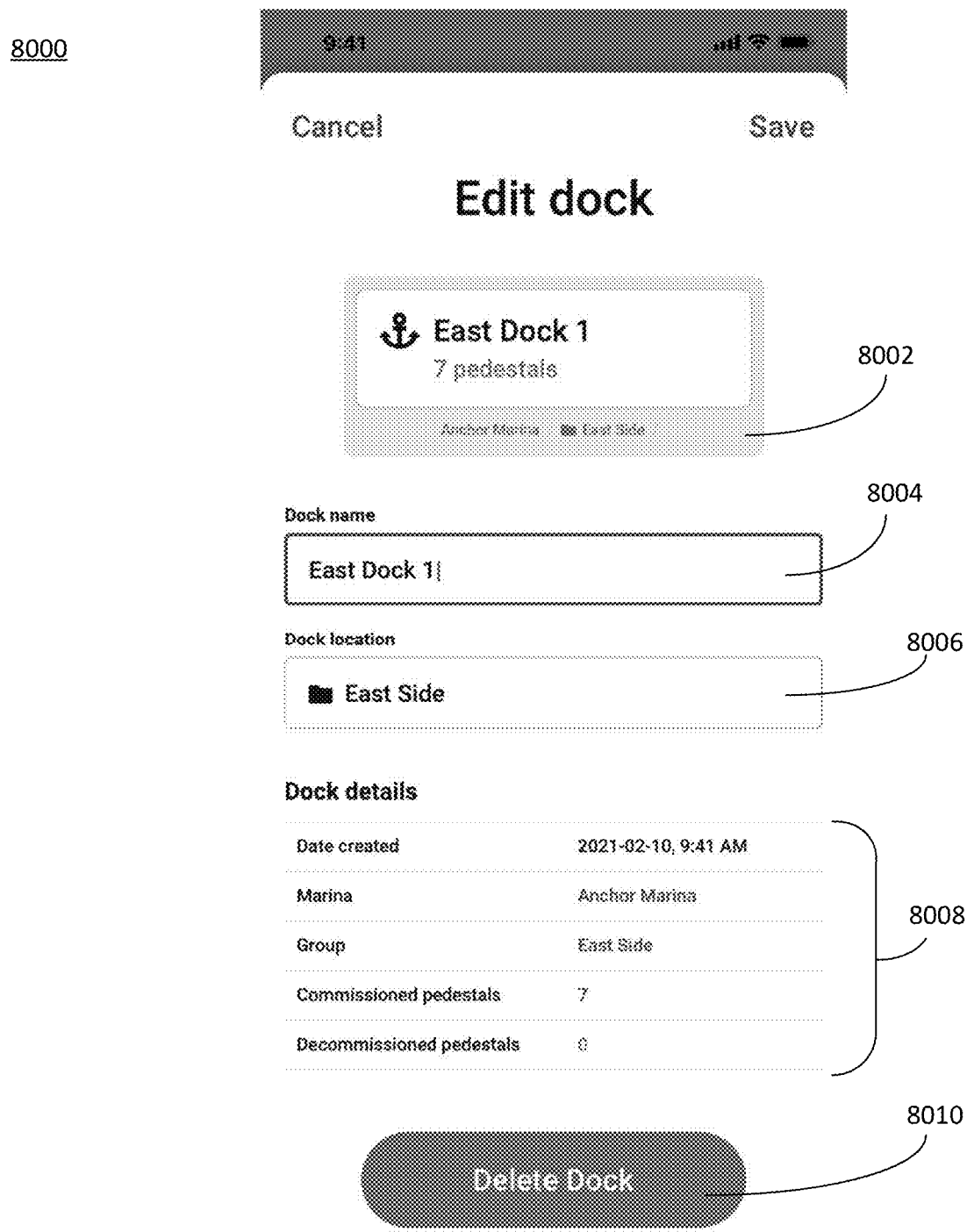
Figure 45B:

FIG. 45A-45C show dock editing screens 8000 of the dockmaster mobile application 800A. Using these screens, a user can change the name of a dock, change the location of the dock, move the content of the dock, or delete the dock.

Figure 46A:
FIG. 46A-46C shows move content screens of the dockmaster mobile application according to various embodiments of the disclosure.
Figure 46B:
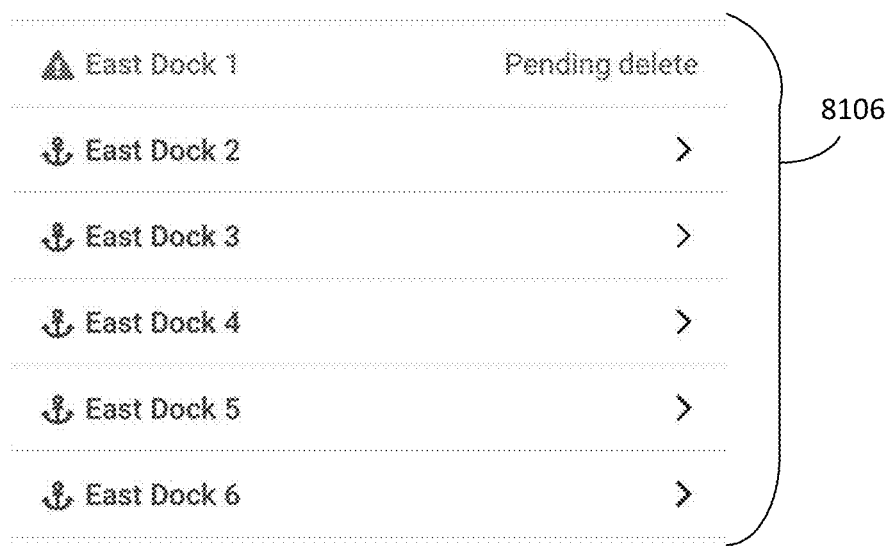
Figure 46C:

FIG. 46A-46C shows move dock content screens 8100 of the dockmaster mobile application 800A. Using these screens, the user can transfer content from one dock to another dock.

Figure 47B:
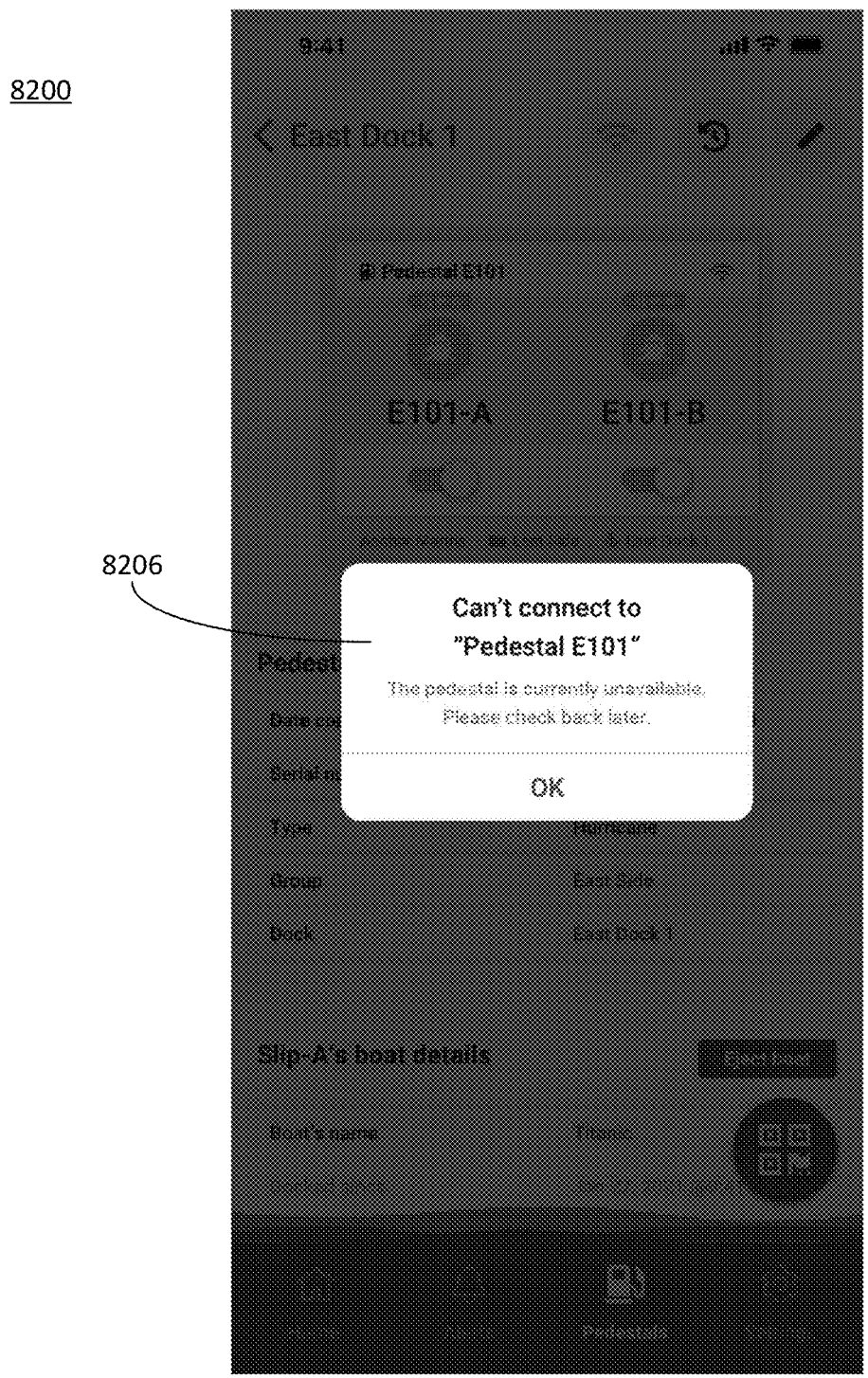
Figure 47C:
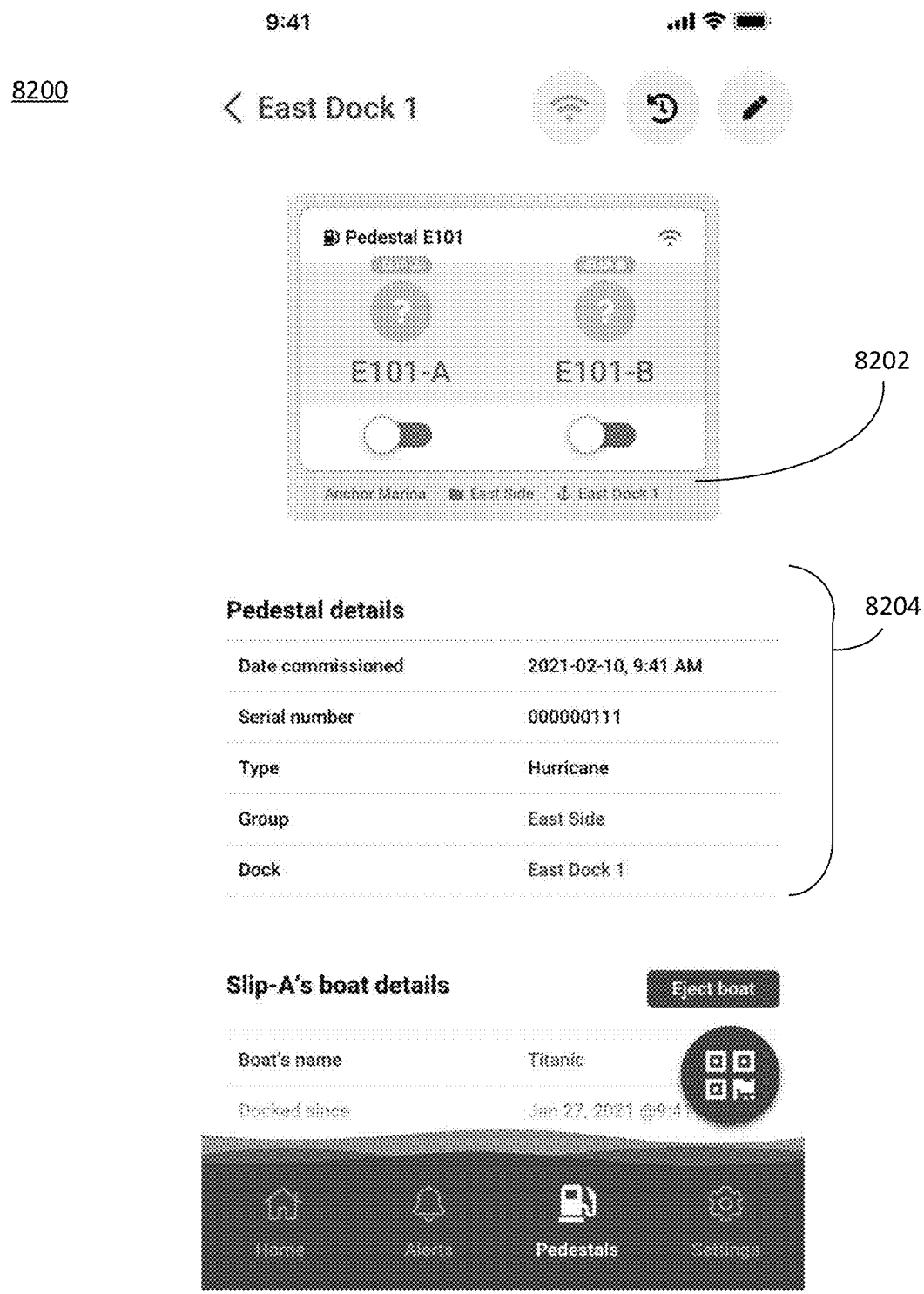

FIGS. 47A-47C collectively show an example of the dockmaster mobile application 800A failing to establish a connection a charging pedestal 520A, 520B. As shown in FIG. 47B, when the dockmaster mobile application 800A fails to connect to a charging pedestal 520A, 520B, a notification is displayed to the user via the dockmaster mobile application 800A. As shown in FIG. 47C, the electrical power units window 8202 is then grayed out and rendered non-interactive.

Figure 48:
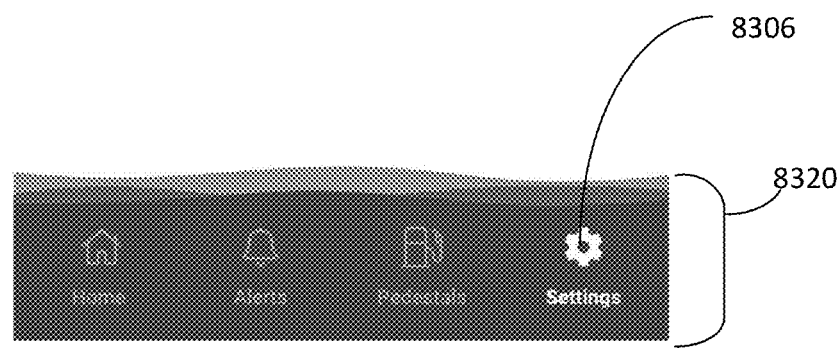
FIG. 48 shows a settings screen of the dockmaster mobile application according to an embodiment of the disclosure

FIG. 48 shows a settings page 8300 associated with a settings icon 8306 of the navigation banner 8320. Remote power control settings can be reached via the remote power control portion 8302, and pedestal maintenance settings can be accessed via the pedestal maintenance settings portion 8304.

Although aspects have been described in detail with reference to certain preferred embodiments, variations and modifications exist within the scope and spirit of one or more independent aspects as described.

What is claimed is:

1. A power pedestal configured to connect to a mobile device comprising:
a main body; one or more electrical power units disposed in the main body and configured to conduct power to a marine vessel;
one or more display screens; one or more sensors; and,
a controller including a network interface configured to communicate with a mobile device of an authorized user via a communication network, transmit data to a server including a memory and a processor via the communication network, and execute commands received, via the communication network, from the server or the mobile device,
wherein executing a command received from the server includes
receiving a commissioning command from the mobile device of the authorized user and commissioning the power pedestal, and
receiving a slip ID from the mobile device of the authorized user and associating the slip ID with the power pedestal.

2. The power pedestal of claim 1, further including an emergency actuator configured to generate and transmit an emergency alert to the mobile device via the communication network when actuated.

3. The power pedestal of claim 1 further including receptacle assemblies associated with the electrical power units, and motorized breakers disposed in the main body and configured to allow a user to switch between different receptacle assemblies.

4. The power pedestal of claim 1, further comprising one or more illumination devices configured to illuminate the electrical power units.

5. The power pedestal of claim 1, wherein transmitting data to the server via the communication network includes communicating an alert associated with the power pedestal to the server.

6. The power pedestal of claim 1, wherein transmitting data to the server via the communication network includes communicating a usage statistic associated with the power pedestal to the server.

7. The power pedestal of claim 1, wherein communicating with the mobile device via the communication network includes authenticating user log in information of a dockmaster.

8. The power pedestal of claim 1, wherein transmitting data to the server via the communication network includes communicating water sensor data indicating a water spike to the server.

9. The power pedestal of claim 1, wherein transmitting data to the server via the communication network includes communicating power sensor data indicating a power spike to the server.

10. The power pedestal of claim 1, wherein executing a command received from the server or the mobile device includes turning off power to one or more of the electrical power units.

11. The power pedestal of claim 1, wherein executing a command received from the server or the mobile device includes causing a display of the power pedestal to display an advertisement.

12. A method of associating a power pedestal with a slip comprising:
establishing, at the power pedestal via a communication interface, a connection with a computing device associated with an authorized user;
executing, at the power pedestal, a commissioning command from the computing device associated with the authorized user;
receiving, at the power pedestal, a slip ID from the computing device associated with the authorized user; and,
associating the slip ID with the power pedestal.

13. The method of claim 12 further comprising requesting, via the power pedestal, user log in information; and, determining, based on the log in information, that the authorized user associated with the log in information is a dockmaster.

14. The method of claim 12 further comprising displaying, via a display of the power pedestal, slip identification and status information.

15. The method of claim 12 further comprising transmitting, from the power pedestal to a remote server, an alert or usage statistic associated with the power pedestal.

16. A non-transitory, computer-readable medium containing instructions that, when executed by a controller of a power pedestal, are configured to perform a set of functions, the set of functions comprising:
- establishing a connection, via a communication interface of the controller, with a computing device associated with an authorized user;
- executing, via the controller, a commissioning command from the computing device associated with the authorized user;
- receiving, via the communication interface of the controller, a slip ID from the computing device associated with the authorized user; and,
- associating, via the controller, the slip ID with the power pedestal.

17. The non-transitory, computer-readable medium of claim 16 further comprising requesting, via the controller, user log in information; and, determining, via the controller, that the authorized user associated with the log in information is a dockmaster.

18. The non-transitory, computer-readable medium of claim 16 further comprising causing, via the controller, a display of the power pedestal to display slip identification and status information.

19. The non-transitory, computer-readable medium of claim 16 further comprising transmitting, via the communication interface of the controller to a remote server, an alert or usage statistic associated with the power pedestal.

* * * * *